US011886529B2

(12) United States Patent
Kristoffersen et al.

(10) Patent No.: US 11,886,529 B2
(45) Date of Patent: *Jan. 30, 2024

(54) SYSTEMS AND METHODS FOR DIAGNOSING QUALITY ISSUES IN WEBSITES

(71) Applicant: Siteimprove A/S, Copenhagen (DK)

(72) Inventors: Kristian Kristoffersen, Copenhagen (DK); Jacob Bonde Larsen, Tårnby (DK); Christina Jensen, Copenhagen (DK)

(73) Assignee: Siteimprove A/S, Copenhagen (DK)

( * ) Notice: Subject to any disclaimer, the term of this patent is extended or adjusted under 35 U.S.C. 154(b) by 0 days.

This patent is subject to a terminal disclaimer.

(21) Appl. No.: 17/897,434

(22) Filed: Aug. 29, 2022

(65) Prior Publication Data

US 2023/0141070 A1     May 11, 2023

Related U.S. Application Data

(63) Continuation of application No. 17/590,572, filed on Feb. 1, 2022, now Pat. No. 11,461,430.

(Continued)

(51) Int. Cl.
*G06F 7/02* (2006.01)
*G06F 16/00* (2019.01)
(Continued)

(52) U.S. Cl.
CPC ...... *G06F 16/9574* (2019.01); *G06F 3/04842* (2013.01); *G06F 16/951* (2019.01);
(Continued)

(58) Field of Classification Search
CPC .. G06F 16/9574; G06F 16/957; G06F 16/951; G06F 3/04842; G06F 3/048; H04L 67/02
See application file for complete search history.

(56) References Cited

U.S. PATENT DOCUMENTS 836,414 A     11/1906 Toles
6,360,235 B1  3/2002 Tilt
(Continued)

FOREIGN PATENT DOCUMENTS

WO   WO 2012/027022   3/2012

OTHER PUBLICATIONS

EP Supplementary Search Report in European Application No. EP18853482, dated Mar. 29, 2020, 9 pages.
(Continued)

*Primary Examiner* — Bruce M Moser
(74) *Attorney, Agent, or Firm* — Barnes & Thornburg LLP

(57) ABSTRACT

Disclosed are systems and methods for diagnosing website quality. The method can include analyzing, by a computing system, a website to determine a current value for a quality score of the website, identifying issues with the website, providing information to cause a client device to present: (i) a circle graphical element that indicates the current value, a first portion of the circle's circumference being a size that indicates the current value, and (ii) indications of categories of issues with the website that each include different sets of issues, receiving an indication that user input at the client device selected a user-selected category, determining a target value for the quality score that would result should all issues within the user-selected category be resolved, and providing information to cause the client device to add a target element at a location on the circle's circumference that represents the target value.

20 Claims, 34 Drawing Sheets

Related U.S. Application Data

(60) Provisional application No. 63/277,954, filed on Nov. 10, 2021.

(51) Int. Cl.
*G06F 16/957* (2019.01)
*G06F 16/951* (2019.01)
*G06F 3/04842* (2022.01)
*H04L 67/02* (2022.01)
*G06F 3/048* (2013.01)

(52) U.S. Cl.
CPC ............ *G06F 16/957* (2019.01); *H04L 67/02* (2013.01); *G06F 3/048* (2013.01)

(56) References Cited

U.S. PATENT DOCUMENTS

| | | | |
|---|---|---|---|
| 7,231,606 | B2 | 6/2007 | Miller et al. |
| 7,475,067 | B2 | 1/2009 | Clary et al. |
| 7,558,795 | B2 | 7/2009 | Malik et al. |
| 7,584,435 | B2 | 9/2009 | Bailey et al. |
| 7,797,200 | B2 | 9/2010 | Patrawala |
| 7,805,428 | B2 | 9/2010 | Batista Reyes et al. |
| 8,065,410 | B1 | 11/2011 | Breen et al. |
| 8,196,104 | B2 | 6/2012 | Cohrs et al. |
| 8,442,984 | B1 | 5/2013 | Pennock et al. |
| 8,447,751 | B2 | 5/2013 | Stouffer et al. |
| 8,533,684 | B2 | 9/2013 | Brunet et al. |
| 8,554,698 | B2 | 10/2013 | Bando et al. |
| 8,613,039 | B2 | 12/2013 | Chen et al. |
| 8,972,379 | B1 | 3/2015 | Grieselhuber et al. |
| 9,009,784 | B2 | 4/2015 | Chen et al. |
| 9,087,035 | B1 | 7/2015 | Bandaru et al. |
| 9,152,729 | B2 | 10/2015 | Ajoku et al. |
| 9,537,732 | B2 | 1/2017 | Mukherjee et al. |
| 9,563,422 | B2 | 2/2017 | Cragun et al. |
| 10,114,902 | B2 | 10/2018 | Byakod et al. |
| 10,169,188 | B2 | 1/2019 | Belekar et al. |
| 10,534,512 | B2 | 1/2020 | Jadhav et al. |
| 10,706,122 | B2 | 7/2020 | Sabbavarpu |
| 10,831,831 | B2 | 11/2020 | Greene |
| 10,860,594 | B2 | 12/2020 | Jamshidi |
| 10,963,470 | B2 | 3/2021 | Jamshidi |
| 10,970,294 | B2 | 4/2021 | Jamshidi |
| 11,113,276 | B2 | 9/2021 | Zhao |
| 11,262,979 | B2 | 3/2022 | Deshmukh et al. |
| 2004/0039734 | A1 | 2/2004 | Judd et al. |
| 2006/0253345 | A1 | 11/2006 | Herber |
| 2008/0133500 | A1 | 6/2008 | Edwards |
| 2009/0113287 | A1 | 4/2009 | Yee |
| 2010/0042608 | A1 | 2/2010 | Kane |
| 2012/0010927 | A1 | 1/2012 | Attenberg et al. |
| 2012/0017281 | A1 | 1/2012 | Bannerjee et al. |
| 2012/0047120 | A1 | 2/2012 | Connolly |
| 2012/0254405 | A1 | 10/2012 | Ganesh et al. |
| 2012/0254723 | A1 | 10/2012 | Kasa et al. |
| 2013/0282691 | A1 | 10/2013 | Stouffer et al. |
| 2014/0164345 | A1 | 6/2014 | Connolly et al. |
| 2014/0304578 | A1 | 10/2014 | Parkinson et al. |
| 2015/0039746 | A1 | 2/2015 | Mukherjee et al. |
| 2015/0100569 | A1* | 4/2015 | Reis De Sousa ... G06F 16/9538 707/723 |
| 2015/0317132 | A1 | 11/2015 | Rempell et al. |
| 2015/0348071 | A1 | 12/2015 | Cochrane et al. |
| 2016/0055490 | A1 | 2/2016 | Keren et al. |
| 2016/0103861 | A1 | 4/2016 | Jacob et al. |
| 2016/0210360 | A9 | 7/2016 | Stouffer et al. |
| 2016/0353148 | A1 | 12/2016 | Prins et al. |
| 2018/0210965 | A1 | 7/2018 | Grigoryan et al. |
| 2019/0073365 | A1 | 3/2019 | Jamshidi |
| 2020/0151187 | A1 | 5/2020 | Jamshidi |
| 2020/0394200 | A1 | 12/2020 | Jamshidi |
| 2021/0326348 | A1 | 10/2021 | Jamshidi |

OTHER PUBLICATIONS

Gustafsdottir [online], "CMS Plugin: Frequently Asked Questions," Siteimprove.com, Jul. 9, 2020, 3 pages.

Gustafsdottir [online], "How to navigate the Siteimprove CMS Plugin," Siteimprove.com, Sep. 10, 2020, 7 pages.

International Preliminary Report on Patentability in PCT Appln. No. PCT/US2018/049809, dated Mar. 10, 2020, 13 pages.

International Search Report and Written Opinion in Application No. PCT/US2018/049809, dated Nov. 19, 2018, 13 pages.

International Search Report and Written Opinion in International Appln. No. PCT/US2009/042061, dated Jul. 27, 2022, 14 pages.

Kamal, "Evaluating web accessibility metrics for Jordanian Universities," International Journal of Advanced Computer Science and Applications, 2016, 7(7):113-122.

Needham [online], "CMS Plugin: Security FAQ," Siteimprove.com, Aug. 9, 2020, 2 pages.

Needham [online], "On which CMS is the Siteimprove plugin available?," Siteimprove.com, May 7, 2020, 11 pages.

Sergio Pedercini [online], "How to code a responsive circular percentage chart with SVG and CSS", retrieved from URL: https://nnediunn.conn/@pppped/how-to-code-a-responsive-circular-percentage-chart-with-svg-and-css-3632f8cd7705, May 17, 2017, 5 pages.

Silktide.com [online], "Silktide," available on or before Feb. 8, 2017, via Internet Archive: Wayback Machine URL <https://web.archive.org/web/20170208112649/https://silktide.com/>, retrieved on May 7, 2020, URL<http://www.silktide.comt>, 2 pages.

Sitebeam.net [online], "Sitebeam," available on or before Feb. 4, 2017, via Internet Archive: Wayback Machine URL <https://web.archive.org/web/20170204162753/http://sitebeam.net/>, retrieved on May 7, 2020, URL<http://www.sitebeam.net>, 4 pages.

Siteimprove.com [online], "Adobe Experience Manager: Siteimprove provided plugin," available on or before Aug. 12, 2020, via Internet Archive: Wayback Machine URL <https://web.archive.org/web/20200812065134/https:/siteimprove.com/en/core-platform/integrations/cms-plugin/adobe-experience-manager/>, retrieved on Mar. 21, 2022, URL<https://siteimprove.com/en/core-platform/integrations/cms-plugin/adobe-experience-manager/>, 18 pages.

Siteimprove.com [online], "Adobe Experience Manager: Siteimprove provided plugin," available on or before Sep. 20, 2020, via Internet Archive: Wayback Machine URL <https://web.archive.org/web/20200920011517/https:/siteimprove.com/en/core-platform/integrations/cms-plugin/adobe-experience-manager//>, retrieved on Mar. 21, 2022, URL<https://siteimprove.com/en/core-platform/integrations/cms-plugin/adobe-experience-manager/>, 18 pages.

Siteimprove.com [online], "Aug. & Sep. 2021 Release Highlights," Oct. 8, 2021, retrieved on Mar. 21, 2022, retrieved from URL<https://help.siteimprove.com/support/solutions/articles/80000946947-august-september-2021-release-highlights>, 2 pages.

Siteimprove.com [online], "Drupal," available on or before Aug. 12, 2020, via Internet Archive: Wayback Machine URL <https://web.archive.org/web/20200812071254/https:/siteimprove.com/en/core-platform/integrations/cms-plugin/drupal/>, retrieved on Mar. 21, 2022, URL<https://siteimprove.com/en/core-platform/integrations/cms-plugin/drupal/>, 12 pages.

Siteimprove.com [online], "Feb. 2021 Release Highlights," Sep. 23, 2021, retrieved on Mar. 21, 2022, retrieved from URL<https://help.siteimprove.com/support/solutions/articles/80000863866#h_01F0GCPTWX5H3ZS558V1GVEQQN>, 3 pages.

Siteimprove.com [online], "Feb. 2021 Release Highlights," Sep. 23, 2021, retrieved on Mar. 21, 2022, retrieved from URL<https://help.siteimprove.com/support/solutions/articles/80000863866-february-2021-release-highlights>, 3 pages.

Siteimprove.com [online], "Jan. 2021 Release Highlights," Oct. 1, 2021, retrieved on Mar. 21, 2022, retrieved from URL<https://help.siteimprove.com/support/solutions/articles/80000863867-january-2021-release-highlights>, 3 pages.

Siteimprove.com [online], "Jul. 2021 Release Highlights," Sep. 23, 2021, retrieved on Mar. 21, 2022, retrieved from URL<https://help.siteimprove.com/support/solutions/articles/80000863850-july-2021-release-highlights>, 4 pages.

Siteimprove.com [online], "Oct. & Nov. 2021 Release Highlights," Dec. 7, 2021, retrieved on Mar. 21, 2022, retrieved from URL<https://

(56) References Cited

OTHER PUBLICATIONS help.siteimprove.com/support/solutions/articles/80000958280-october-november-2021-release-highlights>, 3 pages.

Siteimprove.com [online], "Oct. 2020 Release Highlights," Nov. 16, 2021, retrieved on Mar. 21, 2022, retrieved from URL<https://help.siteimprove.com/support/solutions/articles/80000448376-october-2020-release-highlights>, 2 pages.

Siteimprove.com [online], "Optimizely + Siteimprove," available on or before Jun. 16, 2021, via Internet Archive: Wayback Machine URL <https://web.archive.org/web/20210616140532/https:/siteimprove.com/en/core-platform/integrations/cms-plugin/optimizely/>, retrieved on Mar. 21, 2022, URL<https://siteimprove.com/en/core-platform/integrations/cms-plugin/optimizely//>, 12 pages.

Siteimprove.com [online], "Siteimprove CMS Plugin Integration Cookbook," available on or before Aug. 5, 2020, via Internet Archive: Wayback Machine URL <https://web.archive.org/web/20200805195514/https:/developer.siteimprove.com/cms-plugin-integration-cookbook/>, retrieved on Mar. 21, 2022, URL<https://developer.siteimprove.com/cms-plugin-integration-cookbook/>, 13 pages.

Siteimprove.com [online], "Web accessibility for all with the next generation of Siteimprove Accessibility," Mar. 20, 2020, retrieved on Mar. 21, 2022, retrieved from URL<https://siteimprove.com/en-us/blog/web-accessibility-for-all-with-next-generation-siteimprove-accessibility/>, 36 pages.

Wikipedia.com [online], "URI normalization," Oct. 20, 2020, retrieved on Mar. 21, 2022, retrieved from URL<https://en.wikipedia.org/w/index.php?title=URI_normalization&oldid=984473278>, 2 pages.

Zhou, "Evaluating Websites Using a Practical Quality Model", Software Technology Research Laboratory, De Montfort University, 2009, 113 pages.

\* cited by examiner

| | Conformance | Points you can gain | Pages with this issue | Number of occurrences | Difficulty level | Responsibility |
|---|---|---|---|---|---|---|
| | A | 1.65 points | 3 pages | 3 occurrences | ooo Intermediate | Development |

Description 180 — 182 — 184 — 186 — 188 — 190 — 192

This page has a scrollable section that can't be operated by keyboard. 194

Related to this issue — 196

⊙ Scrollable element is not keyboard accessible (1 occurrences) →

Learn more — 188
Keyboard accessibility is an essential component of an accessible website.

Pages with this issue — 198

All pages ▼ | URL ▼ | Search | ⬇ CSV
↕ Occurrences · Page views

| ◇ Title | ◇ URL |
|---|---|
| *First meta refresh element is not valid, second one redirects after 5 seconds.* → | |
| ↻ | MetaRefreshHasNoDelay/Negative/<br>First_meta_refresh_element_is_not_valid_second_one)<br>redirects_after_5_secs.html | ☑ | 1 | ⓘ |
| *Refreshes after 30 secs* → | |
| ↻ | http://www.example.com/webanalysisserversystem/website/<br>MetaRefreshHasNoDelay/Negative/Refresh_after_30_secs.html | ☑ | 1 | ⓘ |
| *Rule 96: meta element has no refresh delay.* → | |
| ↻ | http://www.example.com/webanalysisserversystem/website/<br>Metaelementhasnorefreshdelayfailed.html | ☑ | 1 | ⓘ |

FIG. 1F

| Potential issues | | ⇅ Conformance | ⇅ Responsibility | ⇅ Element type | ⇅ Occurrences | ⇅ Pages | ⇅ Points you can gain |
|---|---|---|---|---|---|---|---|
| | | | | Level A (+4) × | Responsibility ▼ | Element type ▼ | ± CSV |
| ⓘ | Is it possible to skip straight to the main content? → | ⓪ | Development | Page Layout | 48 | 48 ⌄ | 0.05 points |
| ⓘ | Does this video have captions? → | A | Content writing | Other | 21 | 17 ⌄ | 1.91 points |
| ⓘ | Is there an alternative to this visual content in this video? → | A | Content writing | Other | 21 | 17 ⌄ | 1.91 points |
| ⓘ | Do visual-only videos have an accessible alternative? → | AA | Content writing | Other | 21 | 17 ⌄ | 1.91 points |
| ⓘ | Is this video audio-described? → | A | Content writing | Other | 23 | 13 ⌄ | 1.27 points |
| ⓘ | Is the image file name an appropriate text alternative? → | AAA | Content writing | Images | 17 | 8 ⌄ | 1.85 points |
| ⓘ | Does these links (in the same context) go to the same page? → | AA | Content writing | Links | 17 | 8 ⌄ | 1.77 points |
| ⓘ | Are these links identical → | A | Visual Design | Forms | 19 | 5 ⌄ | 0.16 points |
| ⓘ | Is there sufficient contrast between the text and background? → | A | Development | Other | 2 | 2 ⌄ | 1.91 points |
| ⓘ | Can the audio be switched off? → | | | | | | |

1 - 0 of 13 items  |<  <  Page 1 of 2 ▼  >  >|  Show 10 items ▼ per page

R30- does this audio have a transcript
506

Item to review

Answer the following questions to find out if an issue is present.

Is the audio live-streaming?  Yes  No

Does the audio start playing automatically?  Yes  No

Select the audio controls.
`<div class="example">`
Select in... ∨

Highlight the transcript.
`<main id="wrapper">`
Select in... ∨

R30- does this audio have a transcript
508

Is the audio live-streaming?  Yes  No

Does the audio start playing automatically?  Yes  No

Select the audio controls.
`<main id="wrapper">`
Select in... ∨

Highlight the text that this content servers as an alternative for.
`<main id="wrapper">`
Select in... ∨

Highlight the text that lables the content as a media alternative.
`<main id="wrapper">`
Select in... ∨

R65 - is it clear which page element has focus from keyboard 534 button

Item to review

Answer the following questions to find out if an issue is present.

Tab to the element. Is it highlighted when reached by keyboard?
Yes  No

Review complete

⊙ This is an issue

Review another occurrence

Fix this occurrence

R69 - is there sufficient contrast between text and background 536

Background image doesn't have an alternative text

Item to review

Answer the following questions to find out if an issue is present.

What colour is the background?

FFFFFF  ✕

✎ Add another colour

Review complete

⊙ This is not an issue

Review another occurrence

< Go back to overview of potential issues

R81 - do these links (in the same context) point to the same URL 538 a11ydemo.siteimprove.syst...e_value_is_not_v alid.html

Item to review

Answer the following questions to find out if an issue is present.

Do these links go to the same page?
Yes  No

Review complete

⊙ This is an issue

Review another occurrence

Fix this occurrence

FIG. 5H

R87 - is it possible to skip straight to the main content
540

Is the first item that can be reached by keyboard a link to another part of the page?
[ Yes ] [ No ]

Highlight the section that the link takes you to.

```
<link-si-ignore rel="styleshe
et" type="text/css" hidden="t
rue" href="stylesheets/listbo
x.css">
```

[ Select in... ⌄ ]

Is the destination (of the first link that can be reached by keyboard) the main content of the page?
[ Yes ] [ No ]

Review complete

◯ This is an issue

[ Review another occurrence ]

FIG. 5I

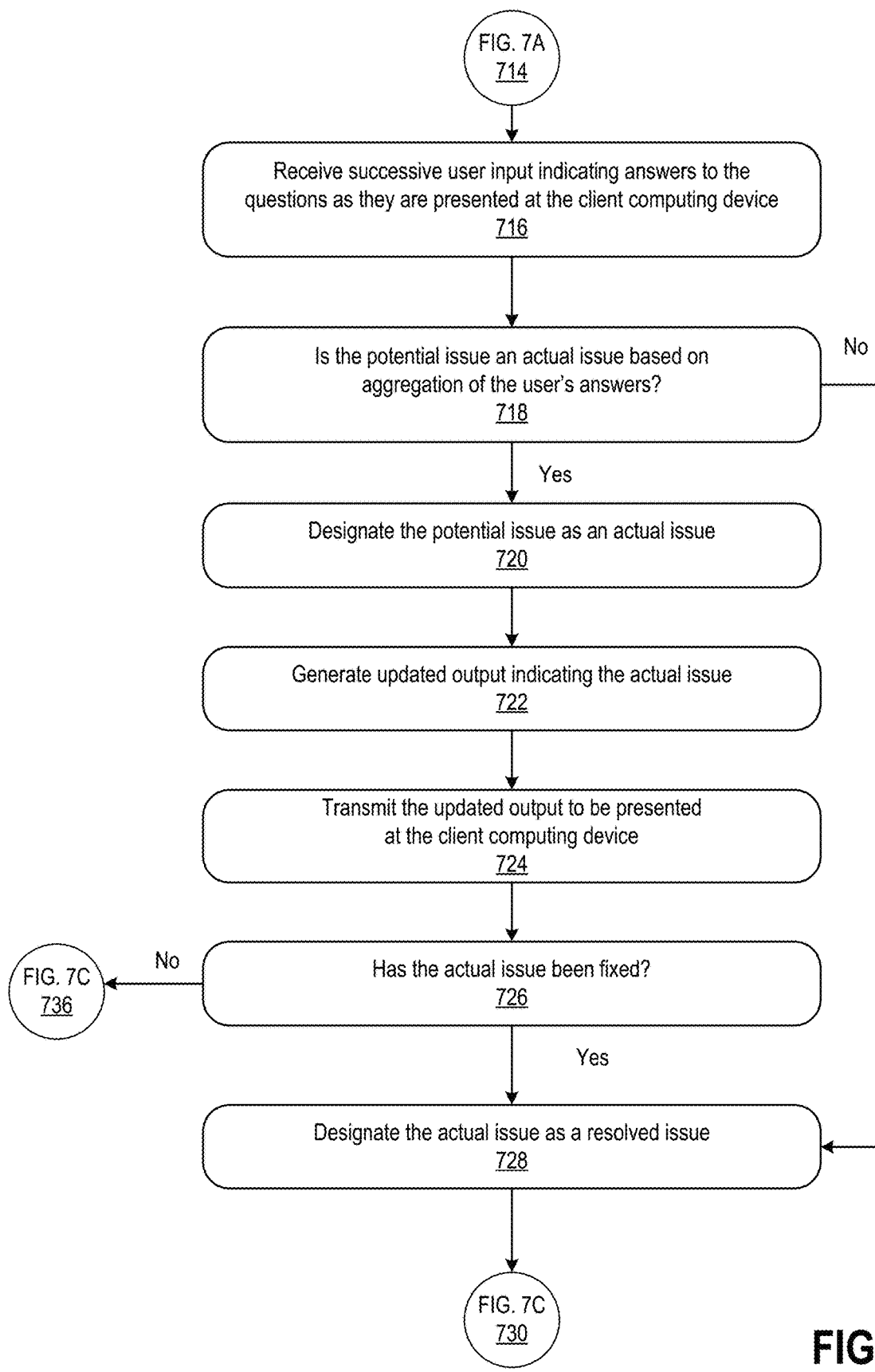

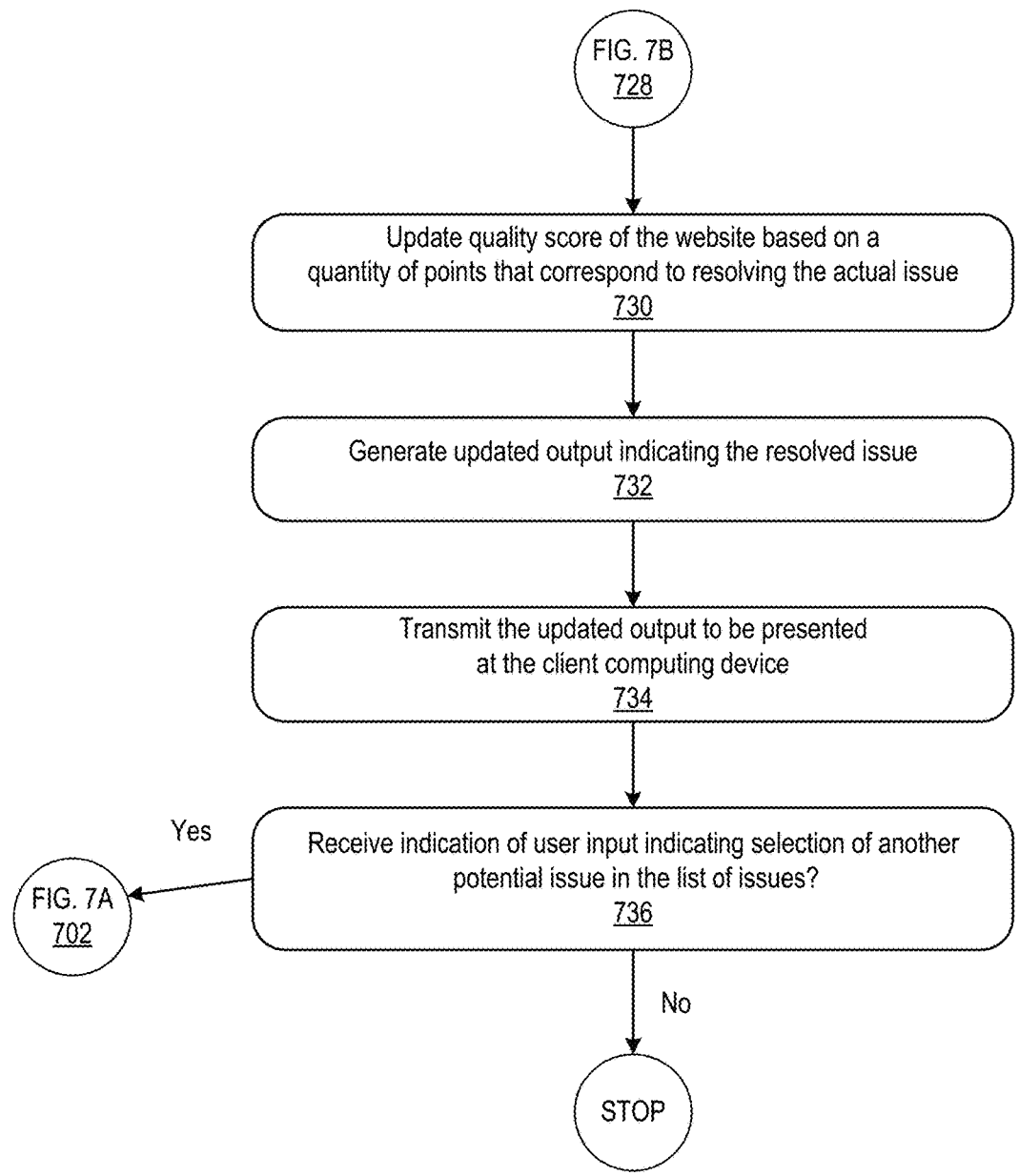

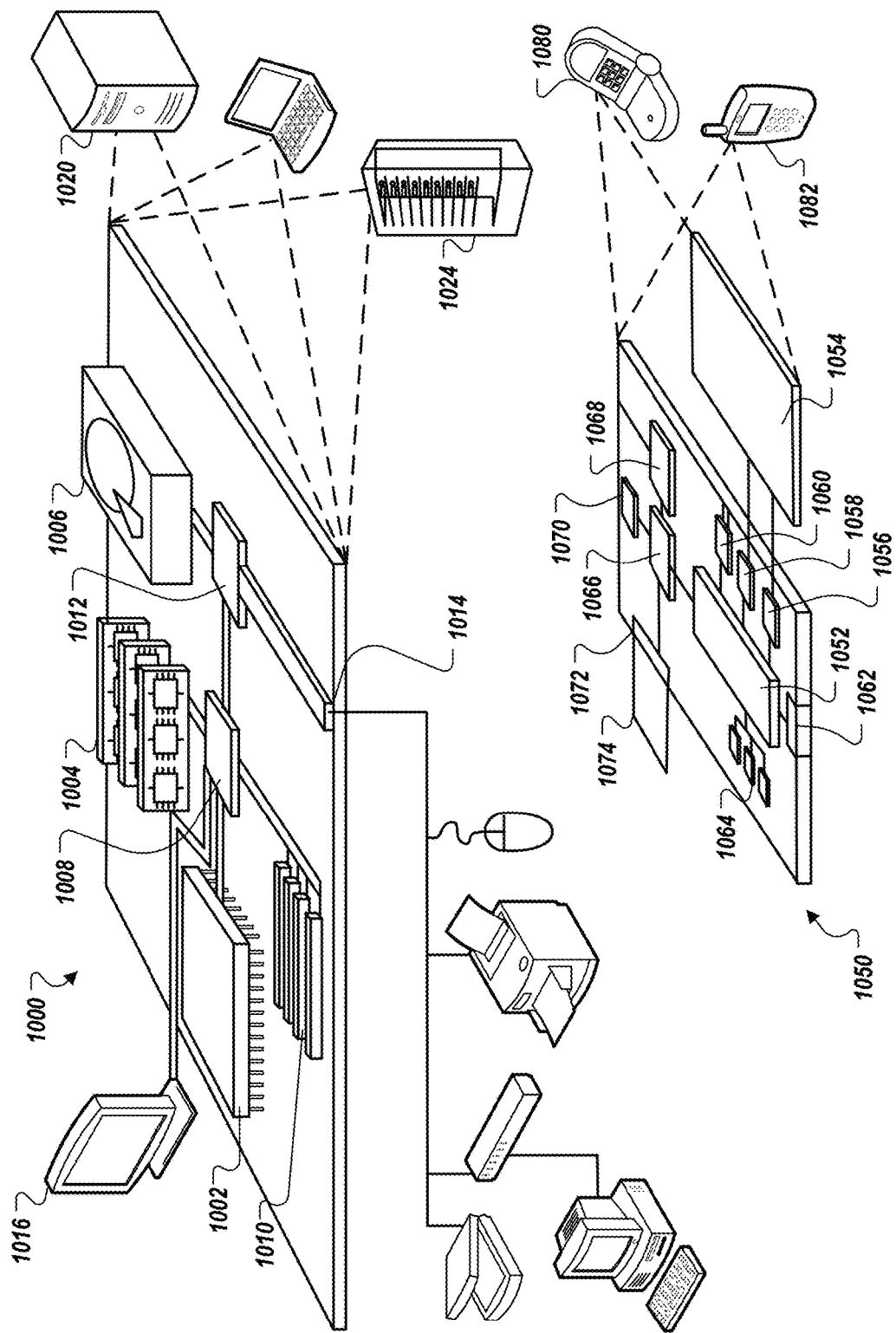

SYSTEMS AND METHODS FOR DIAGNOSING QUALITY ISSUES IN WEBSITES

REFERENCE TO CO-PENDING APPLICATION

This application claims the benefit of priority under 35 U.S.C. § 119(e) to U.S. patent application Ser. No. 17/590,572 filed on Feb. 1, 2022, which claims benefit to U.S. Provisional Patent Application No. 63/277,954, filed Nov. 10, 2021 and entitled SYSTEMS AND METHODS FOR DIAGNOSING QUALITY ISSUES IN WEBSITES, and the entire disclosure set forth therein is incorporated herein by reference.

TECHNICAL FIELD

This document describes devices, systems, and methods related to assessing quality issues in a website, particularly regarding identifying actual quality issues from potential quality issues.

BACKGROUND

Websites can vary in their quality. The quality of a website can affect user experience of users who visit the website. For example, websites with broken links, misspellings, and other features that do not function as intended can be frustrating for users visiting a site. Additionally, websites that are not optimized for search engines (also referred to as "search engine optimization" or SEO) may have a low level of quality because users may not be able to locate relevant pages on the website (or locate the website more generally) using a search engine. For example, websites that do not have information formatted properly for search engines to retrieve and associate with other information on the page may have low levels of SEO, which may result in those websites not appearing as prominently in search results as they otherwise should for relevant search strings. Websites can also have a low level of quality if they are not readily accessible to all users regardless of impairment (also referred to as "website accessibility"). For example, if a website is not formatted properly, users who are seeing or hearing impaired may not be able to use website reader applications to review and navigate through the content.

SUMMARY

The document generally relates to diagnosing or assessing quality issues in a website and projecting changes to a quality score of the website based on assessment of the quality issues. A customer, such as a website owner, website operator, or other relevant user who is associated with a website, webpage, or set of webpages, can have many webpages that make up their website. Any of the webpages may have quality issues or other issues that lower website compliance with applicable accessibility standards. It can be challenging to identify, target, and prioritize which webpages to fix in order to improve overall quality of the website (such as increasing an overall quality score for the website), thereby improving user experiences for users who visit the website and maintaining accessibility compliance.

The disclosed techniques can provide website analysis services, by a computer system, to be presented in graphical user interfaces (GUIs) at a device, such as a mobile phone or computer, of the customer. The customer can use these services to manage their website, maintain accessibility compliance, and improve overall quality of the website.

An example GUI can present a visual indication of a current quality score for the website and a list of categories of issues that can be addressed by the customer to improve compliance with accessibility standards. The customer can select any of the listed categories to view an updated visual indication of the current quality score that includes a target (such as a bulls eye) representing an improved quality score for the website if the customer addresses all the issues in the selected category. This visual indication of the quality score for the website can help the customer in deciding and prioritizing what types of quality issues to address in the website.

The computer system can also generate a GUI that presents a list of potential, actual, and resolved issues for a website. The issues can be sorted and filtered in the list to assist the customer in prioritizing review of the issues. Moreover, the computer system can provide accessibility conformity testing (ACT) questions for potential issues within the GUI. ACT can be performed, by the computer system, to determine whether a potential issue is an actual issue. If the potential issue is an actual issue, then the issue can be addressed by the customer to comply with accessibility standards and improve overall quality of the website (such as increasing the quality score for the website). If the potential issue is not an actual issue, then the issue can be identified as a resolved issue and the quality score for the website can also increase (since the quality score may have been initially decreased by an amount of points corresponding to a potential issue). The quality score for the website can be dynamically updated based on whether issues are identified as potential issues (the quality score can decrease by an amount of points associated with the issue), actual issues (the quality score can remain the same as when the issue is identified as potential), and resolved issues (the quality score can increase by the amount of points associated with the issue).

The computer system can present ACT in a GUI by outputting a series of questions that can be answered by the customer. The customer's responses can be reviewed by the computer system to diagnose the potential issue. The computer system can select questions in a series of questions to present to the customer based on previous answers provided by the customer in response to similar or same issues in the website. Therefore, the computer system can remember previous customer answers to questions to speed up a review process of a new/current potential issue. Moreover, even if an issue is identified as resolved, if an element on a webpage associated with the issue changes, then the issue can be marked again as a potential issue and returned to the customer to determine, with ACT, whether the potential issue is now an actual issue. This can provide for maintaining continuous compliance with accessibility standards.

Additionally, when an actual issue is identified in the website and the customer makes a change to resolve the issue, the computer system can implement that change across all webpages having the same accessibility issue. This can provide for efficient and fast resolution of actual issues in the website, which can improve the overall quality (and quality score) of the website. The more accessibility issues that are fixed in the website, the more compliant the website is with accessibility standards, which may also improve user experiences with the website.

Although the disclosed inventive concepts include those defined in the attached claims, it should be understood that the inventive concepts can also be defined in accordance with the following embodiments.

Embodiment A1 is a computer-implemented method, the computer-implemented method comprising: analyzing, by a computing system, webpages of a website to determine a current value for a quality score of the website, the current value for the quality score being less than a perfect value for the quality score; identifying, by the computing system, a plurality of issues with the website that result in the website not having the perfect value for the quality score; providing, by the computing system, information to cause a particular client device to present: (i) a circle graphical element that indicates the current value for the quality score, wherein a first portion of a circumference of the circle graphical element is presented in a first manner and a second portion of the circumference of the circle graphical element is presented in a second manner, a size of the first portion indicating the current value for the quality score of the website, and (ii) indications of multiple categories of issues with the website, each category of issues of the multiple categories of issues including different sets of issues from the plurality of issues with the website; receiving, by the computing system, an indication that user input at the particular client device selected a user-selected category of the multiple categories of issues with the website; determining, by the computing system, a target value for the quality score that would result should the computing system determine that all issues within the user-selected category of issues are resolved, the target value being less than the perfect value for the quality score; and providing, by the computing system responsive to receiving the indication that user input selected the user-selected category, information to cause the particular client device to modify a presentation of the circle graphical element to add a target element at a location on the circumference of the circle that represents the target value for the quality score.

Embodiment A2 is the computer-implemented method of embodiment A1, wherein the location of the target element is some distance from a side of the first portion of the circumference of the circle graphical element that represents the current value of the quality score.

Embodiment A3 is the computer-implemented method of any one of embodiments A1 through A2, wherein the second portion of the circumference of the circle graphical element represents a remainder of the circumference of the circle graphical element that is unoccupied by the first portion of the circumference of the circle graphical element.

Embodiment A4 is the computer-implemented method of any one of embodiments A1 through A3, further comprising: providing, by the computing system before the user input has selected the user-selected category, information to cause the particular client device to display a user interface that presents indications of issues from the plurality of issues with the website that result in the website not having the perfect value for the quality score; and providing, by the computing system responsive to receiving the indication that user input selected the user-selected category, information to cause the particular client device to modify the user interface from presenting the indications of the issues from the plurality of issues to presenting only indications of issues from the user-selected category of issues.

Embodiment A5 is the computer-implemented method of any one of embodiments A1 through A4, further comprising: receiving, by the computing system, an indication that user input at the particular client device selected, in addition to the user-selected category, a second user-selected category of the multiple categories of issues with the website; determining, by the computing system, an updated target value for the quality score that would result should the computing system determine that all issues within the user-selected category and all issues within the second user-selected category are resolved; and providing, by the computing system responsive to receiving the indication that user input selected the second user-selected category in addition to the user-selected category, information to cause the particular client device to modify the presentation of the circle graphical element to move the target element to an updated location on the circumference of the circle that represents the updated target value for the quality score.

Embodiment A6 is the computer-implemented method of any one of embodiments A1 through A5, further comprising: providing, by the computing system responsive to receiving the indication that user input selected the second user-selected category in addition to the user-selected category, information to cause the particular client device to modify the user interface from presenting only indications of issues from the user-selected category of issues to presenting only indications of issues from the user-selected category and issues from the second user-selected category.

Embodiment A7 is the computer-implemented method of any one of embodiments A1 through A6, wherein: before user input selected the user-selected category, the user interface concurrently presented: (i) the circle graphical element without the target element, and (ii) the indications of issues from the plurality of issues; after user input selected the user-selected category and before user input selected the second user-selected category, the user interface concurrently presented: (i) the circle graphical element with the target element at the location on the circumference that represents the target value, and (ii) only the indications of issues from the user-selected category; and after user input selected the second user-selected category in addition to the user-selected category, the user interface concurrently presented: (i) the circle graphical element with the target element at the updated location on the circumference that represents the updated target value, and (ii) only indications of issues from the user-selected category and issues from the second user-selected category.

Embodiment A8 is the computer-implemented method of any one of embodiments A1 through A7, wherein the presentation by the user interface of only the indications of issues from the user-selected category includes displaying, for each such presented issue, a name of the respective issue and an indication of a quantity of occurrences of the respective issue; and the presentation by the user interface of only the indications of issues from the second user-selected category in addition to the user-selected category includes displaying, for each such presented issue, a name of the respective issue and an indication of a quantity of occurrences of the respective issue.

Embodiment A9 is a computer-implemented method, the computer-implemented method comprising: analyzing, by a computing system, webpages of a website to determine a current value for a quality score of the website, the current value for the quality score being less than a perfect value for the quality score; identifying, by the computing system, a plurality of issues with the website that result in the website not having the perfect value for the quality score, the plurality of issues including a particular issue that the computing system designates as a potential issue, the existence of the particular issue that is designated as a potential issue having a negative effect on the quality score; providing, by the computing system, information to cause a particular client device to display a user interface that presents: (i) an indication of the current value for the quality score; and (ii) indications of multiple issues of the plurality of issues, including an indication of the particular issue that is designated as a potential issue, each indication of an issue from the presented indications of multiple issues including text that describes the respective issue; receiving, by the computing system, an indication that user input at the particular client device selected the indication of the particular issue that is designated as a potential issue, from among the presentation by the particular client device of the indications of the multiple issues; providing, by the computing system, information to cause the particular client device to present an inquiry relevant to whether the particular issue is an actual issue, responsive to the user input having selected the indication of the particular issue; receiving, by the computing system, an indication that user input at the particular client device provided a response to the inquiry, the response indicating that the particular issue is not an actual issue; determining, by the computing system as a result of the response indicating that the particular issue is not an actual issue, an updated value for the quality score by removing the negative effect on the quality score that was provided by the particular issue before the particular issue was identified as not being an actual issue; and providing, by the computing system, information to cause the particular client device to update the user interface to change the indication of the current value for the quality score to an indication of the updated value for the quality score.

Embodiment A10 is the computer-implemented method of embodiment A9, wherein each indication of an issue from the presented indications of multiple issues includes an indication of a quantity of occurrences of the respective issue.

Embodiment A11 is the computer-implemented method of any one of embodiments A9 through A10, further comprising: providing, by the computing system responsive to determining that the particular issue is not an actual issue, information to cause the particular client device to update the user interface to remove the indication of the particular issue from the presentation of the indications of the multiple issues.

Embodiment A12 is the computer-implemented method of any one of embodiments A9 through A11, wherein each indication of an issue from the presented indications of multiple issues includes an icon that indicates whether the respective issue is an actual issue or whether the respective issue is a potential issue; prior to user input at the particular client device supplying the response to the inquiry, the icon for the indication of the particular issue indicates that the particular issue is designated as a potential issue; and responsive to user input at the particular client device supplying the response to the inquiry indicating that the particular issue is an actual issue, the computing system is configured to: change a designation of the particular issue from being a potential issue to being an actual issue; and provide information to cause the particular client device to update the user interface to change the icon for the indication of the particular issue from indicating that the particular issue is designated as a potential issue to indicating that the particular issue is designated as an actual issue.

Embodiment A13 is the computer-implemented method of any one of embodiments A9 through A12 wherein responsive to user input at the particular client device supplying the response to the inquiry indicating that the particular issue is an actual issue, the computing system is configured to leave the quality score as having the current value, leaving in effect the negative effect on the quality score that was provided by the particular issue.

Embodiment A14 is the computer-implemented method of any one of embodiments A9 through A13, wherein, responsive to user input at the particular client device supplying the response to the inquiry indicating that the particular issue is an actual issue and the computing system determining that user input addressed the issue, the computing system is configured to: determine a changed value for the quality score by removing the negative effect on the quality score that was provided by the particular issue before the particular issue was determined to be addressed; and provide information to cause the particular client device to update the user interface to change the indication of the current value for the quality score to an indication of the changed value for the quality score.

Embodiment A15 is the computer-implemented method of any one of embodiments A9 through A14, wherein, responsive to user input at the particular client device supplying the response to the inquiry indicating that the particular issue is an actual issue and the computing system determining that user input addressed the issue, the computing system is configured to: remove the indication of the particular issue from the presentation of the indications of the multiple issues.

Embodiment A16 is a system for identifying potential accessibility issues across a website, the system comprising: a website analysis server system to assess website quality; a particular client computing device to provide a graphical user interface (GUI) presenting information on website quality as determined by the website analysis server system, the particular client computing device being configured to: output the GUI on a display of the particular client computing device; present graphical elements in the GUI that each correspond to criteria that can be selected and used to identify potential issues in a website; receive user input indicating selection of at least one graphical element; and transmit the user input to the website analysis server system, the website analysis server system being configured to: receive the user input from the particular client computing device; identify a quality score of the website; predict an updated quality score of the website based on the user input, wherein the updated quality score is increased from the quality score of the website by a predetermined amount of points that corresponds to a quantity of points that the quality score of the website can gain if the user addresses the potential issues associated with the user-selected at least one graphical element; generate a graphical display of the updated quality score to be presented to the user at the particular client computing device, wherein the graphical display is a circle, wherein a first portion of a circumference of the circle is highlighted in a first manner, wherein a size of the first portion indicates the quality score of the website, wherein a second portion of the circumference of the circle is highlighted in a second manner, wherein the circle includes a target element in a location on the circumference of the circle that represents the updated quality score if the user addresses the potential issues associated with the user-selected at least one graphical element; and transmit the graphical display to the particular client computing device to be presented in a GUI display.

Embodiment A17 is the system of embodiment A16, wherein the location of the target element is some distance from a start of the first portion that represents the updated quality score.

Embodiment A18 is the system of any one of embodiments A16 through A17, wherein the web analysis server system is further configured to: receive second user input, from the particular client computing device, indicating selection of another graphical element; predict a second updated quality score of the website based on the user input, wherein the second updated quality score is increased from the quality score of the website by a predetermined amount of points that corresponds to a quantity of points that the quality score of the website can gain if the user addresses the potential issues associated with the another user-selected graphical element; update the graphical display of the second updated quality score, wherein the target element is positioned at a second location on the circumference of the circle that represents the second updated quality score if the user addresses the potential issues associated with the user-selected another graphical element, wherein the second location of the target element is some distance from a start of the first portion of the circumference of the circle that is equal to the second updated quality score; and transmit the updated graphical display to the particular client computing device to be presented in the GUI display.

Embodiment A19 is the system of any one of embodiments A16 through A18, wherein the web analysis server system is further configured to: identify a list of the potential issues associated with the user-selected at least one graphical element; and transmit, to the particular client computing device, the list of potential issues to be presented in the GUI display.

Embodiment A20 is the system of any one of embodiments A16 through A19, wherein the web analysis server system is further configured to: receive, from the particular client computing device, user input indicating selection of a potential issue in the list of potential issues; determine whether the selected potential issue is an actual issue based on performing an accessibility conformity test; generate output that updates the selected potential issue to an actual issue based on the determination of whether the selected potential issue is an actual issue; and transmit the output to the particular client computing device to be presented in the GUI display.

Embodiment A21 is the system of any one of embodiments A16 through A20, wherein determining whether the selected potential issue is an actual issue based on performing an accessibility conformity test comprises: successively presenting, at the particular client computing device, a series of accessibility questions that correspond to a type of the selected potential issue; receiving, from the particular client computing device, user input indicating responses to each of the questions as they are presented at the particular client computing device; determining, based on the user input, a next question to present in the series of accessibility questions; and determining, based on the user input indicating responses to each of the questions in the series of accessibility questions, that the potential issue is an actual issue.

Embodiment A22 is the system of any one of embodiments A16 through A21, wherein determining, based on the user input, a next question to present in the series of accessibility questions comprises: determining whether user input was provided in response to a series of accessibility questions that correspond to another potential issue that was previously selected, by the user, and assessed using the accessibility conformity test; skipping one or more questions in the series of accessibility questions based on determining that user input had been provided in response to the series of accessibility questions that correspond to another potential issue that was previously selected, by the user, and assessed using the accessibility conformity test; and presenting, at the particular client computing device, a next question in the series of accessibility questions based on the user input that had been previously provided.

Embodiment A23 is the system of any one of embodiments A16 through A22, wherein the web analysis server system is further configured to: receive, from the particular client computing device, user input to perform one or more operations to fix the actual issue; execute, based on the user input, the one or more operations; update the quality score of the website by a predetermined quantity of points that correspond to the actual issue being fixed; generate output that updates the actual issue to a resolved issue; and transmit the output and the updated quality score to be presented in the GUI display at the particular client computing device with the list of potential issues.

Embodiment A24 is the system of any one of embodiments A16 through A23, wherein the one or more operations include updating misspelling of a text element that appears in one or more webpages that are associated with the actual issue.

Embodiment A25 is the system of any one of embodiments A16 through A24, wherein the web analysis server system is further configured to: locally render and execute webpages of the website; crawl each webpage to identify HTML and CSS elements in the webpage; generate, for each webpage, a digest for each identified HTML and CSS element; identify a subset of webpages of the website having a digest that satisfies at least one criteria; and execute the one or more operations to each webpage in the subset of webpages, wherein each webpage in the subset of webpages is associated with the actual issue.

Embodiment A26 is the system of any one of embodiments A16 through A25, wherein each webpage in the subset of webpages has at least one same digest.

Embodiment A27 is the system of any one of embodiments A16 through A26, wherein each webpage in the subset of webpages has at least one similar digest.

Embodiment A28 is the system of any one of embodiments A16 through A27, wherein the at least one criteria is a similarity threshold.

Embodiment A29 is the system of any one of embodiments A16 through A28, wherein the web analysis server system is further configured to: receive, from the particular client computing device, user input indicating that at least one potential issue in the list of potential issues is not an actual issue; update the quality score of the website by a predetermined quantity of points that correspond to at least one potential issue being resolved; generate output that updates the at least one potential issue to a resolved issue; and transmit the output and the updated quality score to be presented in the GUI display at the particular client computing device with the list of potential issues.

Embodiment A30 is the system of any one of embodiments A16 through A29, wherein the list of potential issues further includes actual issues.

Embodiment A31 is the system of any one of embodiments A16 through A30, wherein the list of potential issues further includes resolved issues.

Embodiment A32 is the system of any one of embodiments A16 through A31, wherein the list of potential issues further includes actual issues and resolved issues.

Embodiment B1 is a computer-implemented method, comprising: analyzing, by a computing system, webpages of a website to determine a current value for a quality score of the website, the current value for the quality score being less than a perfect value for the quality score; identifying, by the computing system, a plurality of issues with the website that result in the website not having the perfect value for the quality score; providing, by the computing system, information to cause a particular client device to present: (i) a circle graphical element that indicates the current value for the quality score, wherein a first portion of the circle graphical element is presented in a first manner and a second portion of the circle graphical element is presented in a second manner, a size of the first portion indicating the current value for the quality score of the website, and (ii) indications of multiple categories of issues with the website, the multiple categories of issues including different respective sets of issues from the plurality of issues with the website; receiving, by the computing system, an indication that user input at the particular client device selected a user-selected category of the multiple categories of issues with the website; determining, by the computing system, a target value for the quality score that would result should the computing system determine that all issues within the user-selected category of issues are resolved, the target value for the quality score being less than the perfect value for the quality score; and providing, by the computing system responsive to receiving the indication that user input selected the user-selected category, information to cause the particular client device to modify a presentation of the circle graphical element to add a target element at a location that represents the target value for the quality score.

Embodiment B2 is the computer-implemented method of B1, wherein the location of the target element is some distance separated from a side of the first portion of the circle graphical element that represents the current value of the quality score.

Embodiment B3 is the computer-implemented method of any one of embodiments B1 through B2, wherein: the first portion of the circle graphical element comprises a first part of a circumference of the circle graphical element; the second portion of the circle graphical element comprises a second part of the circumference of the circle graphical element; and the second part of the circumference of the circle graphical element represents a remainder of the circumference of the circle graphical element that is unoccupied by the first part of the circumference of the circle graphical element.

Embodiment B4 is the computer-implemented method of any one of embodiments B1 through B3, further comprising: providing, by the computing system before the user input has selected the user-selected category, information to cause the particular client device to display a user interface that presents indications of issues from the plurality of issues with the website that result in the website not having the perfect value for the quality score; and providing, by the computing system responsive to receiving the indication that user input selected the user-selected category, information to cause the particular client device to modify the user interface from presenting the indications of the issues from the plurality of issues to presenting indications of issues only from the user-selected category of issues.

Embodiment B5 is the computer-implemented method of any one of embodiments B1 through B4, further comprising: receiving, by the computing system, an indication that user input at the particular client device selected, in addition to the user-selected category, a second user-selected category of the multiple categories of issues with the website; determining, by the computing system, an updated target value for the quality score that would result should the computing system determine that all issues within the user-selected category and all issues within the second user-selected category are resolved; and providing, by the computing system responsive to receiving the indication that user input selected the second user-selected category in addition to the user-selected category, information to cause the particular client device to modify the presentation of the circle graphical element to move the target element from: (i) the location that represents the target value for the quality score, to (ii) an updated location that represents the updated target value for the quality score.

Embodiment B6 is the computer-implemented method of any one of embodiments B1 through B5, further comprising: providing, by the computing system responsive to receiving the indication that user input selected the second user-selected category in addition to the user-selected category, information to cause the particular client device to modify the user interface from presenting indications of issues only from the user-selected category of issues to presenting indications of issues only from the user-selected category and the second user-selected category.

Embodiment B7 is the computer-implemented method of any one of embodiments B1 through B6, wherein: before user input selected the user-selected category, the user interface concurrently presented: (i) the circle graphical element without the target element, and (ii) the indications of issues from the plurality of issues; after user input selected the user-selected category and before user input selected the second user-selected category, the user interface concurrently presented: (i) the circle graphical element with the target element at the location that represents the target value, and (ii) the indications of issues only from the user-selected category; and after user input selected the second user-selected category in addition to the user-selected category, the user interface concurrently presented: (i) the circle graphical element with the target element at the updated location that represents the updated target value, and (ii) indications of issues only from the user-selected category and the second user-selected category.

Embodiment B8 is the computer-implemented method of any one of embodiments B1 through B7, wherein: the presentation by the user interface of the indications of issues only from the user-selected category includes displaying, for each such presented issue, a name of the respective issue and an indication of a quantity of occurrences of the respective issue; and the presentation by the user interface of the indications of issues only from the user-selected category and the second user-selected category includes displaying, for each such presented issue, a name of the respective issue and an indication of a quantity of occurrences of the respective issue.

Embodiment B9 is a computerized system, comprising: one or more processors; and one or more computer-readable devices including instructions that, when executed by the one or more processors, cause the computerized system to perform operations, including: analyzing, by a computing system, webpages of a website to determine a current value for a quality score of the website, the current value for the quality score being less than a perfect value for the quality score; identifying, by the computing system, a plurality of issues with the website that result in the website not having the perfect value for the quality score; providing, by the computing system, information to cause a particular client device to present: (i) a circle graphical element that indicates the current value for the quality score, wherein a first portion of the circle graphical element is presented in a first manner and a second portion of the circle graphical element is presented in a second manner, a size of the first portion indicating the current value for the quality score of the website, and (ii) indications of multiple categories of issues with the website, the multiple categories of issues including different respective sets of issues from the plurality of issues with the website; receiving, by the computing system, an indication that user input at the particular client device selected a user-selected category of the multiple categories of issues with the website; determining, by the computing system, a target value for the quality score that would result should the computing system determine that all issues within the user-selected category of issues are resolved, the target value for the quality score being less than the perfect value for the quality score; and providing, by the computing system responsive to receiving the indication that user input selected the user-selected category, information to cause the particular client device to modify a presentation of the circle graphical element to add a target element at a location that represents the target value for the quality score.

Embodiment B10 is a computer-implemented method, comprising: analyzing, by a computing system, webpages of a website to determine a current value for a quality score of the website, the current value for the quality score being less than a perfect value for the quality score; identifying, by the computing system, a plurality of issues with the website that result in the website not having the perfect value for the quality score, the plurality of issues including a particular issue that the computing system designates as a potential issue, an existence of the particular issue that is designated as a potential issue having a negative effect on the quality score; providing, by the computing system, information to cause a particular client device to display a user interface that presents: (i) an indication of the current value for the quality score; and (ii) indications of multiple issues of the plurality of issues, including an indication of the particular issue that is designated as a potential issue, each indication of an issue from the presented indications of multiple issues including text that describes the respective issue; receiving, by the computing system, an indication that user input at the particular client device selected the indication of the particular issue that is designated as a potential issue, from among the presentation by the particular client device of the indications of the multiple issues; providing, by the computing system, information to cause the particular client device to present an inquiry relevant to whether the particular issue is an actual issue, responsive to the user input having selected the indication of the particular issue; receiving, by the computing system, an indication that user input at the particular client device provided a response to the inquiry, the response indicating that the particular issue is not an actual issue; determining, by the computing system as a result of the response indicating that the particular issue is not an actual issue, an updated value for the quality score by removing the negative effect on the quality score that the particular issue had on the quality score before the particular issue was identified as not being an actual issue; and providing, by the computing system, information to cause the particular client device to update the user interface to change the indication of the current value for the quality score to an indication of the updated value for the quality score.

Embodiment B11 is the computer-implemented method of embodiment B10, wherein each indication of an issue from the presented indications of multiple issues includes an indication of a quantity of occurrences of the respective issue.

Embodiment B12 is the computer-implemented method of any one of embodiments B10 through B11, further comprising: providing, by the computing system responsive to the response indicating that the particular issue is not an actual issue, information to cause the particular client device to update the user interface to remove the indication of the particular issue from the presentation of the indications of the multiple issues.

Embodiment B13 is the computer-implemented method of any one of embodiments B10 through B12, wherein: each indication of an issue from the presented indications of multiple issues includes an icon that indicates whether the respective issue is an actual issue or whether the respective issue is a potential issue; prior to user input at the particular client device providing the response to the inquiry, an icon for the indication of the particular issue indicated that the particular issue is designated as a potential issue; and the computing system is configured such that, should the response to the inquiry have indicated that the particular issue was an actual issue in distinction to being not an issue, the computing system would: change a designation of the particular issue from being a potential issue to being an actual issue; and provide information to cause the particular client device to update the user interface to change the icon for the indication of the particular issue from indicating that the particular issue is designated as a potential issue to indicating that the particular issue is designated as an actual issue.

Embodiment B14 is the computer-implemented method of any one of embodiments B10 through B13, wherein the computing system is configured such that, should the response to the inquiry have indicated that the particular issue was an actual issue in distinction being not an issue, the computing system would leave the quality score as having the current value, leaving in effect the negative effect on the quality score that the particular issue had provided when the particular issue was designated as a potential issue.

Embodiment B15 is the computer-implemented method of any one of embodiments B10 through B4, wherein the computing system is configured such that, should the response to the inquiry have indicated that the particular issue was an actual issue in distinction to being not an issue and the computing system determined that user input addressed the issue, the computing system would: determine a changed value for the quality score by removing the negative effect on the quality score that the particular issue had provided before the particular issue was determined to be addressed; and provide information to cause the particular client device to update the user interface to change the indication of the current value for the quality score to an indication of the changed value for the quality score.

Embodiment B16 is the computer-implemented method of any one of embodiments B10 through B15, wherein the computing system is configured such that, should the response to the inquiry have indicated that that particular issue was an actual issue in distinction to being not an issue and the computing system determined that user input addressed the issue, the computing system would remove the indication of the particular issue from the presentation of the indications of the multiple issues.

Embodiment B17 is a system for identifying potential accessibility issues across a website, the system comprising: a website analysis server system to assess website quality; a particular client computing device to provide a graphical user interface (GUI) presenting information on website quality as determined by the website analysis server system, the particular client computing device being configured to: output the GUI on a display of the particular client computing device; present graphical elements in the GUI that each correspond to criteria that can be selected and used to identify potential issues in a website; receive user input indicating selection of at least one graphical element; and transmit the user input to the website analysis server system, the website analysis server system being configured to: receive the user input from the particular client computing device; identify a quality score of the website; predict an updated quality score of the website based on the user input, wherein the updated quality score is increased from the quality score of the website by a predetermined amount of points that corresponds to a quantity of points that the quality score of the website can gain if the user addresses the potential issues associated with the user-selected at least one graphical element; generate a graphical display of the updated quality score to be presented to the user at the particular client computing device, wherein the graphical display is a circle, wherein a first portion of a circumference of the circle is highlighted in a first manner, wherein a size of the first portion indicates the quality score of the website, wherein a second portion of the circumference of the circle is highlighted in a second manner, wherein the circle includes a target element in a location on the circumference of the circle that represents the updated quality score if the user addresses the potential issues associated with the user-selected at least one graphical element; and transmit the graphical display to the particular client computing device to be presented in a GUI display.

Embodiment B18 is the system of embodiment 17, wherein the web analysis server system is further configured to: receive second user input, from the particular client computing device, indicating selection of another graphical element; predict a second updated quality score of the website based on the user input, wherein the second updated quality score is increased from the quality score of the website by a predetermined amount of points that corresponds to a quantity of points that the quality score of the website can gain if the user addresses the potential issues associated with the another user-selected graphical element; update the graphical display of the second updated quality score, wherein the target element is positioned at a second location on the circumference of the circle that represents the second updated quality score if the user addresses the potential issues associated with the user-selected another graphical element, wherein the second location of the target element is some distance from a start of the first portion of the circumference of the circle that is equal to the second updated quality score; and transmit the updated graphical display to the particular client computing device to be presented in the GUI display.

Embodiment B19 is the system of any one of embodiments B17 through B18, wherein the web analysis server system is further configured to: receive, from the particular client computing device, user input indicating selection of a potential issue in a list of potential issues presented in the GUI display of the particular client computing device; determine whether the selected potential issue is an actual issue based on: successively presenting, at the particular client computing device, a series of accessibility questions that correspond to a type of the selected potential issue; receiving, from the particular client computing device, user input indicating responses to each of the questions as they are presented at the particular client computing device; determining, based on the user input, a next question to present in the series of accessibility questions; and determining, based on the user input indicating responses to each of the questions in the series of accessibility questions, that the selected potential issue is an actual issue; generate output that updates the selected potential issue to an actual issue; and transmit the output to the particular client computing device to be presented in the GUI display.

Embodiment B20 is the system of any one of embodiments B17 through B19, wherein the web analysis server system is further configured to: receive, from the particular client computing device, user input indicating that at least one potential issue in the list of potential issues is not an actual issue; update the quality score of the website by a predetermined quantity of points that correspond to at least one potential issue being resolved; generate output that updates the at least one potential issue to a resolved issue; and transmit the output and the updated quality score to be presented in the GUI display at the particular client computing device with the list of potential issues.

The devices, system, and techniques described herein may provide one or more of the following advantages. For example, the disclosed techniques can provide user-friendly visual depictions of a current, target quality score of a website to assist the customer in prioritizing and addressing quality issues in the website. The visual depictions can make it easy and simple for the customer to determine which quality issues may have a significant impact on compliance with accessibility standards. The customer can rely on the visual depictions to prioritize quality issues to improve and maintain continuous compliance with accessibility standards.

As another example, the disclosed techniques provide for applying previous user input to ACT questions to diagnose new potential issues in order to efficiently and quickly determine whether those new potential issues are actual issues. Therefore, the computer system can determine whether the potential is an actual issue without presenting all the questions in a question set or making the customer go through the same set of questions again. The disclosed techniques can thus speed up the process for identifying actual quality issues in the website, which can assist the customer to quickly and efficiently review potential issues in their website, respond to actual issues, improve overall quality of the website (as well as the overall quality score), improve user experiences with the website, and maintain continuous conformity with accessibility standards.

Similarly, the disclosed techniques provide for maintaining continuous conformance with accessibility standards. Rather than being a static check, the disclosed techniques dynamically check if elements or linked elements in a webpage are altered. Regardless of whether potential issues have become actual or resolved issues for that webpage, if an element in the webpage is changed, then the webpage can be sent back to services of the computer system to check again for any potential issues. Thus, the website can be continuously checked to ensure it complies with accessibility standards.

Moreover, website scores can be determined in an efficient and consistent way. Analyzing quality of an entire website and its content across multiple different factors can use a large number of processor cycles. The technology described herein permits for the number of processor cycles that are used to determine a website's score to be minimized, thus optimizing the processing efficiency of the score determination. Additionally, efficiencies that are gained permit for real-time, dynamic website assessments and scores to be generated, which can allow customers to evaluate the current version of their sites, to respond more quickly to decreased quality and compliance with accessibility standards, and to improve user experiences with the website.

In another example, while website quality is a fairly subjective factor that can be difficult to assess and/or to compare across different websites, the website scoring and assessment techniques described throughout this disclosure provide a standardized and objective way for website quality and compliance with accessibility standards to be quantified. Such quantification can provide a variety of advantages, such as permitting the quality of a website to be readily compared and tracked over time, and/or permitting the quality of different websites to be readily compared to each other. Additionally, website quality and accessibility compliance can be comprehensively determined across an entire site and reduced to an easily understandable metric. Without such a metric, it would be difficult for a customer to manage and improve their website, which may have multitudes of pages and content that are not able to be readily digested, analyzed, and improved upon without additional guidance.

In another example, graphical user interfaces (GUIs) and specific GUI features can be provided to assist customers in readily and quickly understanding a website's score and accessibility compliance, as well as ways for a customer to identify actual issues from potential issues and fix the actual issues with the website. For example, graphical features can be presented to visually and textually identify particular potential issues and walk the customer through an accessibility review process (e.g., ACT, as described throughout this disclosure) for those potential issues. Such GUI features can permit for complex information to be presented in a simplified manner, permitting for it to be provided on a single screen that can readily be reproduced on a mobile computing device and/or other smaller form factor display.

In another example, information about specific website characteristics can be provided, including identifying characteristics that can be changed to improve the website's score and maintain accessibility compliance. This can help customers continuously improve their website's quality, maintain accessibility compliance, and enhance user engagements and experiences with the website. Additionally, by automatically and dynamically identifying features that can be improved, the disclosed systems and techniques can assist the customer to more efficiently improve the website, correct any potential issues, and achieve and maintain accessibility compliance.

The details of one or more implementations are set forth in the accompanying drawings and the description below. Other features and advantages will be apparent from the description and drawings, and from the claims.

BRIEF DESCRIPTION OF THE DRAWINGS

FIG. 1F is an example GUI for displaying information about a particular potential issue in a website.

FIGS. 2A-B are example GUIs for displaying a list of potential issues in a website.

FIGS. 5A-I are an example series of questions for determining whether one or more potential issues in a website are actual issues

FIGS. 7A-C is a flowchart of a process for identifying and addressing actual issues in a website.

FIG. 10 is a schematic diagram that shows an example of a computing device and a mobile computing device.

Like reference symbols in the various drawings indicate like elements.

DETAILED DESCRIPTION OF ILLUSTRATIVE EMBODIMENTS

This document generally relates to assessing quality of a website. The disclosed techniques can provide for designating and visually depicting target values of a quality score for the website based on user-selection of one or more categories of accessibility compliance metrics. The disclosed techniques also provide ACT, which can guide evaluation of a potential quality issue (e.g., accessibility issue) in the website to determine whether it is in fact an actual issue that can and should be addressed or not an issue (e.g., a resolved issue). Any changes that are made to an element or linked element associated with a potential, actual, or resolved issue in a webpage can cause the webpage to be sent back into reevaluation with ACT. This provides for dynamic assessment of the website to ensure the website remains in continuous compliance with accessibility standards.

The quality score for the website can also be dynamically updated as potential issues become actual issues and then actual or potential issues become resolved issues. Moreover, when a potential issue in one webpage of the website is identified as actual or resolved, other same potential issues across the website can also be updated accordingly. Similarly, when the customer fixes an actual issue in one webpage, a computer system can implement that fix across all other webpages in the website having the same issue. Therefore, overall quality of the website (and the overall quality score) can dynamically and quickly improve as the website achieves and maintains accessibility compliance.

Figure 1A:
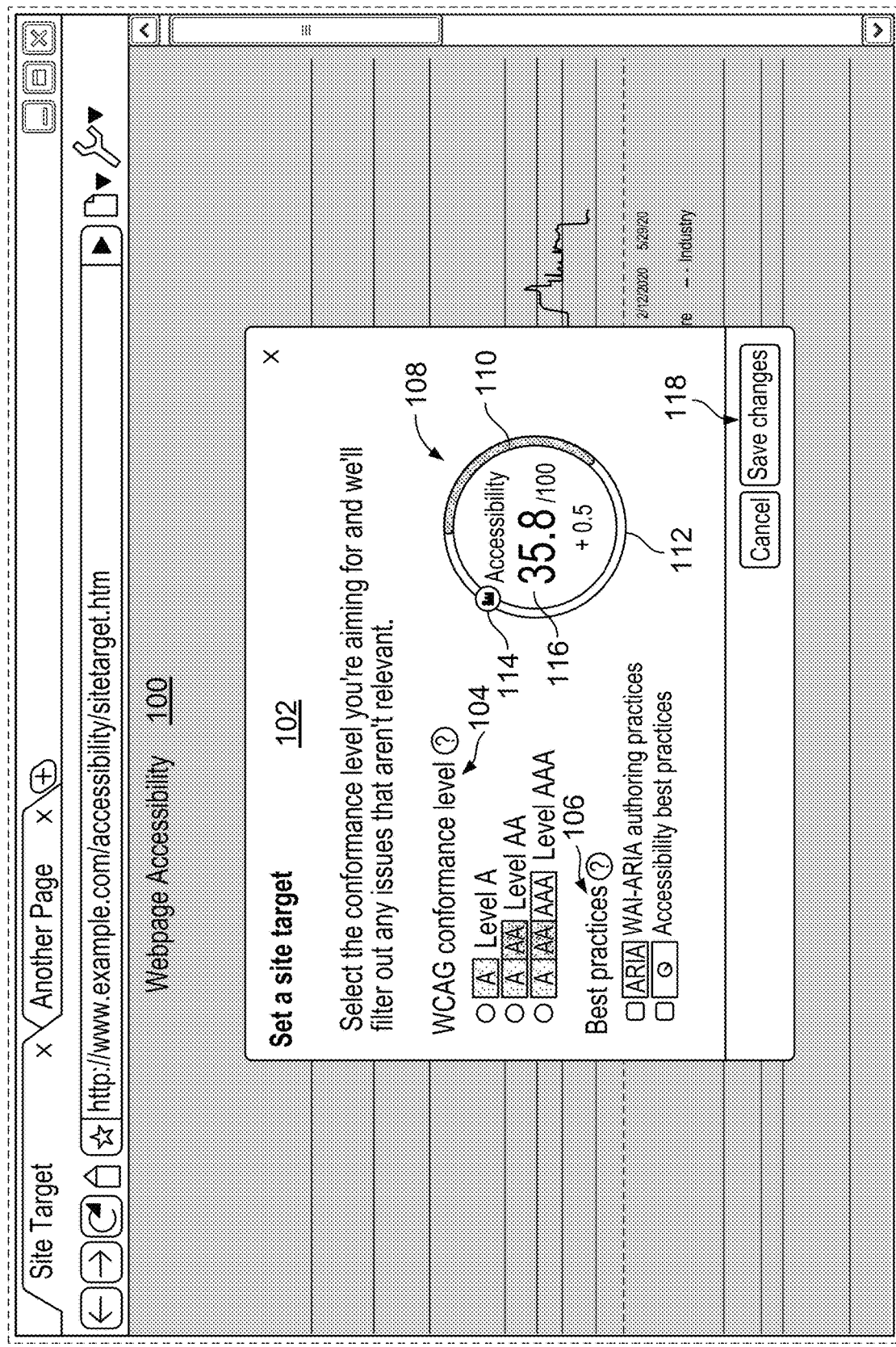
FIG. 1A is an example GUI for displaying a current value of a quality score for a website.

Referring to the figures, FIG. 1A is an example GUI for displaying a current value of a quality score for a website. A web analysis server system (e.g., refer to web analysis server system 902 in FIG. 9) can provide customers, such as website owners, with different types of services for creating, reviewing, analyzing, and updating websites. The services can be used to assess website quality. The services may also be used to determine website compliance with accessibility standards. The services can be presented in a web browser at a client computing device of the customer (e.g., refer to client computing device 904 in FIG. 9). The customer can toggle between different modules/tools presented in the web browser to review and respond to different aspects of the customer's website.

In FIG. 1A, the customer has loaded a webpage accessibility module 100 in their web browser. Within the webpage accessibility module 100, the customer selected a selectable option/button to "Set a site target," which causes a pop out window 102 to be presented over a portion of the webpage accessibility module 100. The pop out window 102 provides information about categories of accessibility compliance that can be achieved in the customer's website. The pop out window 102 also provides a visual indication 108 of current quality score of the customer's website.

Figure 1B:
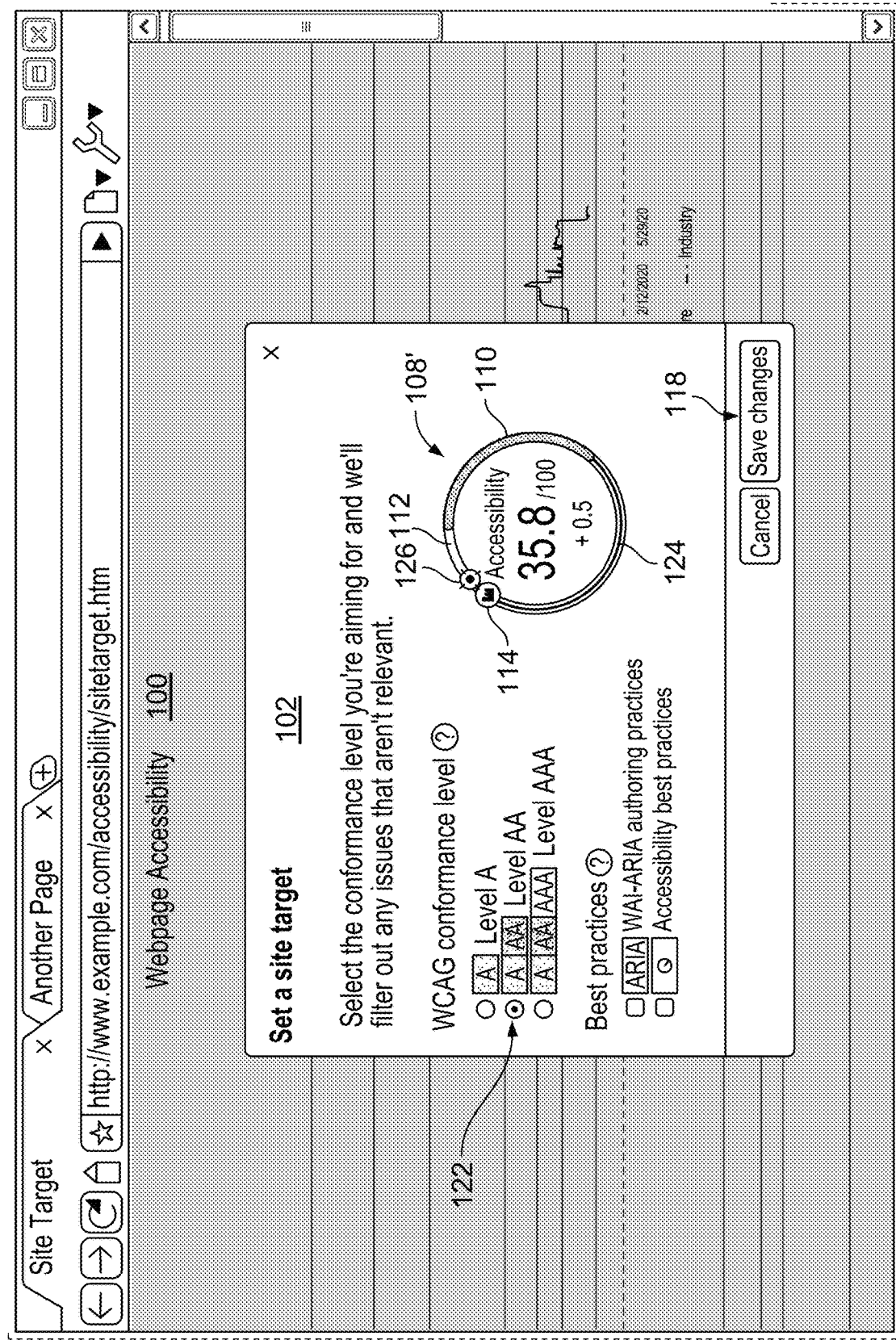
FIGS. 1B-C are example GUIs for displaying a target value of the quality score for the website of FIG. 1A.

The customer can select one of "WCAG conformance level" options 104 and/or at least one of "Best practices" options 106 to view a visual indication of a target quality score of the customer's website in the pop out window 102 (e.g., refer to FIG. 1B). The customer can also select option 118 to "Save changes." Saving changes that are made in the pop out window 102 can cause the webpage accessibility module 100 to update a list of accessibility issues and other analytics about the customer's website. For example, the webpage accessibility module 100 may only present issues that are associated with the user selected options 104 and/or 106.

By selecting one of the options 104 and/or at least one of the options 106 in the pop out window 102, the customer is indicating what accessibility issues in their website they are aiming to address (e.g., resolve, fix) or considering to address. Accordingly, the web analysis server system can determine the target quality score of the customer's website based on an assumption that the customer will address all of the issues associated with the one selected option 104 and/or the at least one selected option 106. As described herein, the web analysis server system can determine the target quality score by retrieving quantities of points associated with each issue that is tagged with a conformance level that is selected by the customer. The web analysis server system can then add the retrieved quantities of points to the current quality score of the website to determine the target quality score of the website if the customer fixes all of the tagged issues.

The web analysis server system can then present the target quality score of the customer's website in the pop out window 102 to assist the customer in visualizing and understanding how overall quality of their website may increase by addressing particular accessibility issues in the website (e.g., refer to FIG. 1B). The visualization of the target quality score can help the customer determine which particular issues, or categories of issues, the customer should focus on to have a greatest positive impact on the overall quality of the website.

Here, the "WCAG conformance level" options 104 include "Level A," "Level AA," and "Level AAA" conformance levels. "Level A" is a subset of "Level AA" and designed to be easy twenty-five conformance criteria to meet, without much impact on website design and/or structure. "Level AA" requires an additional thirteen criteria to be met. "Level AAA" requires an additional twenty-three criteria to meet on top of "Level AA." The "Level A" conformance level corresponds to issues in the website that have been tagged with "A" type issues. The "Level AA" conformance level corresponds to issues in the website that have been tagged with "A" and/or "AA" type issues. The "Level AAA" conformance level corresponds to issues in the website that have been tagged with "A," "AA," and/or "AAA" type issues.

The "Best practices" options 106 includes "WAI-ARIA authoring practices" and "Accessibility best practices." The "WAI-ARIA authoring practices" corresponds to progress with WAI-ARIA authoring practices, which is improving accessibility of dynamic content and user interface components in a webpage. The "Accessibility best practices" corresponds to progress with general best practices for accessibility.

The visual indication 108 of the current quality score of the customer's website is a circle. A numeric value 116 indicating the current quality score can be depicted at a center of the visual indication 108. The web analysis server system can receive a quality score value that has been generated for the particular website by one or more web analysis services. In some implementations, the quality score can be a historic quality score that corresponds to a level of accessibility for the website.

The numeric value 116 of the current quality score is 35.8/100, which can be the quality score retrieved by the web analysis server system. Therefore, in terms of accessibility compliance, the customer's website has a quality score of 35.8 points out of 100 points. The current quality score (35.8/100 points) is also depicted on the visual indication 108.

The visual indication 108 includes a bar 110 that extends a distance around a circumference 112 of the visual indication 108. The bar 110 extends a distance that equates to the current quality score of the website. In this example, the bar 110 extends 35.8% around the circumference 112 of the visual indication 108 to visually demonstrate that that the current quality score of the website is 35.8/100. The bar 110 can be represented in an indicia, such as a color, that distinguishes the bar 110 from the circumference 112 of the visual indication 108. For example, the bar 110 can be represented in a color such as orange. 64.2% of the circumference 112, or a portion of the circumference 112 that is not covered by the bar 110, can be represented in a second indicia, such as a grey color. The portion of the circumference 112 that is not covered by the bar 110 can equate to an amount of points that the current quality score is missing in order to achieve a perfect score of 100. Here, since the current quality score of the website is 35.8/100, the current quality score is missing 64.2 points, and thus 64.2% of the circumference 112 is represented in the second indicia.

The visual indication 108 further includes an icon 114 at some distance around the circumference 112 of the circle. A location of the icon 114 corresponds to an industry average quality score. Thus, the icon 114 represents an average quality score of other websites that are determined to be similar to the customer's website based on industry and geographic region (e.g., country) information.

Figure 1C:
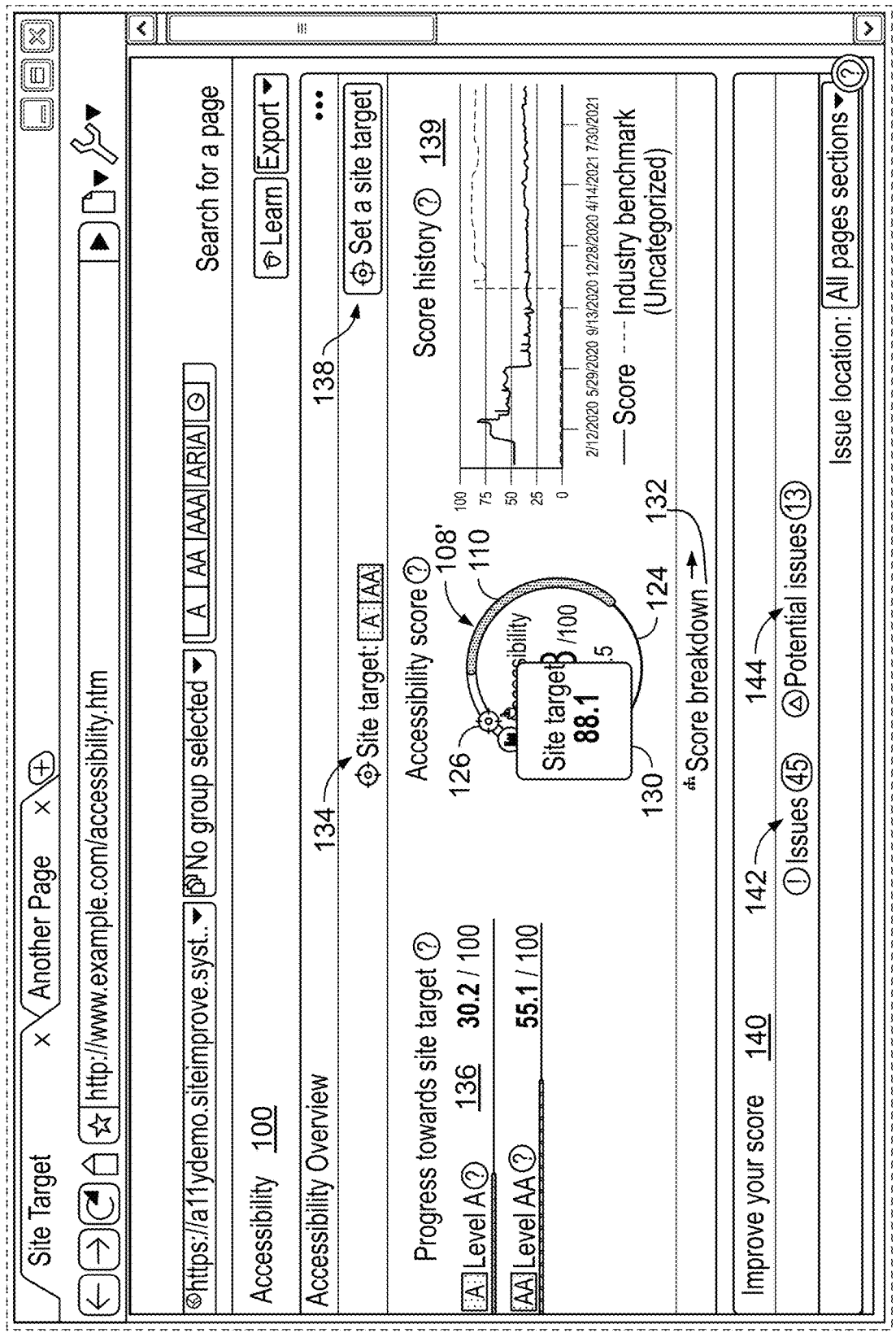

FIGS. 1B-C are example GUIs for displaying a target value of the quality score for the website of FIG. 1A. In FIG. 1B, the customer has selected "Level AA" option 122. The web analysis server system can receive an indication of this user selection and retrieve, from a data store, (i) issues that are tagged with "A" and/or "AA" issue types and (ii) quantities of points that the quality score can increase/decrease for each of the issues. The web analysis server system can update the pop out window by presenting visual indication 108' of a target quality score for the website.

The visual indication 108' still includes the bar 110, which equates to the current quality score of 35.8/100. However, the visual indication 108' has been updated to include a bar 124 that extends along a distance of the circumference 112 that equates to a total amount of points that can be added to the current quality score if the customer resolves all of the retrieved issues (e.g., all issues that correspond to the customer selection of the "Level AA" option 122). The visual indication 108' also includes a target 126 (e.g., bulls eye) that is positioned somewhere along the circumference 112 that equates to the target quality score of the website. The target 126 can include a tooltip (e.g., refer to FIG. 1C), which can display a numeric value of the actual target quality score of the website. As shown in FIG. 1B, the target 126 is close to where the bar 110 begins along the circumference 112 and the portion of the circumference 112 that is not covered by either the bars 110 or 124 is relatively small. This is a visual indication that the quality score of the website can be improved by a significant amount of points if the customer addresses all the issues that correspond to the selected "Level AA" option 122.

The bar 124 can be represented in a different indicia than the bar 110 and the circumference 112 to provide a user-friendly visual indication of how the current quality score of the website is target to improve and by how many points. For example, the bar 124 can be represented in a color, such as blue. The bar 124 can also be thinner in width than the bar 110. One or more other indicia can be used to visually distinguish the bar 110, the bar 124, and the circumference 112 of the visual indication 108'.

Once the customer reviews the visual indication 108' and determines that they want to pursue focusing on issues that correspond to the selected "Level AA" option 122, the customer can select option 118 to save this selection and the target quality score for the website. Selecting the option 118 can cause the web analysis server system to update the webpage accessibility module 100 accordingly, as depicted and described in FIGS. 1C-D.

FIG. 1C depicts the webpage accessibility module 100 once it is updated based on the customer selection of the "Level AA" option 122 in FIG. 1B. The module 100 can include "Progress towards site target" section 136, the visual indication 108' of the target quality score for the website, a "Score history" graph 139, and an "Improve your score" section 140. The module 100 can also include a selectable option (e.g., button) 138 to "Set a site target." Selecting the option 138 can cause the web analysis server system to present the pop out window 102 over a portion of the module 100, as described in reference to FIGS. 1A-B.

The "Progress towards site target" section 136 can visually depict a breakdown of quantity of points gained per category of issues being addressed. The section 136 can be updated in real-time as associated issues are addressed and resolved. Here, the section 136 includes a first bar for "Level A" issues and a second bar for "Level AA" issues. A portion of each of the bars can be represented in an indicia that equates to a quantity of points of "Level A" issues that are gained and a quantity of points of "Level AA" issues that are gained, respectively. The indicia can be a different color based on the score. For example, quantity of points gained that are within a predetermined range that indicates good progress can be represented in a first color, such as green. Quantity of points gained that are within a second predetermined range that indicates okay progress can be represented in a second color, such as yellow or orange. Quantity of points gained that are within a third predetermined range that indicates poor progress can be represented in a third color, such as orange or red.

In the example of FIG. 1C, the score of "WCAG conformance" is within the third predetermined range, and thus a portion of the respective bar is represented in an orange color. The quantity of points gained so far for "Level A" issues is 30.2/100, so 30.2% of the respective bar is represented in an orange color. The quantity of points gained so far for "Level A" issues is within the second predetermined range, and thus a portion of the respective bar is represented in a yellow color. The quantity of points gained so far for "Level AA" issues is 55.1/100 points, so 55.1% of the respective bar is represented in a yellow color.

The visual depiction 108' is represented in the module 100 as described in reference to FIG. 1B. The visual depiction 108' can also be displayed with site target 134, which can indicate what conformance level(s) the customer selected in FIG. 1B. Here, the site target 134 is "A" and "AA" issues, which corresponds to the customer selection of the "Level AA" option 122 in FIG. 1B. The visual depiction 108' is also presented with a selectable "Score breakdown" option 132. Selecting the option 132 can cause the web analysis server system to present additional information about a score breakdown for the target quality score, such as information presented in FIG. 1E. The additional information can be presented in a pop out window in the module 100. The additional information can also be presented in another graphical user interface (GUI) display and/or module in the web browser.

The customer can hover over the target 126 in the visual depiction 108' in order to view a numeric value that indicates the target quality score of the website. The numeric value indicating the target quality score can be presented in a pop out window 130. The pop out window 130 can overlay a portion of the visual indication 108'. Here, the pop out window 130 includes text stating "Site target" and the numeric value of 88.1. This indicates that if the customer addresses all accessibility issues that are associated with the "Site target" 134, then the target quality score of the website would be 88.1, up from the current quality score of the website of 35.8. Moreover, as described in reference to FIG. 1B, the target 126 is positioned along the circumference of the visual indication 108' that equates to the target quality score. The target 126 is therefore located at a location that is 88.1% around the entire distance of the circumference of the visual indication 108'. Similarly, the bar 124 extends a distance from the bar 110 to the location of the target 126 such that a total distance covered by the bars 124 and 126 equates to the target quality score of 88.1.

Still referring to the module 100 in FIG. 1C, the "Score history" graph 139 can demonstrate how the quality score of the website changed over time relative to quality scores of other websites (e.g., industry competitor websites).

Figure 1D:
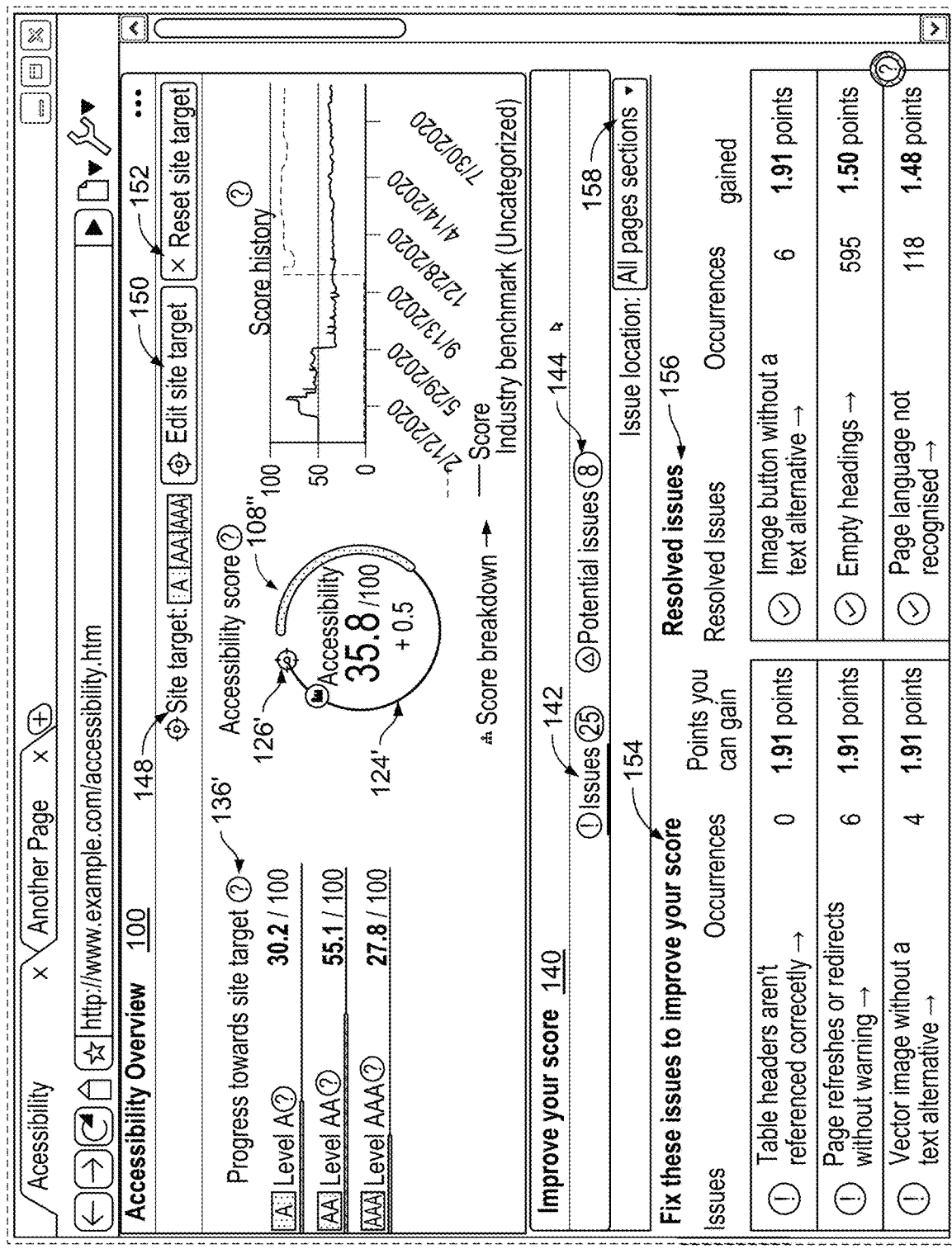
FIG. 1D is an example GUI for displaying information to improve a current value of a quality score for a website to a target value of the quality score for the website.

The "Improve your score" section 140 can include an "Issues" tab 142 and a "Potential issues" tab 144. The customer can select the tab 142 to cause the web analysis server system to populate the section 140 with a list of actual issues that have been identified in the website and that correspond to the "Site target" 134. Refer to FIG. 1D for additional discussion on displaying actual issues. The customer can select the tab 144 to cause the web analysis server system to populate the section 140 with a list of potential issues that have been identified in the website and that correspond to the "Site target" 134.

Each of the tabs 142 and 144 can include one or more visual elements. For example, the "Issues" tab 142 can include a red exclamation point in a circle to visually indicate actual issues that have been identified and should be addressed by the customer. The red exclamation point in the circle can also be presented alongside any actual issue that is displayed in the list of issues in the section 140 and throughout the module 100 and/or other services/modules that are provided by the web analysis server system. Such consistent visual elements can be user-friendly and visually appealing indicators of a type of issue. The "Issues" tab 142 can also include an indication of a total quantity of actual issues that have been identified. In the example of FIG. 1C, forty-five actual issues have been identified. "45" is represented in a visual element in the tab 142 to alert the customer of how many actual issues are present.

The "Potential issues" tab 144 can include an orange triangle in a circle to visually indicate potential issues that have been identified. The web analysis server system can sometimes identify an issue as potential because the system is uncertain whether it's actually an issue. The customer can be prompted to review potential issues (such as by answering a series of questions about content in a webpage having the potential issue). The customer's review of a potential issue can be used by the web analysis server system to determine whether the potential issue is an actual issue (and thus should be displayed in the "Issues" tab 142) or a resolved issue (and thus should be marked as a resolved issue and removed from the tab 144). Refer to FIGS. 2-5 for additional discussion about determining whether potential issues are actual issues.

The orange triangle in the circle can also be presented alongside any potential issue that is displayed in the list of issues in the section 140 and throughout the module 100 and/or other services/modules that are provided by the web analysis server system. Such consistent visual elements can be user-friendly and visually appealing indicators of a type of issue. The "Potential issues" tab 144 can also include an indication of a total quantity of potential issues that have been identified. In the example of FIG. 1C, thirteen potential issues have been identified. "13" is represented in a visual element in the tab 144 to alert the customer of how many potential issues are present.

FIG. 1D is an example GUI for displaying information to improve a current value of a quality score for a website to a target value of the quality score for the website. In the example of FIG. 1D, the customer has selected "Level AAA" as the "WCAG conformance level" option 104 in FIGS. 1A-B. As a result, information in the webpage accessibility module 100 has been updated accordingly. For example, updated "Progress towards site target" section 136' now includes a third bar representing a quantity of points gained for "Level AAA" issues. Here, 27.8/100 points have currently been gained by resolving issues that are tagged as "Level AAA." The customer has not made additional progress on issues that are tagged as "Level A" or "Level AA" issues An updated visual indication 108" now includes target 126' in a position that equates to a target quality score of the website if all Level A, AA, and AAA issues are addressed. The visual indication 108" also includes bar 124' which now extends to the new location of the target 126'. A "Site target" 148 is also displayed with the visual indication 108". The "Site target" 148 demonstrates that Level A, AA, and AAA issues are being assessed.

In the "Improve your score" section 140, the customer has selected the "Issues" tab 142. In this example, twenty-five actual issues have been identified and eight potential issues have been identified. Selecting the "Issues" tab 142 caused the web analysis server system to populate the section 140 with tables 154 and 156.

Table 154 is entitled "Fix these issues to improve your score." The table 154 can therefore present actual issues that the customer can address in order to gain more points on the current quality score of the website (which is 35.8). The table 154 can list a name of each issue, a number of occurrences of the issue throughout the website, and a quantity of points that can be gained (e.g., added to the current quality score of the website) by fixing the issue.

Table 156 is entitled "Resolved issues." The table 156 presents issues that have been resolved. Issues can become resolved if they were actual issues that the customer fixed. Issues can also become resolved if they were potential issues and the customer identified those potential issues as not being issues at all. The table 156 can list a name of each resolved issue, a number of occurrences of that issue throughout the website, and a quantity of points that have been gained by resolving the issue. The points that have been gained can be added to the respective Level A, AA, and/or AAA points in the "Progress towards site target" section 136'. Moreover, as shown in the table 156, resolved issues can also include a graphical element of a green checkmark in a circle.

As shown in the tables 154 and 156, points to gain can be weighted differently depending on the type of issue. As an illustrative example, the quality score of the website can increase by 1.9 points every time that a Level A issue is resolved. One or more ratios can also be used to determine how many points are gained by fixing/resolving a particular issue. An example ratio can be, for example, a quantity of elements in the website having the particular issue versus a total count that the element appears in the website (regardless of whether the element has the issue or not).

The section 140 can also include an "Issue location" dropdown menu 158. The customer can select an option from the dropdown menu 158 to sort what issues are presented in the tables 154 and 156. More particularly, the customer can select what location or locations in the website by which to sort the issues in the tables 154 and 156. The locations can be different segments in a webpage of the website. A computer system, such as the web analysis server system described herein, can be configured to identify and group sections of webpages of the website into one or more segments. The segments can include, for example, header, footer, meta data, and page content segments. Then, the customer can sort the issues in the tables 154 and 156 based on what segment(s) the issues are located in. Here, the customer has selected "All page sections." Thus, the tables 154 and 156 include actual issues and resolved issues, respectively, regardless of what segment(s) they appear in the webpages of the website. Other selectable options from the dropdown menu 158 can include header, footer, metadata, and page content.

Figure 1E:
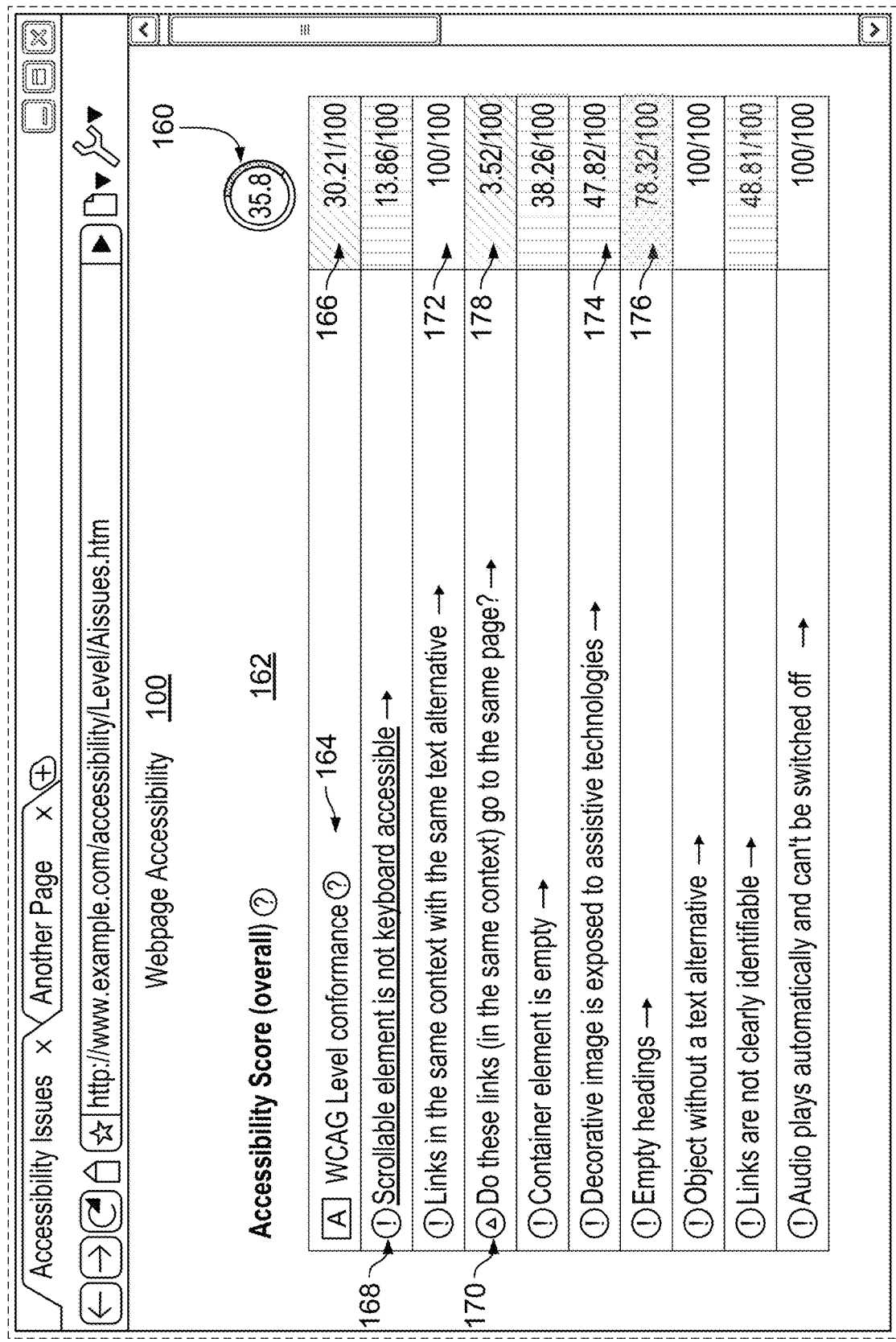
FIG. 1E is an example GUI for displaying a particular category of issues that can be resolved to improve a current value of a quality score for a website.

FIG. 1E is an example GUI for displaying a particular category of issues that can be resolved to improve a current value of a quality score for a website. The customer may view (e.g., sort, group, filter) all accessibility issues in the website based on conformance level within the webpage accessibility module 100. The GUI depicted in FIG. 1E can be presented once the user selects the "Score breakdown" option 132 in the module 100 (e.g., refer to FIGS. 1C-D).

The current quality score of the website described in FIGS. 1A-D can be depicted with visual indication 160, as described herein. The module 100 can also include a table 162 indicating all actual and potential issues that are tagged as "Level A" issues. The table 162 includes an entry 164 for "WCAG Level A conformance" with a score 166. The score 166 represents a current quality score for the website that is attributed to Level A compliance. Here, the score 166 is 30.21/100. Thus, the website is relatively low in compliance with Level A issues, which means the website may have a large amount of actual and/or potential issues that are not yet resolved but identified as Level A issues. The score 166 can be an aggregation (e.g., sum, average) of all scores for individual Level A issues that are presented in the table 162.

The score 166 can also be visually depicted in an indicia that corresponds to the numeric value of the score 166. For example, a score can be represented in one or more varying shades of color depending on the numeric value of the score. A score that is good (e.g., within some predetermined threshold range) can be visually depicted in a green box while a score that is poor can be visually depicted in a red box. A score within one or more other predetermined threshold ranges can also be depicted in boxes of varying colors. The differently colored boxes can be user-friendly, thereby making it easy and quick for the customer to review entries in the table 162 and prioritize addressing the issues in the table 162 (e.g., the customer may prioritize issues that include scores in red boxes and may not address issues having scores in green boxes).

Here, the score 166 is represented in a red box, which can indicate that the score 166 is low. This can serve as an indicator to the customer that more Level A issues should be addressed/fixed. As the customer addresses the Level A issues in the table 162, the score 166 can be dynamically updated in real-time to reflect points that are gained by fixing each of the Level A issues.

Each issue presented in the table 162 may be selectable and include a descriptive title/name, a graphical element, and a score visually depicted in an indicia. As described in reference to FIG. 1C, the graphical element can be a red exclamation point in a red circle 168, which can be designated for actual issues. The graphical element can also be an orange triangle in a circle 170, which can be designated for potential issues. Placement and use of the graphical elements 168 and 170 in the table 162 can be beneficial to provide a user-friendly interface and make it easy for the customer to quickly pick out issues that can and/or should be addressed.

As mentioned above with regards to the score 166, each issue score in the table 162 can be similarly depicted in indicia that corresponds to the numeric value of such score. The indicia can beneficially be user-friendly and thus assist the customer in quickly identifying which issues in the table 162 should be prioritized and addressed. For example, the second issue in the table, "Links in the same content with the same text alternative" is an actual issue and has a score 172 of 100/100. Thus, the score 172 is visually depicted in a green box. The score 172 of 100/100 indicates that the issue has been resolved. In this table 162, the resolved issue may still be depicted as an issue, but the score 172 can reflect that the issue has been resolved.

Another issue in the table 162 entitled "Decorative image is exposed to assistive technologies" is another actual issue that has a score 174 of 47.82/100. The score 174 can fall within some predetermined threshold score range for determining an indicia for visually depicting the score. Hence, the score 174 is visually depicted in an orange box.

Another issue in the table 162 entitled "Empty headings" is an actual issue that has a score 176 of 78.32/100. The score 176 can fall within another predetermined threshold score range for determining an indicia for visually depicting the score. Hence, the score 176 is visually depicted in a yellow box. The yellow color can indicate that the customer is getting closer to a perfect score of 100/100, which is represented in a green color. The yellow color can become varying shades of orange and then red based on how much further away the issue's score is from the perfect score of 100/100.

For example, an issue in the table 162 entitled "Do these links (in the same context) go to the same page?" is a potential issue. Hence, this issue's brief description/title is a question that is intended to prompt the customer to review the issue and verify whether or not it is an actual issue. This issue has a score 178 of 3.52/100. The score 178 is visually depicted in a red box because the score 178 has a very low numeric value. The low score 178 can prompt the customer to prioritize review of this potential issue over other issues in the table 162. 96.48 points can be held back for this potential issue to prompt the customer to review and verify the issue so that the web analysis server system can categorize it as an actual issue or a resolved issue. Once the customer reviews and verifies, a quantity of points can be added to the score 178, which may act as an incentive for the customer to take the next steps in fixing and resolving the issue (assuming the issue is verified to be an actual issue). When the customer selects this potential issue in the table 162, the webpage accessibility module 100 can be updated to present a web interface or another GUI display for performing Accessibility Conformance Testing (ACT), as described further below in FIGS. 2-5.

FIG. 1F is an example GUI for displaying information about a particular potential issue in a website. When the customer selects an issue that is presented in the table 162 in FIG. 1E, the webpage accessibility module 100 can be updated to present an issue review GUI 180 in the web browser at the customer's client computing device. The issue review GUI 180 can explain an actual or potential issue. The issue review GUI 180 can also provide guidance to access the actual webpage and make any corrections, modifications, or other changes to the webpage(s) associated with the issue. In the example of FIGS. 1E-F, the customer has selected the first issue in the table 162 entitled "Scrollable element is not keyboard accessible." Therefore, the issue review GUI 180 shown in FIG. 1F corresponds to this selected issue. Whenever the customer selects an issue (e.g., an actual issue or a potential issue) in the table 162 of FIG. 1E, an updated issue review GUI 180 can be presented to the user with corresponding information about the selected issue, as shown in FIG. 1F.

The issue review GUI 180 can present information such as a conformance level 182, points to gain 184, quantity of pages with the issue 186, number of occurrences 188 of the issue across the website, difficulty level 190, and responsibility 192. In brief, the conformance level 182 indicates what accessibility level (e.g., A, AA, AAA) the issue is associated with. The issue in FIG. 1F is a level A issue. The points to gain 184 indicates how many points the overall quality score of the website, or the score 160 in FIG. 1E, will increase by fixing the issue. Here, the customer's quality score can increase by 1.65 points once the customer fixes the issue in FIG. 1F. The quantity of pages with the issue 186 indicates how many pages across the website have the issue. Here, three webpages have the issue in FIG. 1F. The number of occurrences 188 indicates how many times the issue appears across the website. Sometimes, for example, the issue can be identified in one webpage but there can be more than one occurrence of the issue. This is because the issue appears multiple times within the one webpage. In the example of 1F, there are three occurrences of the issue.

The difficulty level 190 can be a visual depiction of how challenging it may be to fix the issue. The difficulty level 190 can be beneficial for the customer to decide how to prioritize fixing the issue relative to other issues and who to assign to fixing the issue. The more advanced or difficult, the more experienced user may be assigned to fixing the issue. Here, the issue in FIG. 1F has a difficulty level of "Intermediate" and is thus represented by two filled in circles out of four circles. A first circle can be green and a second circle can be orange. Each of the circles can be filled in with a particular color for that circle. For example, if the difficulty level 190 is "Advanced" or something similar, all four circles can be filled in, the third circle can be a darker shade of orange and the fourth circle can red. One or more other indicia (e.g., colors, patterns, shapes, etc.) can be used to visually depict the difficulty level 190 in a user-friendly way.

Finally, the responsibility 192 can indicate what type of role should be assigned to fixing the issue, which can help the customer make fast and accurate decisions about how to prioritize review of the issue relative to other issues. Here, the issue in FIG. 1F has a "Development" responsibility, meaning someone with expertise in website development can be assigned to fix this issue; this is not a content-based issue related to content writing and/or editing, for example.

The issue review GUI 180 can also include a "Description" section 194 that describes the issue presented therein and provides information for the customer to learn more about the issue and what effect the issue has on user experiences of end users who visit the website. The GUI 180 may also include a "Related to this issue" section 196, which can include selectable links to one or more other issues in the website that are similar (e.g., tagged similarly, having the same conformance level, same type of issue, same responsibility, similar impact on user experiences, etc.). Here, only one issue is related, which is "Scrollable element is not keyboard accessible (1 occurrence)." This issue has been resolved, which is demonstrated by a green checkmark in a circle graphical element. The customer may select this issue to view additional information about the issue. Selecting this resolved issue can cause the web analysis server system to update the issue review GUI 180 to present information about the resolved issue. The customer may desired to review the resolved issue to determine how they resolved this similar issue in the past. This can help the customer make informed decisions about how to resolve the issue currently presented in the GUI 180 in FIG. 1F.

In some implementations, the "Related to this issue" section 196 can include selectable links for issues that are actual and/or potential. The customer can also select any of those issues in the section 196 to cause the web analysis server system to update the issue review GUI 180 with related information for the selected issue. This interactivity can be beneficial to provide a user-friendly interface and ease of navigation for the customer between issues. Therefore, the customer can quickly and efficiently address various issues that are similar.

The issue review GUI 180 can also include a table 198 for "Pages with this issue." The customer can select any of the entries in the table 198 to go to the respective webpage and review/address the issue therein. The table 198 can include columns for attributes including but not limited to "Title," "URL," "Occurrences," and "Page views." The customer can sort the entries in the table 198 by any of these attributes. Each entry in the table 198 may also include a selectable button for refreshing the corresponding information presented in the table 198. Selecting the refresh button can cause the corresponding webpage to be re-crawled such that most updated HTML and/or CSS structure of the webpage is collected and used to update the "Occurrences," "Page views," and other information associated with the webpage. Selecting the refresh button can also cause the web analysis server system described herein to determine whether the webpage has been fixed and thus no longer is associated with the issue. If the webpage has been fixed, the table 198 can be updated by removing the webpage entry from the table 198.

The customer may also filter what entries are presented in the table 198 using selectable options 199A-N. Selectable option 199A can be a dropdown menu that allows the customer to select what page or group of pages to present in the table 198. For example, the customer can select "All pages," "Ready to review" pages, or "Pending update" pages. The "All pages" selection presents all webpages in the table 198. The "Ready to review" selection presents webpages in which potential issues review has been completed for some occurrences and remaining occurrences of the potential issues may still be reviewed. The "Pending update" selection presents webpages in which the potential issues review has been completed but the webpages still need to be updated to determine whether the customer's answers to the potential issues review questions removed the occurrences of the potential issue from the particular webpage. When "Pending update" is selected, the table 198 can be updated to reflect an updated number of occurrences. Here, the customer has selected "All pages" from the selectable option 199A. Selectable option 199B can be a dropdown menu that allows the customer to select to search for webpages based on URL or webpage title/name. Here, the customer has selected "URL." Selectable option 199N can be a text input field that allows the customer to provide input indicating a particular URL or webpage title/name to search for and display in the table 198. Here, since the customer selected "URL" in the option 199B, the customer can enter a particular webpage URL into the option 199N, the particular webpage URL representing the webpage (or webpages) that the customer would like to see in the table 198. The table 198 can be updated accordingly by the web analysis server system and presented in the issue review GUI 180.

Figure 2B:
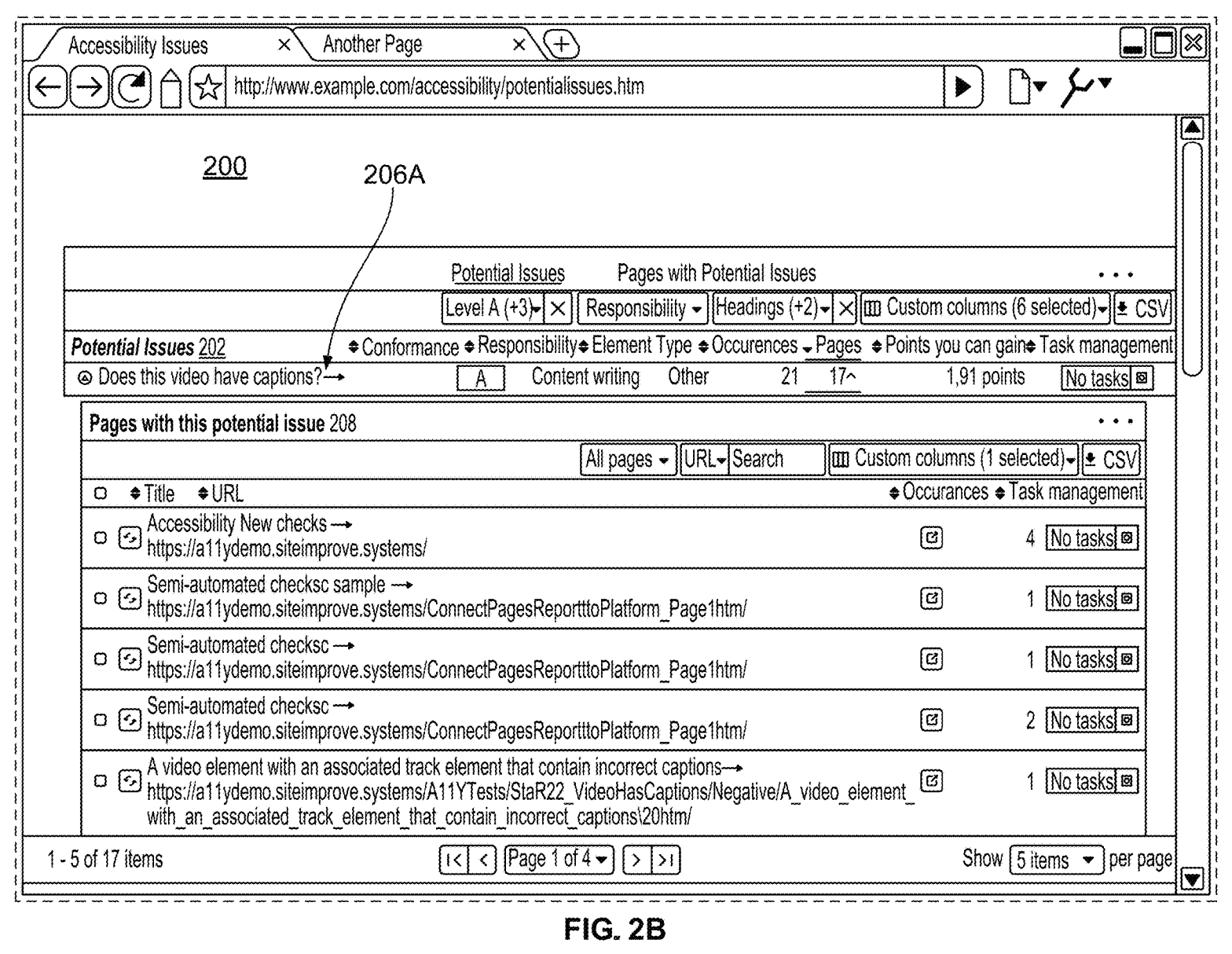

FIGS. 2A-B are example GUIs for displaying a list of potential issues in a website. As described herein, the web analysis server system can identify potential issues, which are issues that should be verified by the customer to determine whether the issues are actual issues that need to be fixed in the website. The potential issues can be reviewed and verified using accessibility conformity testing (ACT), which provides a semi-automated approach to presenting questions to the customer and receiving responses that can be used to identify standardized accessibility issues as actual issues in the website. Refer to FIGS. 3-5 for additional discussion about ACT and various question sets that can be used depending on the potential issue.

The webpage accessibility module 100 described in FIGS. 1A-F can include a selectable option (such as in a menu, toolbar, and/or other location in the module 100) to view a list of potential issues that have been identified for the customer's website. Selecting the option can cause the web analysis server system to present a potential issues GUI 200 in the web browser at the customer's client computing device. In some implementations the information shown in FIGS. 2A-B can be presented within a section, or multiple sections, in the webpage accessibility module 100 depicted and described in FIGS. 1A-F.

Referring to the FIG. 2A, the potential issues GUI 200 can present all identified potential issues in a table 202. Each issue (an entry in the table 202) can include a graphical element (the orange triangle in the circle) and a title/brief description. The title of the issue can be posed as a question to indicate to the customer that the web analysis server system identified the issue as a potential issue and thus is not certain whether the issue is an actual issue until the customer reviews the issue. The title of the issue can also be a selectable link that, when selected by the customer, causes the web analysis server system to open/present another GUI display in the web browser for reviewing the selected issue and verifying whether the potential issue is an actual issue. Refer to FIGS. 3-5 for additional discussion.

The table 202 can include columns for attributes that include "Potential issues," "Conformance," "Responsibility," "Element type," "Occurrences," "Pages," and "Points you can gain." The customer can sort the table 202 by any one or more of "Conformance," "Responsibility," "Element type," "Occurrences," "Pages," and "Points you can gain." In brief, the "Potential issues" is the graphical element and the title of the potential issue. The "Conformance" attribute indicates an accessibility conformance level by which the particular potential issue is associated. The "Responsibility" attribute indicates what role may be preferred for reviewing and/or addressing the potential issue. The "Element type" attribute indicates what particular aspect or element of a webpage involves the potential issue. The "Occurrences" attribute indicates a total amount of times the potential issue appears throughout the website. The "Pages" attribute indicates a total number of pages having the potential issue. The "Pages" attribute may also include a dropdown arrow for each potential issue entry, which can cause the entry in the table 202 to expand, as shown in FIG. 2B. The "Points you can gain" attribute indicates a total amount of points that the quality score of the website would increase if the customer addresses the potential issue.

The customer may filter what potential issues appear in the table 202 using selectable options 204A-N. Selections made for any of the options 204A-N can cause the web analysis server system to update the table 202 accordingly and present the updated table 202 in the GUI 200. Option 204A can allow the customer to select a conformance level by which to filter the entries in the table 202. Here, the customer has selected "Level A (+4)" in the option 204A. The customer can also select other conformance levels from the option 204A, such as "Level A," "Level AAA," "ARIA," and "Best practices." The conformance level shown in option 204A can also be default selected by the web analysis server system described herein based on the site target that is chosen and described in reference to FIGS. 1A-D. Therefore, the default filter for the table 202 can be "Level AA" actual and potential issues, which is based on customer selection of "Level AA" issues in the pop out window 102 shown and described in FIG. 1B. The customer can then change what conformance level to filter by in the option 204A. However, if the customer refreshes their web browser or leaves the GUI 200 and returns to it at another time, the default conformance level will be selected by the web analysis server system, which is based on customer selection of site target described herein.

Option 204B allows the customer to select a responsibility by which to filter the entries in the table 202. For example, the customer can select amongst options including but not limited to "Development," "Content writing," and "Visual design." The options may also include one or more customized, customer-generated responsibilities that may be specific to the customer's organization/enterprise. Option 204N can allow the customer to select an element type by which to filter the entries in the table 202. For example, the customer can select amongst options including but not limited to "Forms," "Headings," "Images," "Page layout," "Links," "Tables," and "Other."

As described above, selection of any of the issues presented in the table 202 can cause the web analysis server system to present a new GUI in the web browser of the customer's client computing device, as described in reference to FIGS. 3A-E.

Referring to FIG. 2B, when the customer selects the arrow in the "Pages" attribute for any entry in the table 202, the table 202 can be updated to include a table 208 of "Pages with this potential issue." Here, the customer has clicked on the down arrow in the "Pages" attribute for potential issue 206A, "Does this video have captions?" The table 202 has thus been expanded to include table 208 beneath the selected potential issue 206A. The table 208 can have similar or same attributes as the table 198 described above. Refer to the table 198 in FIG. 1F for additional discussion about the table of other webpages having the same issue.

Figure 3A:
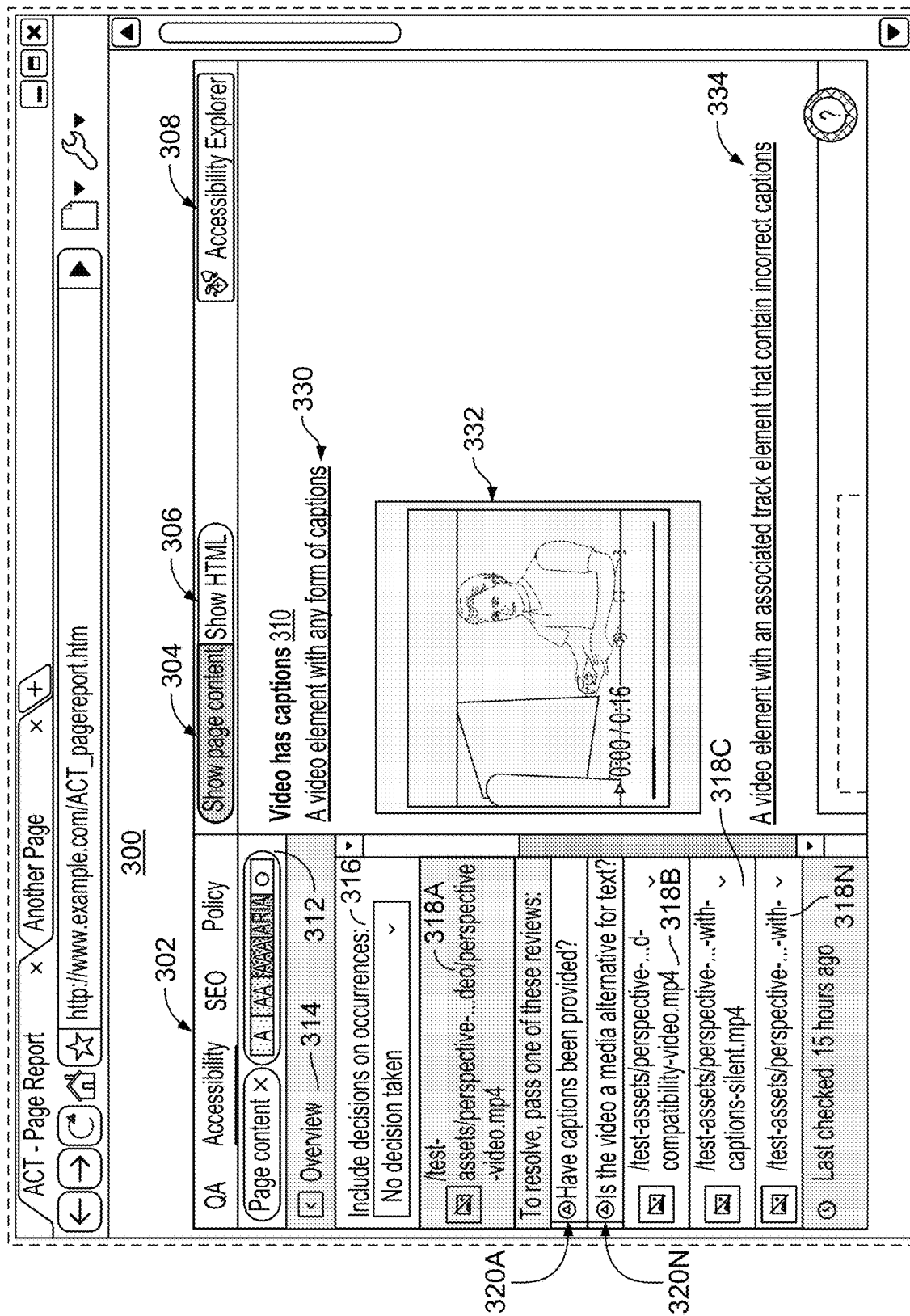
FIG. 3A is an example GUI for displaying potential issues associated with an element in a webpage of a website.

FIG. 3A is an example GUI for displaying potential issues associated with an element in a webpage of a website. FIG. 3A depicts a GUI 300 for addressing one or more potential issues that were presented in the potential issues GUI 200 described in FIG. 2. For example, the customer may select the second issue in the table 202 in FIG. 2, entitled "Does this video have captions?" Selection of this issue causes the web analysis server system to present the GUI 300 in the web browser of the customer's client computing device. The GUI 300 can be a webpage report module that provides the customer with information about the issue that was selected from the table 202 and/or additional issues associated with the webpage presented in the GUI 300. In some implementations, the GUI 300 can be presented in the web browser at the customer's client computing device when the customer selects an option presented in the webpage accessibility module 100 of FIGS. 1A-F to view potential issues for a particular webpage.

The GUI 300 can include a menu 302 (described further below), a "Show page content" option 304, a "Show HTML" option 306, an "Accessibility Explorer" option 308, and a webpage review section 310. The customer can toggle between the options 304 and 306 to view page content or HTML code/elements of a particular webpage in the section 310. The customer's selection can be presented in the menu 302 within section 312, discussed further below.

Selecting the "Accessibility Explorer" option 308 can cause the web analysis server system to test one or more different color experiments on the rendered page content of the particular webpage. When running these color tests, various content/elements in the webpage can be presented in different colors in the GUI 300, thereby making the display of the webpage user-friendly. This can be beneficial to assist the customer in understanding why color matters in terms of accessibility.

The web analysis server system can render the page content of the particular webpage in the section 310. The section 310 can present particular elements in the page content of the webpage that contain the potential issues. Thus, the section 310 may not render the entire webpage as it may appear to an end user. Therefore, the section 310 can provide a simple and user-friendly interface that aids the customer to focus on particular aspects (e.g., elements) of the webpage that has potential issues to review and verify.

As shown in the GUI 300, the menu 302 can present multiple selectable options to the customer. For example, the customer can toggle between different web analysis services provided by the web analysis server system, such as quality assurance ("QA"), "Accessibility," "SEO," and "Policy."

Here, the customer has selected the "Accessibility" tab. Thus, the menu 302 is populated with information pertaining to the accessibility service.

The menu 302 includes section 312, which indicates filters that might have been selected for reviewing potential issues in a particular webpage. Here, the customer has selected "Page content" and potential issues corresponding to all conformance levels. Therefore, the menu 302 can include a list of all potential issues that relate to page content and any conformance level for the particular webpage.

An "Overview" section 314 in the menu 302 can include a decisions section 316, elements 318A-N in the particular webpage having potential issues, and potential issues 320A-N corresponding to each of the elements 318A-N.

The decisions section 316 is a filter to allow the customer to filter occurrences of the potential issue based on what decision (e.g., action) can be or has been taken in relation to a particular occurrence of the potential issue presented in the GUI 300. For example, the customer can select "Dismissed as can't fix," "Dismissed as false positive," or "No decision taken" in the decisions section 316. Selecting "Dismissed as can't fix" can cause all occurrences of the potential issue that the customer identified as being dismissed for inability to fix to be presented in the GUI 300. Selecting "Dismissed as false positive" can cause the web analysis server system to present all occurrences of the issue that the customer identified as being dismissed because the occurrence was a false positive. Similarly, selecting "No decision taken" can cause the web analysis server system to present all occurrences of the issue in which the customer has not taken any action/response.

Each of the elements 318A-N can be presented in the section 310 of the GUI 300. Moreover, each of the elements 318A-N can include a selectable dropdown arrow in the "Overview" section 314 in the menu 302. Selecting the dropdown arrow for a particular element 318A-N can cause the web analysis server system to present the corresponding potential issues 320A-N for the particular element 318A-N within the "Overview" section 314 in the menu 302. The customer can then select any of the potential issues 320A-N to review and verify that issue. For example, selecting one of the potential issues 320A-N can cause the web analysis server system to update the GUI 300 to present a series of ACT questions to the customer that can be used to diagnose the potential issue, as described in reference to FIGS. 3B-E.

Referring to the webpage review section 310, when the customer selects one of the potential issues 320A-N, the section 310 can be updated to include information about the selected issue. For example, in the example of FIG. 3A, the customer selected the issue 320A, entitled "Have captions been provided?" The section 310 includes a title "Video has captions" and a description 330. The title and description are text that appear on the customer's website when it is live and presented in a web browser of an end user's device. The title and description can be generated by the customer when creating and/or editing their webpage.

The section 310 also includes a video element 332, which contains the potential issue of whether captions have been provided for the video (e.g., potential issue 320A). The customer can then review the video element 332 that is associated with the selected potential issue 320A. In some implementations, the customer can select the description 330 to be presented a series of ACT questions to answer in order to determine whether the potential issue 320A is an actual issue. Refer to FIGS. 3B-E for additional discussion.

As shown in the section 310, multiple elements and their associated potential issues can be presented to the customer. For example, another description 334, "A video element with an associated track element that contain incorrect captions," is presented after the description 330 and the corresponding video element 332. The Customer can select the description 334 to review the potential issue(s) associated with that description.

Figure 3B:
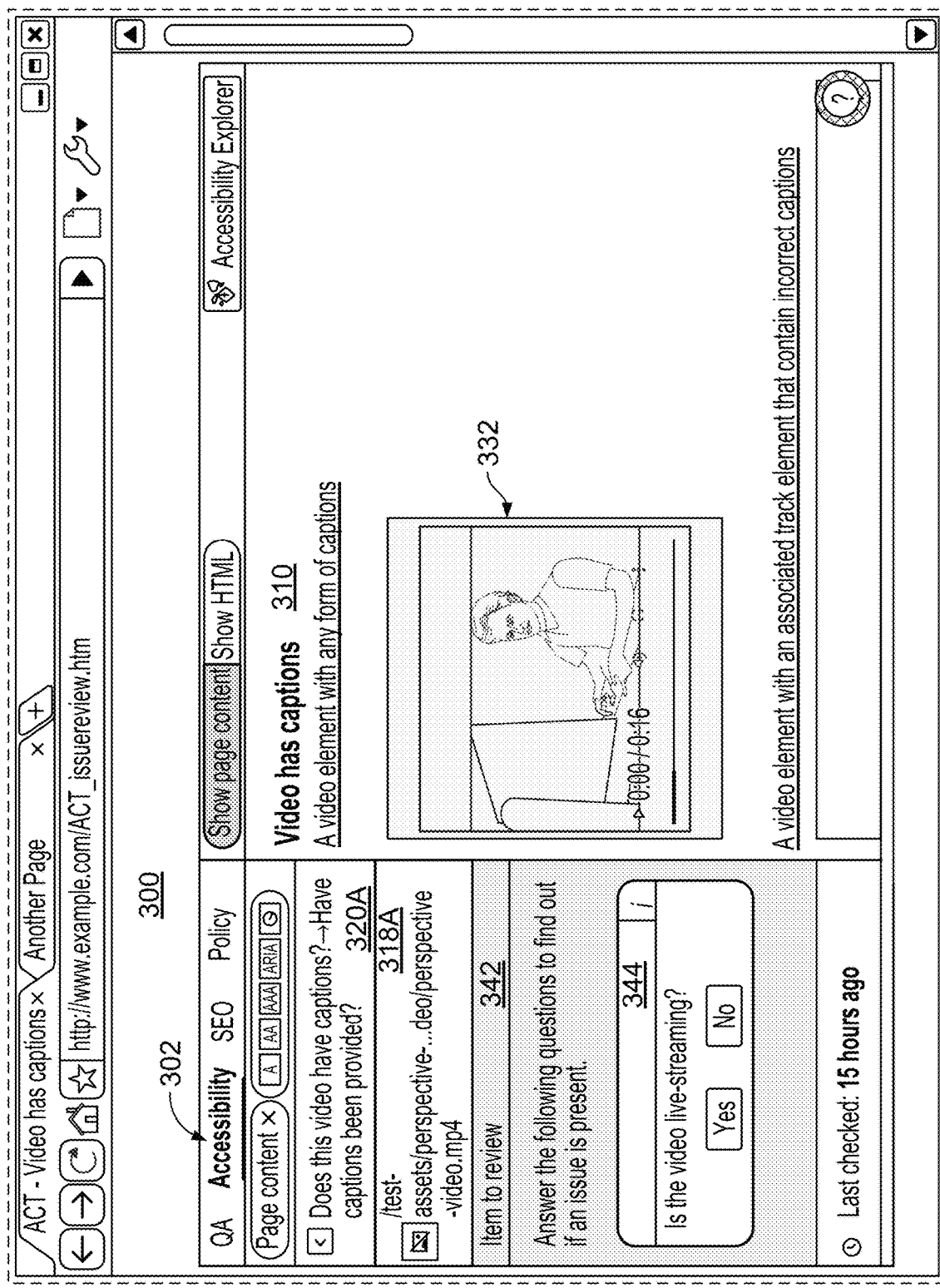
FIGS. 3B-C is an example GUI for displaying a series of questions about a particular potential issue in the webpage of FIG. 3A to determine whether the particular potential issue is an actual issue.
Figure 3C:
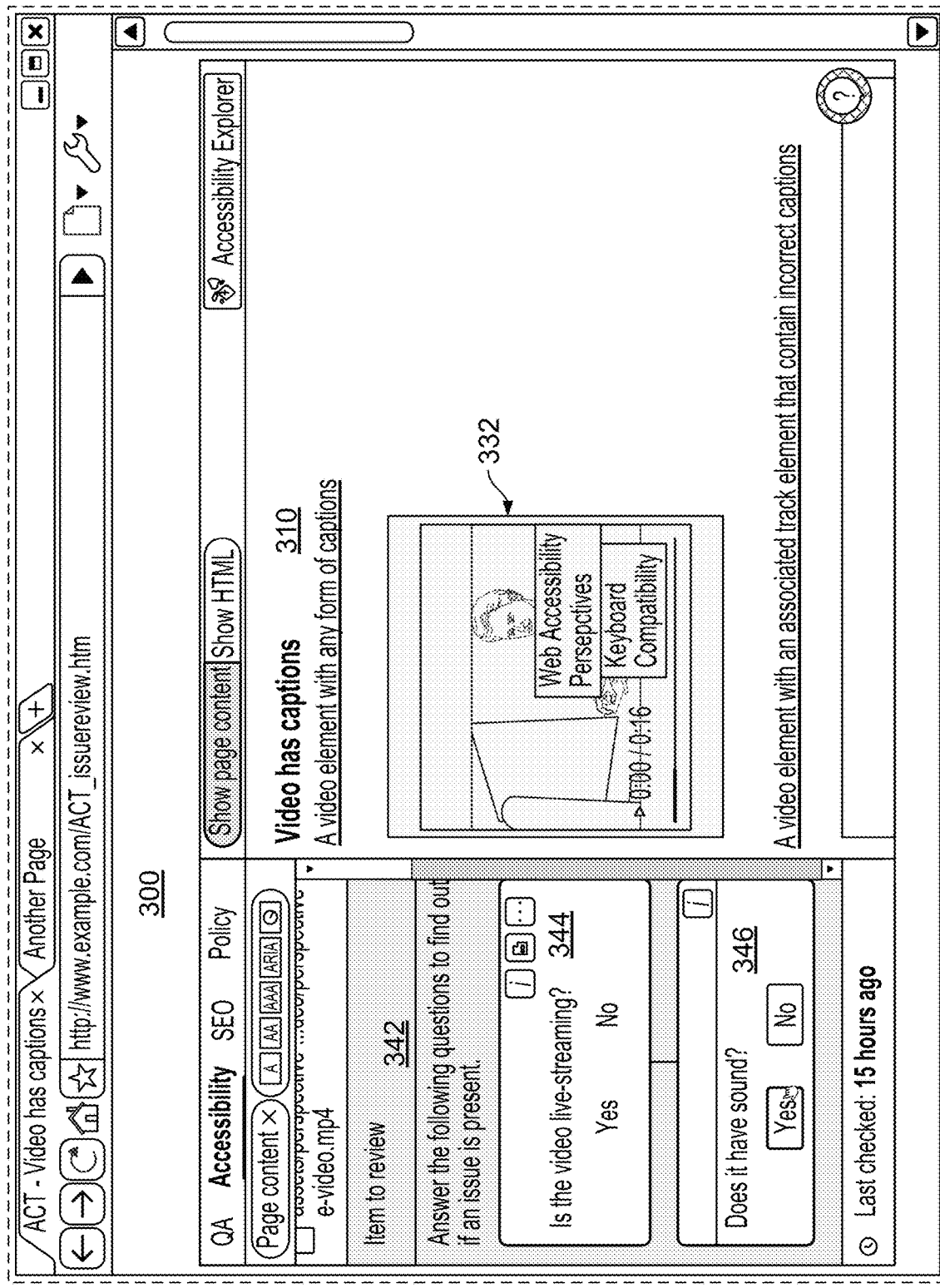

FIGS. 3B-C is an example GUI for displaying a series of questions about a particular potential issue in the webpage of FIG. 3A to determine whether the particular potential issue is an actual issue. Referring to both FIGS. 3B-C, the customer has selected the potential issue 320A in FIG. 3A, which is "Have captions been provided?" The web analysis server system has updated the menu 302 to include the potential issue 320A, the particular element 318A having the potential issue 320A, and an "Item to review" section 342. ACT questions can be presented in the section 342. The questions can be presented one by one.

The web analysis server system can determine which questions to present to the customer based on the customer's answer(s) to prior questions, such as answers to questions presented for the current potential issue or past potential issues. The questions are dynamic, and are based on customer-specified answers to previous questions. Therefore, questions and/or answers can be remembered, by the web analysis server system, and not re-asked for a separate but similar potential issue.

For example, if the customer has previously responded to similar questions for a similar potential issue, the web analysis server system can use those previous responses to determine what questions to present for the current potential issue. This can be beneficial so that the customer does not have to remember prior responses. Moreover, this can speed up the review process of a potential issue since the web analysis server system may present fewer questions to the customer during review of the current potential issue. The web analysis server system may select which questions to present from a set of questions that are determined for the particular type of issue and/or a particular type of element (e.g., videos having sound can have a same set of questions regarding captions). Therefore, each type of potential issue may be assigned a variety of questions of which the web analysis server system can select and present a subset of those questions to the customer for purposes of diagnosing the potential issue.

In FIG. 3B, a first question 344 has been presented in the "Item to review" section 342. The question 344 is "Is the video live-streaming?" The customer can select an option for "Yes" or an option for "No" in response to the question 344. The customer's selection can be used by the web analysis server system to determine a next question to present in the section 342. The customer can play or otherwise review the video element 332 in the section 310 to determine whether the video is live-streaming.

FIG. 3C demonstrates that the customer has selected the "No" option in response to the question 344. The web analysis server system has determined that, based on this response, a second question 346 is presented in the section 342. The question 346 states, "Does it have sound?" The customer can select an option for "Yes" or an option for "No" in response to the question 346. Again, the customer can play or otherwise review the video element 332 in the section 310 to determine whether there is sound.

Figure 3D:
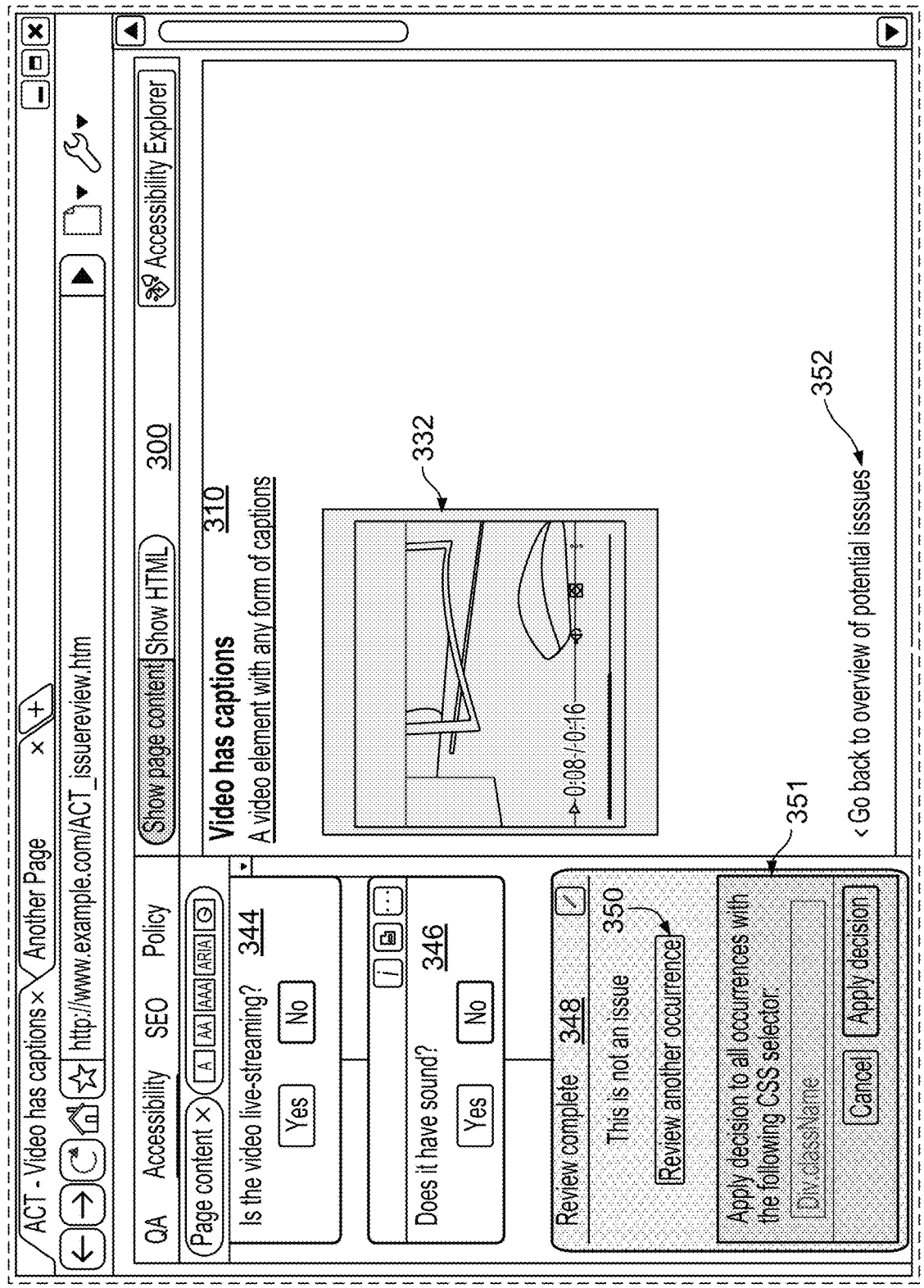
FIG. 3D is an example GUI for displaying a determination of whether the particular potential issue of FIGS. 3B-C is an actual issue based on receiving user-input indicating responses to the series of questions.

FIG. 3D is an example GUI for displaying a determination of whether the particular potential issue of FIGS. 3B-C is an actual issue based on receiving user-input indicating responses to the series of questions. As shown here, the customer has selected the "No" option in response to the second question 346. The web analysis server system has used this response to determine whether the issue of whether captions have been provided for the video element 332 is an actual issue. The web analysis server system determined that this is not an actual issue.

In some implementations, as described herein, the web analysis server system may present additional or fewer questions to the customer in order to determine whether the potential issue is an actual issue. The web analysis server system may also use a combination of the customer's responses to the questions 344 and 346 with prior responses to questions for similar/same potential issues to determine whether the potential issue is an actual issue. In scenarios where the customer has (i) not reviewed a similar potential issue in the past or (ii) provided different responses to questions for a similar potential issue in the part, the web analysis server system can present a longer set of questions to the customer to determine whether the potential issue is an actual issue.

Therefore, the web analysis server system can present a "Review complete" section 348 beneath the questions 344, 346, and the customer's responses to the respective questions. The "Review complete" section 348 indicates that "This is not an issue." The section 348 can be represented in an indicia, such as a green color, to visually depict to the customer that the potential issue is not an actual issue and instead is a resolved issue. The section 348 can also include the green checkmark in the circle graphical element to demonstrate that the potential issue has been resolved. The section 348 can also include a "Review another occurrence" option 350. Selecting the option 350 can cause the web analysis system to update the GUI 300 with information for another occurrence of the same potential issue that was just diagnosed/reviewed by the customer.

The section 348 can also include an option 351 to "Apply decision to all occurrences with the following CSS selector." The customer can input one or more CSS selectors into an input field for the option 351 and select an option (e.g., button) to "Apply decision." This provides for mass review of issues for occurrences of a particular element in the customer's website such that the customer does not have to review similar issues for each occurrence of the element. The customer can apply the same review and responses to each occurrence or multiple user-defined occurrences of the element. The elements can be images, videos, text boxes, audio, forms, and other features of the website. The customer can identify occurrences of the element(s) by inputing IDs, class names, or other tags that can be used in the HTML and/or CSS of the website to identify elements therein.

For example, images may have the same file paths and videos may have the same source code. The customer can input an ID that is used for videos in the website so that the customer's responses and review of the occurrence of the issue in FIG. 3D can be applied to all occurrences of the videos in the website. Thus, if the resolution of the issue in FIG. 3D is that the video does not have captions and this is not an issue, then applying this resolution across the website can result in any other occurrence of a video in the website not requiring captions. Thus, any potential issues related to captions for the other videos in the website can be identified as resolved issues by the web analysis server system.

In some implementations, the customer may only have to answer the questions once for the particular potential issue and the web analysis server system may automatically apply the customer's answers to the questions to all other occurrences of the particular potential issue (or occurrences of a same element having same or similar potential issues) throughout the website and/or particular webpage. The web analysis server system can identify persistent elements across webpages of the website using the disclosed techniques and thus apply the diagnosis of a potential issue in one webpage to diagnosis of other same potential issues in the same webpage or other webpages of the website. This can be beneficial to quickly, accurately, and efficiently verify whether potential issues are actual issues without requiring the customer to undergo a repetitive and time-consuming review process. Instead, this can be beneficial to help the customer prioritize review and fixing of issues in their website.

Finally, the GUI 300 can include a selectable option 352 stating, "Go back to overview of potential issues." Selecting this option 352 can cause the web analysis server system to present the GUI 300 depicted and described in FIG. 3A.

Figure 3E:
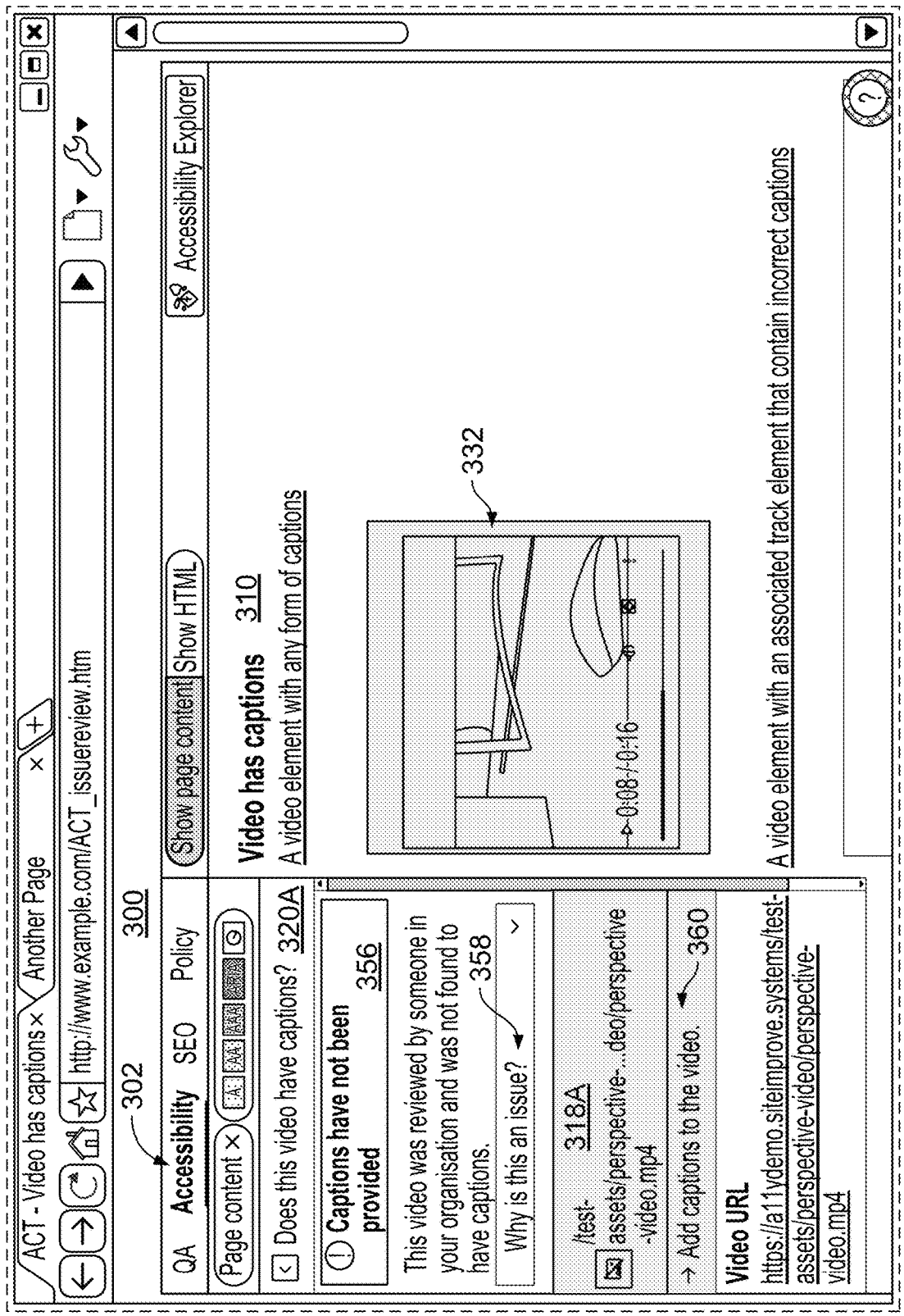
FIG. 3E is an example GUI for displaying an actual issue associated with the webpage of FIGS. 3A-D.

FIG. 3E is an example GUI for displaying an actual issue associated with the webpage of FIGS. 3A-D. In the example of FIG. 3E, the customer might have responded to the questions presented in FIGS. 3B-C that cause the web analysis server system to identify the potential issue 320A as an actual issue. Thus, the menu 302 is updated to include indication 356. The indication 356 includes text that "Captions have not been provided" and the graphical element of a red exclamation point in the circle. The indication 356 demonstrates that the video 332 was reviewed by the customer (as described in FIGS. 3B-C) and the web analysis server system has identified that based on the customer's responses to the questions, the video 332 contains an actual issue.

The menu 302 can include a dropdown tab 358, which can provide information about why the potential issue 320A has not been identified as an actual issue. The menu 302 may also include an "Add captions to the video" tab 360. A URL for the video 332 (e.g., the element 318A) can be presented in the tab 360. The customer can select the URL to cause the web analysis server system to update the GUI 300 and present a GUI for updating/modifying the video 332. This provides a user-friendly interface to quickly and easily link the customer to another GUI for fixing the actual issue. As a result, the customer does not have to navigate between different modules, services, and/or applications to fix the actual issue, which improves efficiency in addressing issues in the customer's website.

Referring to the FIGS. 3A-E, and ACT more broadly, whenever content, such as elements 318A-N, are updated, changed, or otherwise modified, an actual issue and/or a resolved issue associated with that element 318A-N may be re-categorized as a potential issue and presented to the customer for their review. This can be beneficial to provide for continuous review of the webpages of the website to maintain consistent compliance with accessibility standards.

Figure 3F:
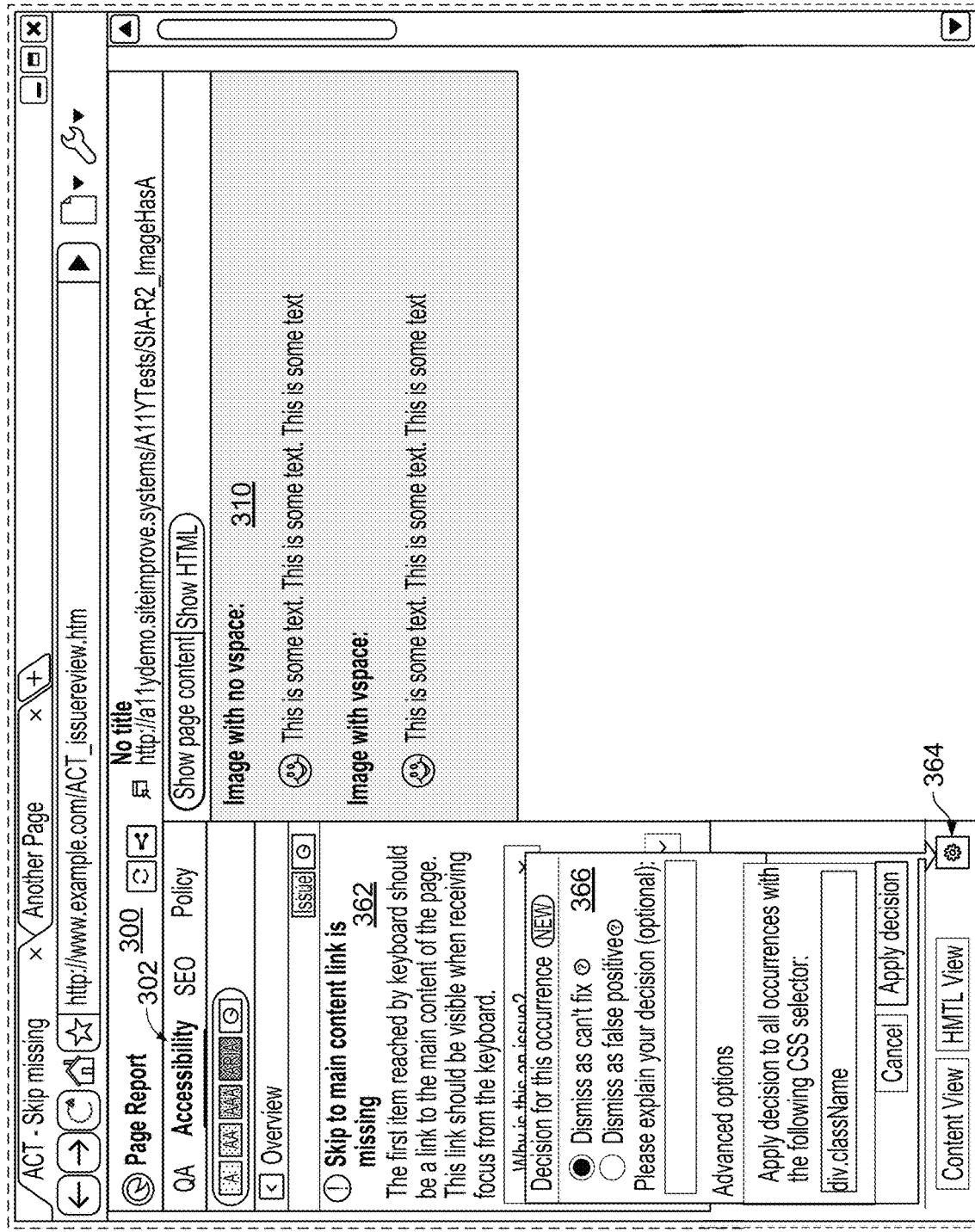
FIG. 3F is an example GUI for dismissing an actual issue associated with the webpage of FIGS. 3A-D.

FIG. 3F is an example GUI for dismissing an actual issue associated with the webpage of FIGS. 3A-D. Here, an indication 362 includes text that "Skip to main content link is missing" for content that appears in the webpage review section 310. The customer can select a settings icon 364 that is presented below the indication 362 to dismiss the occurrence of the actual issue represented by the indication 362.

When the customer selects the settings icon 364, a pop out window 366 can overlay a portion of the indication 362 and can present one or more selectable options and input fields. The pop out window 366 can include selectable options (e.g., radio buttons) for "Dismiss as can't fix" and "Dismiss as false positive." The customer can select either of these options and optionally input an explanation as to why the particular occurrence of the issue represented by the indication 362 is being dismissed.

The pop out window 366 can also include an "Advanced options" input field, in which the customer can input information to apply the decision to dismiss the actual issue to all occurrences having a particular CSS selector. The customer can therefore input the particular CSS selector, which can include, but is not limited to, a format of div.className.

Once the customer completes one or more of the fields in the pop out window 366, the customer can select an option (e.g., button) to "Apply decision." By selecting this option, the web analysis server system described throughout this disclosure can automatically apply the customer's input/decision(s) for the particular webpage presented in the webpage review section 310 and/or one or more other occurrences of the same issue that have been identified by the customer.

The customer can choose to dismiss an actual issue because they believe it is not actually a problem. When the customer dismisses the issue, the web analysis server can review the actual issue and determine whether it is in fact a problem. If the issue is not a problem, then the web analysis server system can add points to a quality score for the customer's website, where the amount of points added corresponds to an amount of points that can be gained if the customer fixes the issue. If, on the other hand, the customer dismisses the actual issue because they do not want to address it, then their website's quality score may not increase (e.g., the quality score can remain the same). For example, if the customer's website has a quality score of 90/100 and the customer dismisses actual issues, the quality score may remain the same and thus may not reach 100/100.

Figure 4A:
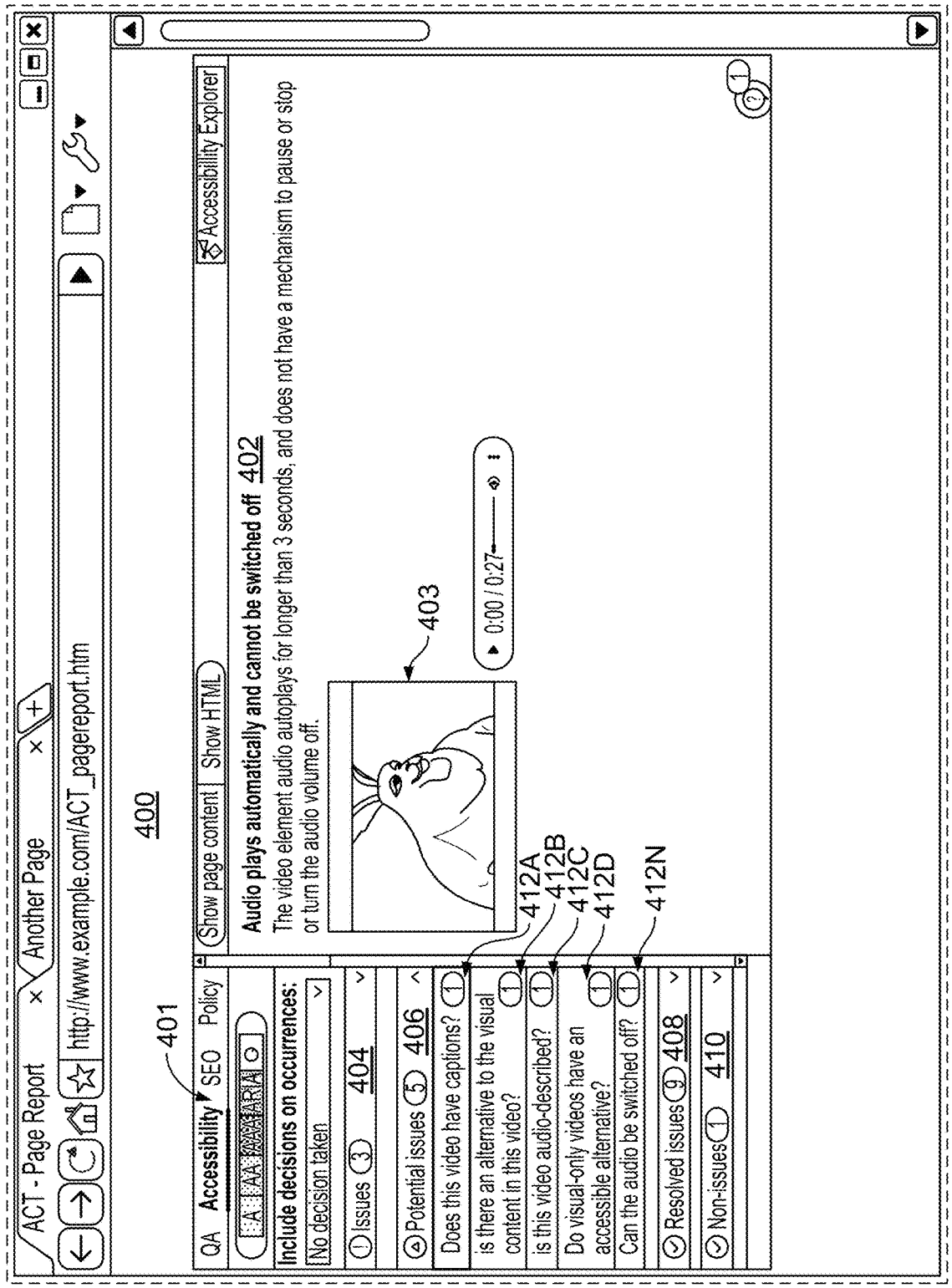
FIG. 4A is an example GUI for displaying a list of issues associated with an element in a webpage of a website.

FIG. 4A is an example GUI for displaying a list of issues associated with an element in a webpage of a website. Similar to the GUI 300 in FIGS. 3A-E, GUI 400 can be an accessibility page report module. The GUI 400 can present a menu 401 (e.g., refer to the menu 302 in FIGS. 3A-E) and a webpage review section 402 (e.g., refer to the webpage review section 310 in FIGS. 3A-E). One or more elements in a webpage that contain potential issues can be presented in the section 402. The customer can review the elements presented in the section 402 when responding to questions that are presented to the customer during the review process of a potential issue, as described herein.

In FIG. 4A, the customer is reviewing a video element 403 in a webpage that is different than the video element 332 described in FIGS. 3A-E. Therefore, in FIG. 4A, the menu 401 includes dropdown tabs for "Issues" 404, "Potential issues" 406, "Resolved issues" 408, and "Non-issues" 410. As described herein, each of the tabs 404, 406, 408, and 410 can include graphical elements that visually depict what type of issues are associated with each tab. The tabs 404, 406, 408, and 410 can also include a numeric indication of how many issues have been identified for each type of issue associated with the tabs.

For example, the "Issues" tab 404 includes the red exclamation point in a circle (the graphical element) and "3" within a graphical shape (the numeric indication), which indicates that there are three actual issues associated with the video element 403. The "Potential issues" tab 406 includes the orange triangle in the circle and "5" within a graphical shape to indicate that there are five potential issues associated with the video element 403. The "Resolved issues" tab 408 includes the green checkmark in the circle and "9" within a graphical shape to indicate that nine issues have been resolved with regards to the video element 403. The "Non-issues" tab 410 includes the green checkmark in the circle and "1" within a graphical shape to indicate that one issue has been identified as a non-issue for the video element 403 (e.g., the customer responded to a set of questions for a potential issue and the web analysis server system determined that the potential issue is a non-issue).

Selecting any of the tabs 404, 406, 408, and 410 can cause the web analysis server system to present additional information associated with the selected tab in the menu 401. Here, for example, the customer has selected the "Potential issues" tab 406. As a result, the tab 406 has been expanded to include a list of potential issues 412A-N. The customer can select any of the potential issues 412A-N to begin a review process of the selected issue, as described throughout this disclosure.

Figure 4B:
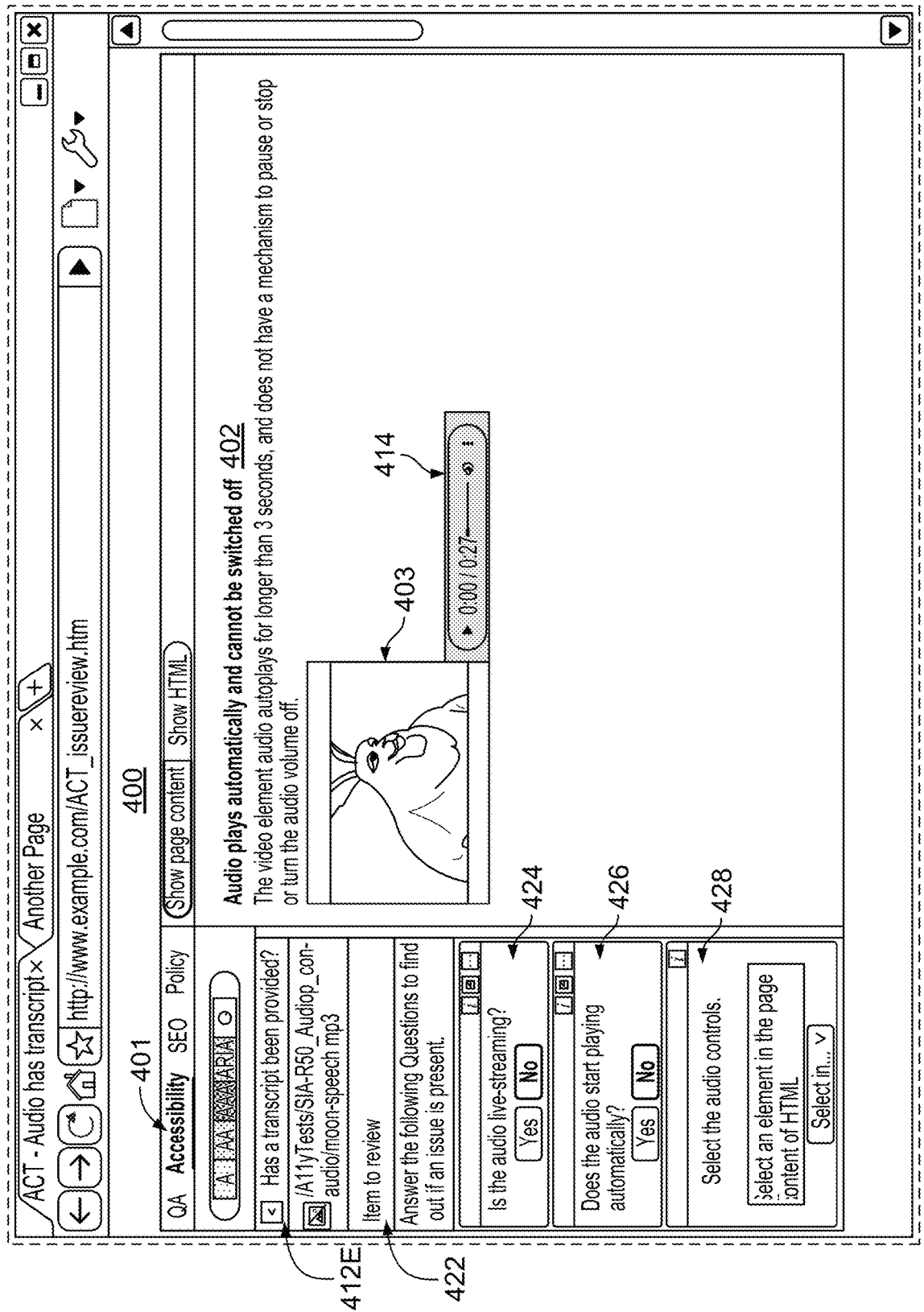
FIG. 4B is an example GUI for displaying a series of questions about a particular potential issue associated with the element in the webpage of FIG. 4A.

FIG. 4B is an example GUI for displaying a series of questions about a particular potential issue associated with the element in the webpage of FIG. 4A. Here, the customer has selected a "Has a transcript been provided" potential issue 412E to review. The web analysis server system can update the menu 401 to successively present ACT questions for the customer for which the customer to provide responses. The customer's responses can then be used by the web analysis server system to determine whether the potential issue 412E is an actual issue (and thus should be moved from the "Potential issues" tab 406 to the "Issues" tab 404 shown in FIG. 4A).

The web analysis server system can also update the section 402 to highlight an element 414 that the potential issue 412E is associated with. The customer's attention is therefore directed to reviewing the element 414 when responding to questions presented in the menu 401.

"Item to review" section 422 can present one or more questions to the customer, as described in reference to the section 342 described in FIGS. 3B-E. Here, a first question 424 is presented, which asks the customer, "Is the audio live-streaming?" The customer has responded to the question 424 by selecting a "No" option. Based on this answer, the web analysis server system determined a second question 426 to present in the section 422, which asks the customer "Does the audio start playing automatically?" The customer has also responded to the question 426 by selecting a "No" option. Based on this answer, the web analysis server system has presented a "Select the audio controls" section 428. The section 428 prompts the customer to select the element 414 in the section 402. Once the customer selects the element 414, a path to the element 414 is saved and remembered by the web analysis server system. The web analysis server system can then determine whether another question should be presented to the customer to diagnose the potential issue or whether the system can conclude whether the potential issue is an actual issue or not.

Based on the customer responses to the questions presented in the section 422 (and the customer's prior responses to other potential issues that are the same and/or similar), the web analysis server system can determine whether the potential issue 412E is an actual issue, a resolved issue, and/or a non-issue. As described further herein, the web analysis server system can also determine whether to apply the determination to other webpages. The web analysis server system can identify other webpages having the same potential issue and apply the customer's responses to the questions for the potential issue 412E to all other instances of the same potential issue throughout the customer's website. In some implementations, the customer may also use a tool provided by a third party service or the web analysis server system to identify when and how to apply the customer's responses to a set of questions to same or similar potential issues associated with other elements throughout the webpage/website. Thus, the customer can define a criteria to be used by the web analysis server system in determine what other elements and/or webpages to apply the customer's responses to questions. The customer-defined criteria can be a combination of CSS selectors. For example, the customer can choose to apply their responses to questions for all occurrences of the potential issue 412E having a customer-defined CSS selector, tag, etc.

In some implementations, if the customer has already responded to the questions 424 and 426 for another similar or same element in a webpage having the same potential issue 412E, the web analysis server system can remember those responses and output those responses in the section 422. In such a scenario, the customer would not select the options "No" for both the questions 424 and 426. Instead, the web analysis server system would present the questions 424 and 426 with the options "No" already selected. The customer can view these responses and optionally change them. Otherwise, the customer can jump to the section 428 and select the audio controls in the section 402, thereby expediting the review process of the potential issue 412E for the element 414.

The questions presented in FIGS. 3-4 are merely illustrative examples of question sets. One or more other questions and/or sets of questions can be dynamically determined and used by the web analysis server system, depending on the type of potential issue and/or the type of element associated with the potential issue.

FIGS. 5A-I are example series of questions for determining whether one or more potential issues in a website are actual issues. FIGS. 5A-I depict merely illustrative examples of sets of questions that can be provided to the customer. One or more other questions and/or sets of questions can be dynamically determined and used by the web analysis server system, depending on the type of potential issue and/or the type of element associated with the potential issue. Moreover, as described herein, the web analysis server system can select a portion of questions in a subset of questions based on responses that were provided by the customer to the same questions but for a prior potential issue.

Figure 5A:
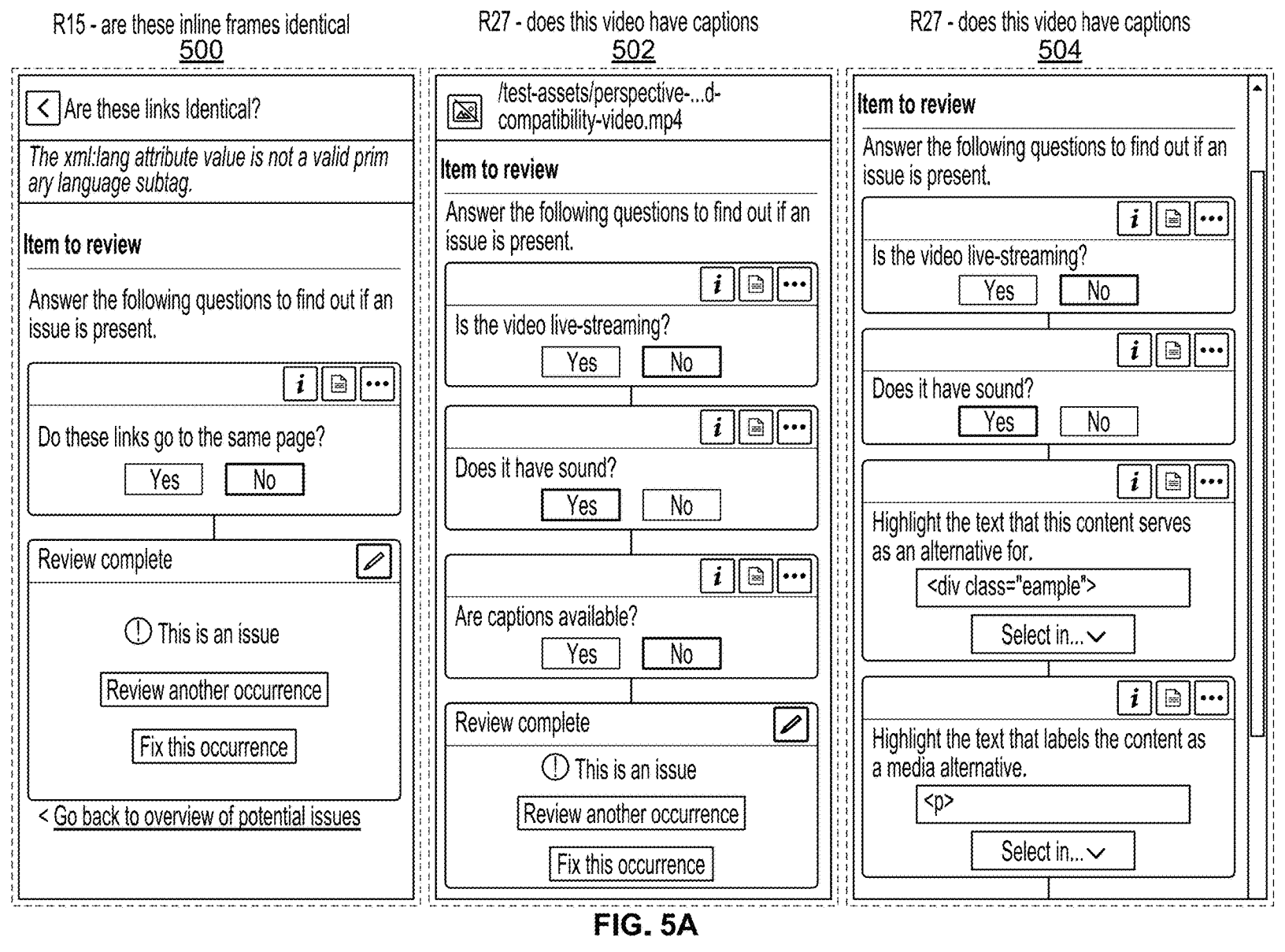

FIG. 5A depicts three exemplary question sets 500, 502, and 504. Question set 500 can be used and presented by the web analysis server system to determine whether inline frames are identical. The question set 500 includes potential answers provided by the customer that can result in the web analysis server system determining there is in fact an issue that the inline frames are identical. Question set 502 can be used and presented by the web analysis server system to determine whether a video has captions. The question set 502 includes potential answers provided by the customer that can result in the web analysis server system determining there is in fact an issue in that the video does not have captions but should have them. Question set 504 includes additional questions that may be used and presented by the web analysis server system to determine whether the video has captions.

FIG. 5B depicts exemplary question sets 506 and 508. Question set 506 can be used and presented by the web analysis server system to determine whether audio has a transcript. The question set 506 includes potential answers provided by the customer that can result in the web analysis server system determining there is not an actual issue in that the audio either has the transcript or does not need the transcript. Question set 508 includes additional questions that may be used and presented by the web analysis server system to determine whether the audio has the transcript. The question set 508 also includes potential answers provided by the customer that can result in the web analysis server system determining there is not an actual issue in that the audio either has the transcript or does not need the transcript.

Figure 5C:
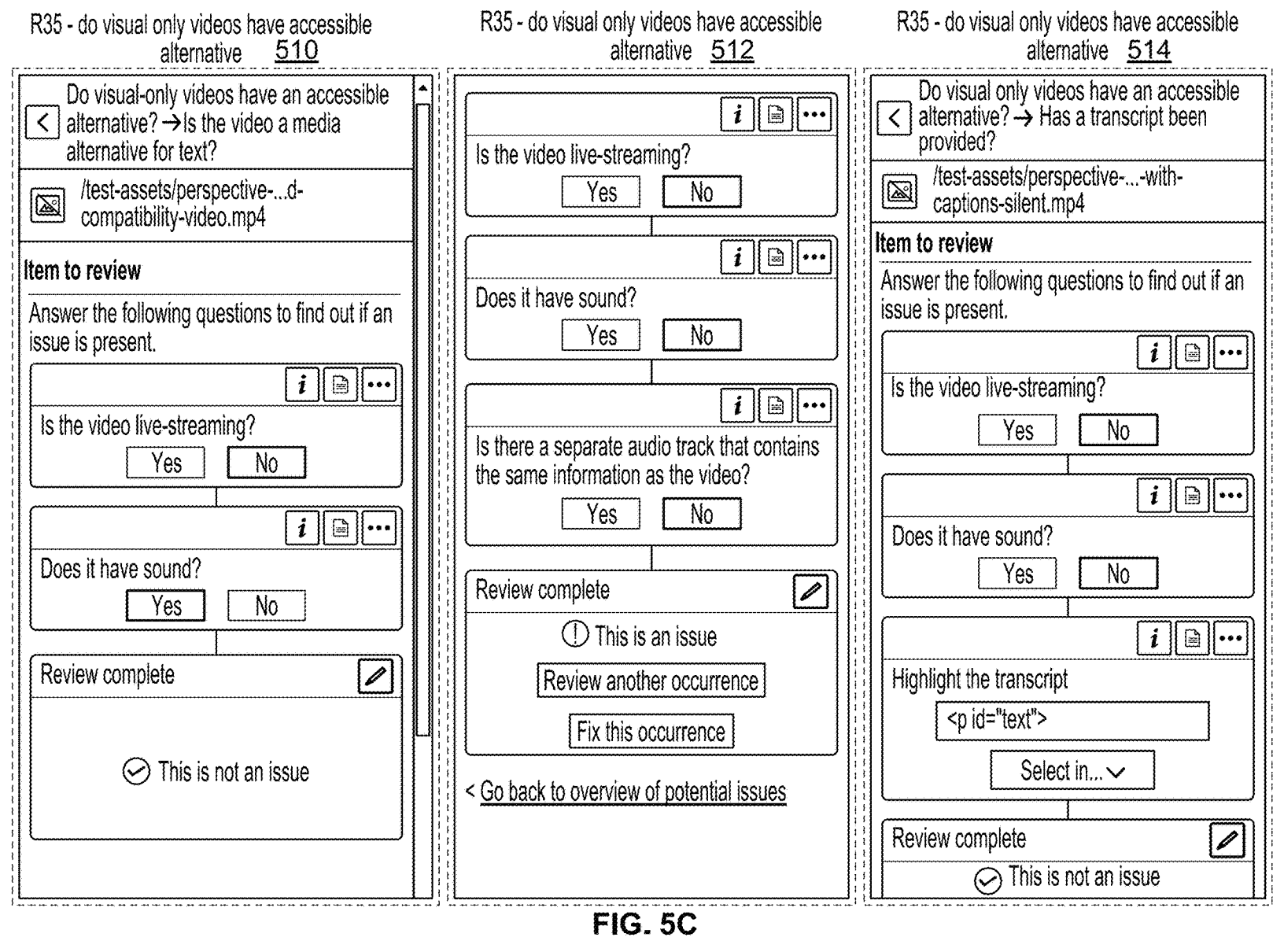

FIG. 5C depicts three exemplary question sets 510, 512, and 514. Question set 510 can be used and presented by the web analysis server system to determine whether a visual only video has an accessible alternative. The question set 510 includes potential answers provided by the customer that can result in the web analysis server system determining there is not an actual issue. Question set 512 includes additional questions that may be used and presented by the web analysis server system to determine whether the visual only video has an accessible alternative. The question set 512 also includes potential answers provided by the customer that can result in the web analysis server system determining there is in fact an actual issue to be addressed.

Question set 514 includes additional questions that may be used and presented by the web analysis server system to determine whether the visual only video has an accessible alternative. The question set 514 also includes potential answers provided by the customer that can result in the web analysis server system determining there is no actual issue present.

Figure 5D:
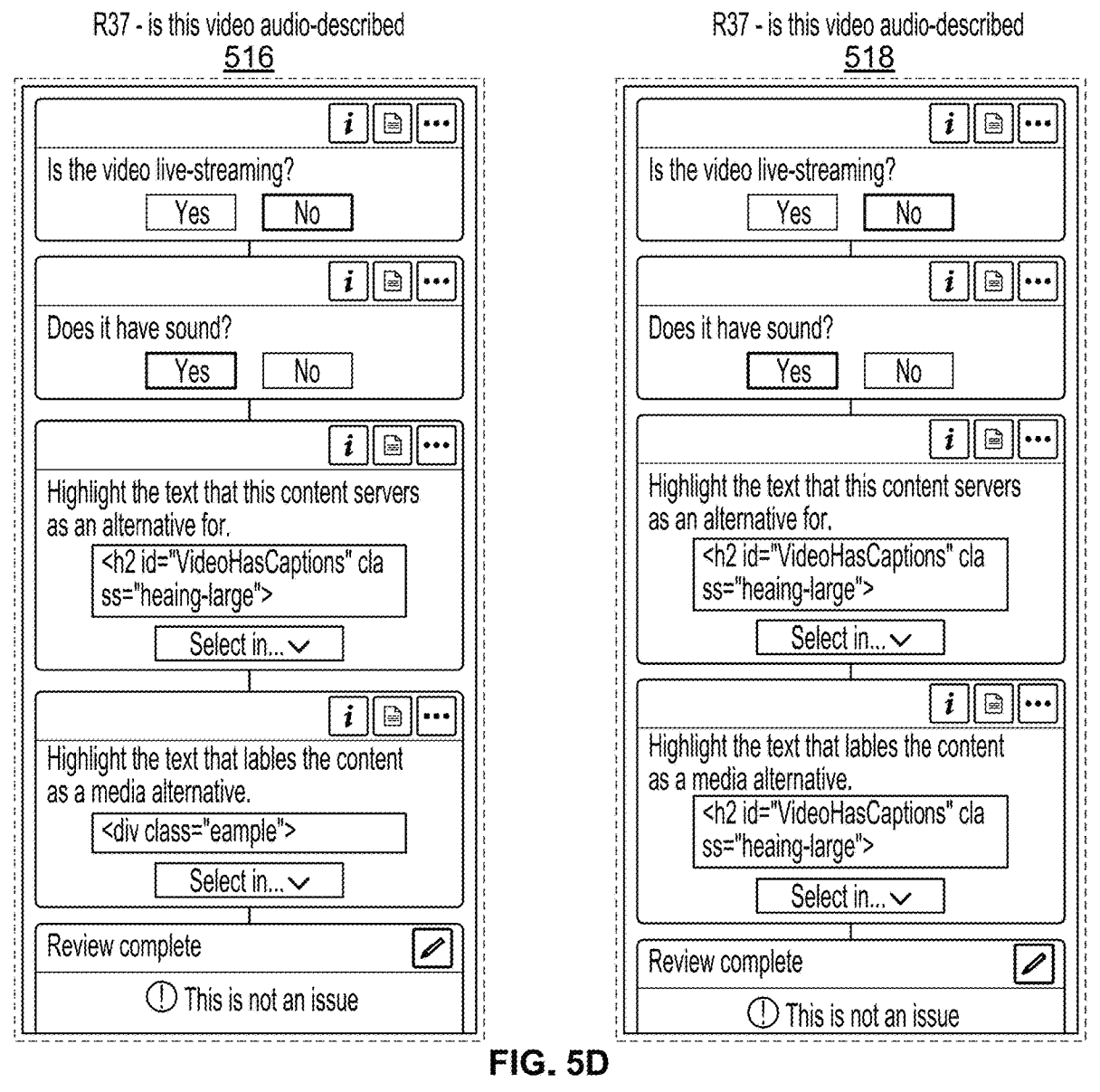

FIG. 5D depicts exemplary question sets 516 and 518. Question set 516 can be used and presented by the web analysis server system to determine whether a video is audio-described. The question set 516 includes potential answers provided by the customer that can result in the web analysis server system determining there is not an actual issue. Question set 518 includes additional questions that may be used and presented by the web analysis server system to determine whether the video is audio-described. The question set 518 also includes potential answers provided by the customer that can result in the web analysis server system determining there is not an actual issue.

Figure 5E:
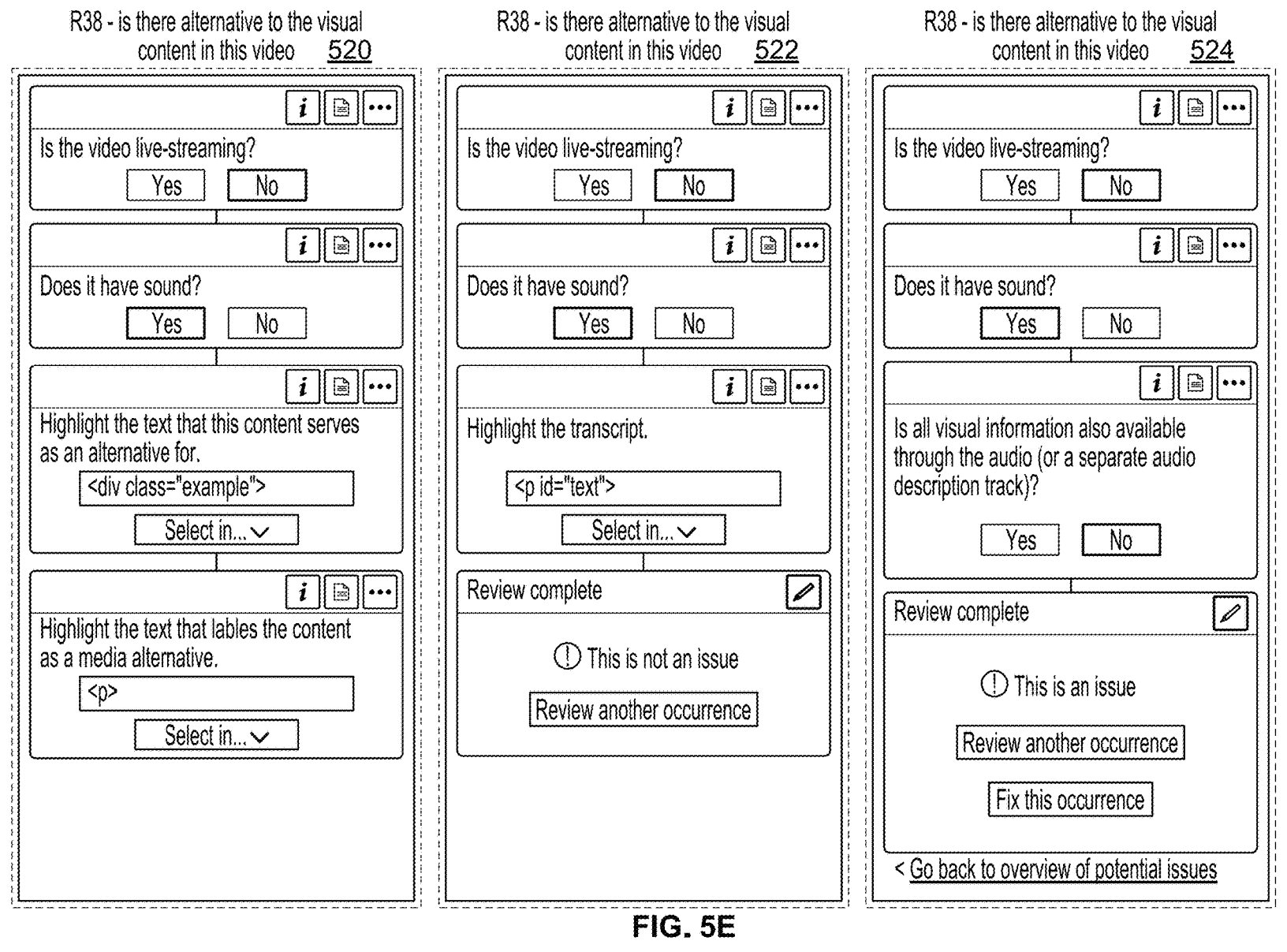

FIG. 5E depicts three exemplary question sets 520, 522, and 524. Question set 520 can be used and presented by the web analysis server system to determine whether there is an alternative to visual content in a video. The question set 520 includes potential answers provided by the customer. Question set 522 includes additional questions that may be used and presented by the web analysis server system to determine whether there is an alternative to visual content in a video. The question set 522 also includes potential answers provided by the customer that can result in the web analysis server system determining there is not an actual issue to be addressed. Question set 524 includes additional questions that may be used and presented by the web analysis server system to determine whether there is an alternative to visual content in a video. The question set 524 also includes potential answers provided by the customer that can result in the web analysis server system determining there is an actual issue present.

Figure 5F:
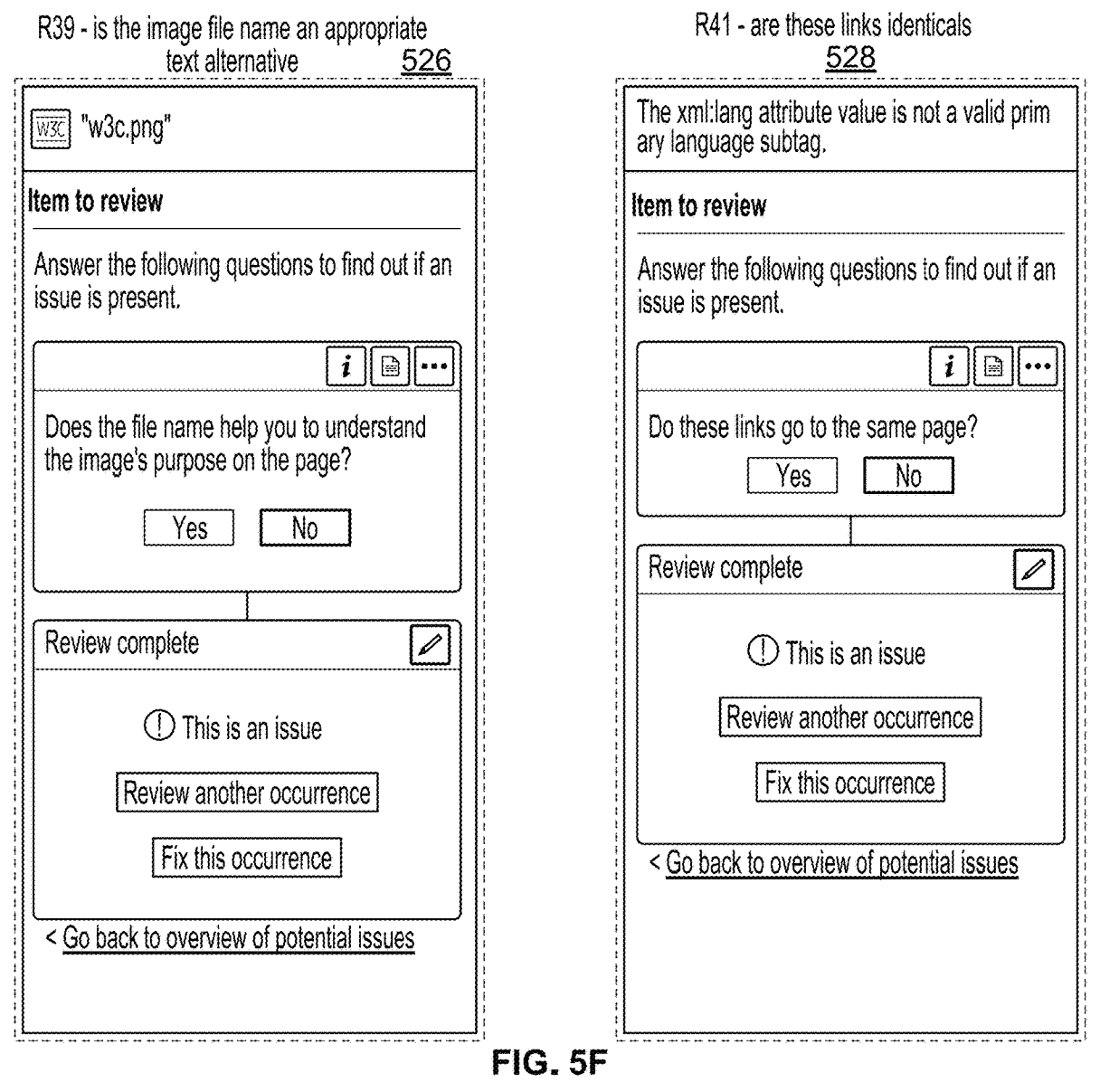

FIG. 5F depicts exemplary question sets 526 and 528. Question set 526 can be used and presented by the web analysis server system to determine whether an image file name is an appropriate text alternative. The question set 526 includes potential answers provided by the customer that can result in the web analysis server system determining there is in fact an issue with the image file name. Question set 528 can be used and presented by the web analysis server system to determine whether links are identical. The question set 528 includes potential answers provided by the customer that can result in the web analysis server system determining there is in fact an issue with identical links.

Figure 5G:
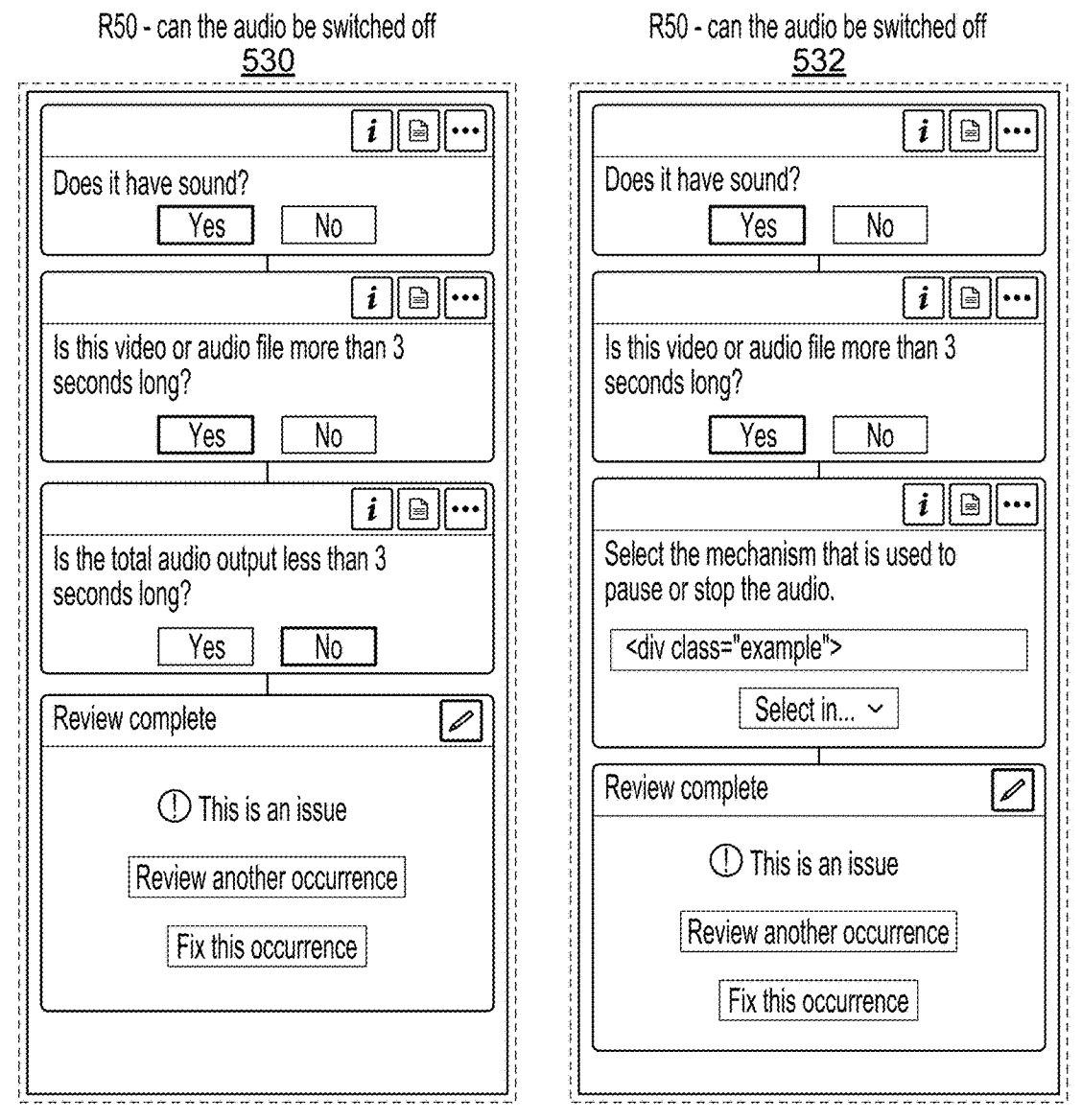

FIG. 5G depicts exemplary question sets 530 and 532. Question set 530 can be used and presented by the web analysis server system to determine whether audio can be switched off. The question set 530 includes potential answers provided by the customer that can result in the web analysis server system determining there is an actual issue in that the audio cannot be switched off. Question set 532 includes additional questions that may be used and presented by the web analysis server system to determine whether the audio can be switched off. The question set 532 also includes potential answers provided by the customer that can result in the web analysis server system determining there is an actual issue to be addressed.

FIG. 5H depicts three exemplary question sets 534, 536, and 538. Question set 534 can be used and presented by the web analysis server system to determine whether it is clear which page element has focus from a keyboard. The question set 534 includes potential answers provided by the customer that can result in the web analysis server system determining there is in fact an issue. Question set 536 can be used and presented by the web analysis server system to determine whether there is sufficient contrast between text and background. The question set 536 includes potential answers provided by the customer that can result in the web analysis server system determining there is no actual issue. Question set 538 can be used and presented by the web analysis server system to determine whether some links (in the same context) point to the same URL. The question set 538 includes potential answers provided by the customer that can result in the web analysis server system determining there is an actual issue to be addressed.

FIG. 5 depicts question set 540. Question set 540 can be used and presented by the web analysis server system to determine whether it is possible to skip straight to the main content in a webpage. The question set 540 includes potential answers provided by the customer that can result in the web analysis server system determining there is in fact an actual issue.

One or more additional questions and/or question sets can be selected and presented by the web analysis server system to diagnose a potential issue. For example, questions and/or question sets can be selected based on a conformance level attributed to a particular potential issue. Refer to Table 1 for additional questions, question sets, and instructions/prompts that can be selected and presented to the customer based on conformance level and particular potential issue. In brief, Table 1 includes success criteria (herein referred to as "SC"), which is related to web content accessibility guidelines (WCAG), potential issue, and review questions associated with the potential issue.

TABLE 1 question sets for potential issues based on accessibility conformance level

| SC | Potential Issue | Review Questions |
|---|---|---|
| 2.4.1 (A) | Is it possible to skip straight to the main content? | Is the first item that can be reached by keyboard a link to another part of the page? Open the page in a new tab and press the tab key to start navigating with the keyboard. If the first item highlighted is a link to another part of the page (i.e. a link that allows you to skip over links to the main content), answer "Yes". Highlight the section that the link takes you to. Select the first piece of content you arrive at after following the link. Is the destination (of the first link that can be reached by keyboard) the main content of the page? The main content of a page refers to the content or information that visitors come for. Not navigational menus, not ads, not banners or other "extras." |
| 2.4.4 (A) | Do these links (in the same context) go to the same URL? | Do these links go to the same page? Click both links. If you arrive at the same page both times, select "Yes". You may need to scroll down the page to find the next link. |
| 1.1.1 (A) | Is this image file name an appropriate text alternative? | Does the file name help you to understand the image's purpose on the page? If the text is too short, not descriptive enough, or contains an unnecessary file extension (such as ".jpg"), select "No". |
| 1.4.3 (AA) | Is there sufficient contrast between the text and the background? | What color is the background? Enter the hex code of the background color. There are many free tools online that can help you identify this (if you're a Chrome user, try searching for "color picker" in the Chrome Web Store). For image backgrounds, you may need to select more than one color. What color is the text? Select all font colors used in the highlighted section. |
| 2.4.7 (A) | Is it clear which page element has focus from the keyboard? | Tab to the element. Is it highlighted when reached by keyboard? Open the page in a new tab and use the Tab key on your keyboard to navigate to the element. If it's visually clear when the |

TABLE 1-continued question sets for potential issues based on accessibility conformance level

| SC | Potential Issue | Review Questions |
|---|---|---|
| | | element is in focus, answer "yes". If you cannot see the focus indicator at all -or the element seems to have been skipped- then answer "no". |
| 4.1.2 (A) | Are these inline frames identical? | Do these iframes contain the exact same content? If the iframes embed the same or equivalent content, select "Yes". Two or more iframes can be considered the same even if their URLs are different. |
| 2.4.9 (AAA) | Are these links identical? | Do these links go to the same page? Click both links. If you arrive at the same page both times, select "Yes". You may need to scroll down the page to find the next link. |
| 1.4.1 (A) | Are links clearly identifiable? | Aside from font color, does this link have any identifying features? This could be an underline, an outline, a different font or font style - any visual cue that does not rely on color. Hover over the link. Aside from the cursor, does the link have (or retain) any identifying features? This could be an underline, an outline, a different font or font style - any visual cue that does not rely on color. Tab to the link. Does the link have (or retain) any identifying features when reached by keyboard? This could be an underline, an outline, a different font or font style - any visual cue that does not rely on color. Visit the link and then return to this page. Does the link have (or retain) any identifying features after it has been visited? This could be an underline, an outline, a different font or font style - any visual cue that does not rely on color. Hover over the visited link. Aside from the cursor, does the link have (or retain) any identifying features? This could be an underline, an outline, a different font or font style - any visual cue that does not rely on color. Tab to the visited link. Does the link have (or retain) any identifying features when reached by keyboard? This could be an underline, an outline, a different font or font style - any visual cue that does not rely on color. |
| 1.4.2 (A) | Composite rule: Can the audio be switched off? Can the audio be paused or stopped? Does the audio play for longer than 3 seconds? | Does the audio start playing automatically? If the audio does not play automatically after the page loads, select "No". Select the mechanism that is used to pause or stop the audio. Look for controls on the page. If the only way to turn off the sound is via your speakers or system volume, select "Not present on the page". Does it have sound? Is the total audio output less than 3 seconds long? The content might play for 3+ seconds, but if the audio can only be heard for 2 seconds (for example), you can select "Yes". |

TABLE 1-continued question sets for potential issues based on accessibility conformance level

| SC | Potential Issue | Review Questions |
| --- | --- | --- |
| 1.2.1 (A) | Composite rule: Is there an alternative to the visual content in this video? Is the video a media alternative for text? | Is the video live-streaming? "Live-streaming" means it is being broadcast live. Does it have sound? Play the video and check if there's sound. Make sure your speakers are on! Highlight the text that this content serves as an alternative for. A media alternative should (by definition) contain the exact same information as the text. Highlight the text that labels the content as a media alternative. Look for a piece of text that explains the video's purpose. |
| 1.2.3 (A) | Has a transcript been provided? | Is the video live-streaming? "Live-streaming" means it is being broadcast live. Does it have sound? Play the video and check if there's sound. Make sure your speakers are on! Highlight the transcript. A transcript is a text version of the information contained within a video. If there's no transcript, select "Not present on the page". |
| | Does the audio track contain all information in the video? | Is the video live-streaming? "Live-streaming" means it is being broadcast live. Does it have sound? Play the video and check if there's sound. Make sure your speakers are on! Is all visual information also available through the audio (or a separate audio description track)? If a description track is available, you should be able to switch it on via the video player controls. |
| | Composite rule: Is this video audio-described? Does the audio track contain all information in the video? | Is the video live-streaming? "Live-streaming" means it is being broadcast live. Does it have sound? Play the video and check if there's sound. Make sure your speakers are on! Is all visual information also available through the audio (or a separate audio description track)? If a description track is available, you should be able to switch it on via the video player controls. |
| | Is the video a media alternative for text? | Is the video live-streaming? "Live-streaming" means it is being broadcast live. Does it have sound? Play the video and check if there's sound. Make sure your speakers are on! Highlight the text that this content serves as an alternative for. A media alternative should (by definition) contain the exact same information as the text. Highlight the text that labels the content as a media alternative. Look for a piece of text that explains the video's purpose. |
| | Is the description track accurate? (only shown when a 'track' element is present) | Does the 'track' element contain descriptions of the video content? Video content includes on-screen text, and actions, objects and other visual cues that help viewers understand the story or message. |
| | Composite rule: Do visual-only videos have an accessible alternative? Is the video a | Is the video live-streaming? "Live-streaming" means it is being broadcast live. Does it have sound? Play the video and check if there's sound. Make sure your speakers are on! |

TABLE 1-continued question sets for potential issues based on accessibility conformance level

| SC | Potential Issue | Review Questions |
|---|---|---|
|  | media alternative for text? | Highlight the text that this content serves as an alternative for. A media alternative should (by definition) contain the exact same information as the text. Highlight the text that labels the content as a media alternative. Look for a piece of text that explains the video's purpose. |
|  | Has a transcript been provided? | Is the video live-streaming? "Live-streaming" means it is being broadcast live. Does it have sound? Play the video and check if there's sound. Make sure your speakers are on! Highlight the transcript. A transcript is a text version of the information contained within a video. If there's no transcript, select "Not present on the page". If the transcript is on another page, highlight the link to the transcript. A transcript is a text version of the information contained within a video. If there's no link to the transcript, select "Not present on the page". |
|  | Has a separate audio alternative been provided? | Is the video live-streaming? "Live-streaming" means it is being broadcast live. Does it have sound? Play the video and check if there's sound. Make sure your speakers are on! Is there a separate audio track that contains the same information as the video? The audio alternative should contain the exact same information as the video. All significant visual elements should be described. |
|  | Does the video have a description track? (only shown when a 'track' element is present) Composite rule: Does the audio have a transcript? Is the audio a media alternative for text? | Does the 'track' element contain descriptions of the video content? Video content includes on-screen text, and actions, objects and other visual cues that help viewers understand the story or message. Is the audio live-streaming? "Live-streaming" means it is being broadcast live. Does the audio start playing automatically? If the audio does not play automatically after the page loads, select "No". Select the audio controls. Audio controls are buttons that allow you to play, pause or stop the audio. If you can't find them, use the dropdown to select "Not present on the page". Highlight the text that this content serves as an alternative for. A media alternative should (by definition) contain the exact same information as the text. Highlight the text that labels the content as a media alternative. Look for a piece of text that explains the video's purpose. |
|  | Has a transcript been provided? | Highlight the transcript. A transcript is a text version of the information contained within a video. If there's no transcript, select "Not present on the page". If the transcript is on another page, highlight the link to the transcript. A transcript is a text version of the information contained within a video. If there's no link to the transcript, select "Not present on the page". |

TABLE 1-continued question sets for potential issues based on accessibility conformance level

| SC | Potential Issue | Review Questions |
|---|---|---|
| | Composite rule: Does this video have captions? Is the video a media alternative for text? | Is the video live-streaming? "Live-streaming" means it is being broadcast live. Does it have sound? Play the video and check if there's sound. Make sure your speakers are on! Highlight the text that this content serves as an alternative for. A media alternative should (by definition) contain the exact same information as the text. Highlight the text that labels the content as a media alternative. Look for a piece of text that explains the video's purpose. |
| | Have captions been provided? | Is the video live-streaming? "Live-streaming" means it is being broadcast live. Does it have sound? Play the video and check if there's sound. Make sure your speakers are on! Are captions available? If captions are available, you should be able to switch them on via the video player controls. |

Figure 6A:
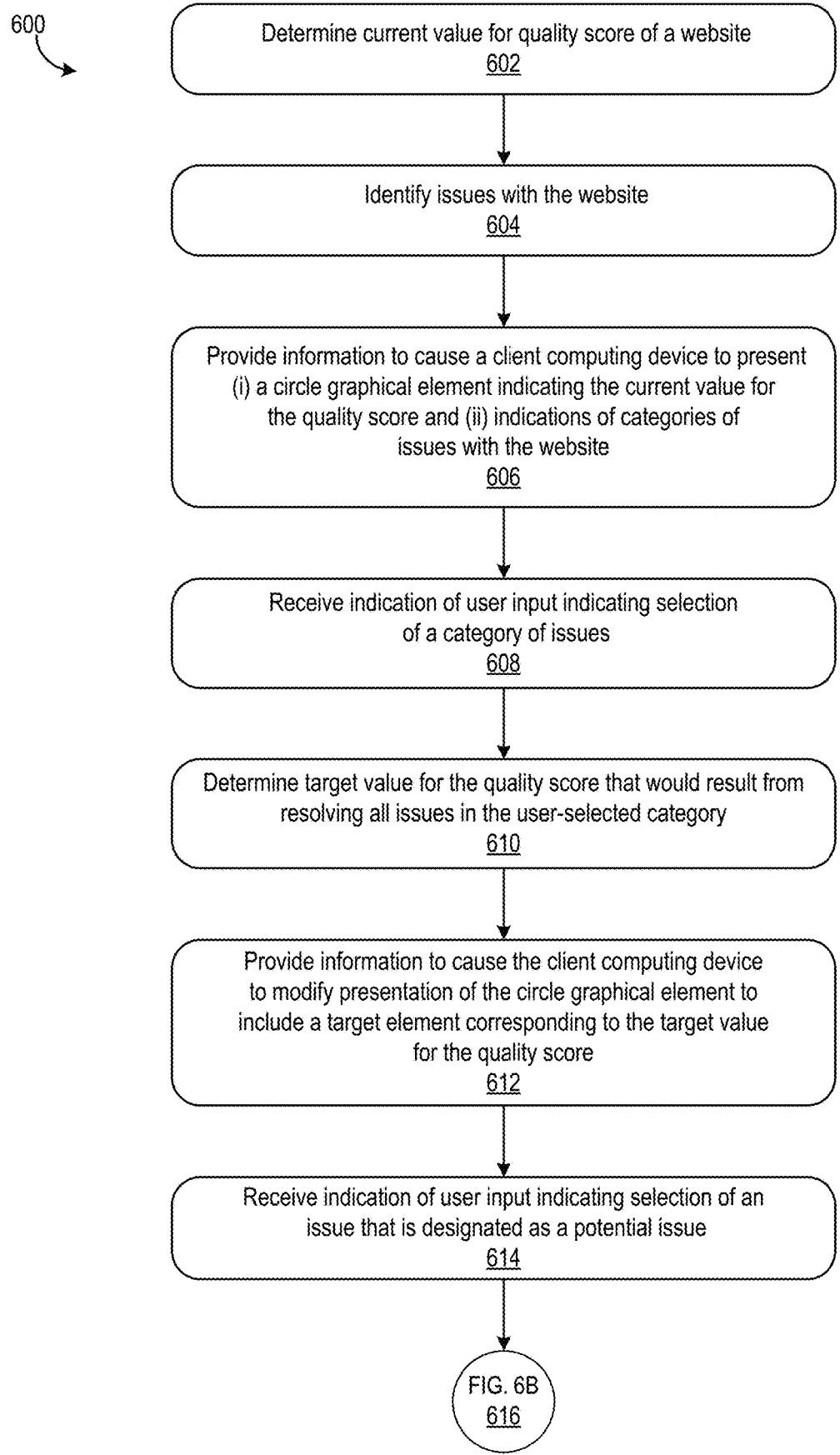
FIGS. 6A-C is a flowchart of a process for identifying and addressing accessibility issues in a website.
Figure 6B:
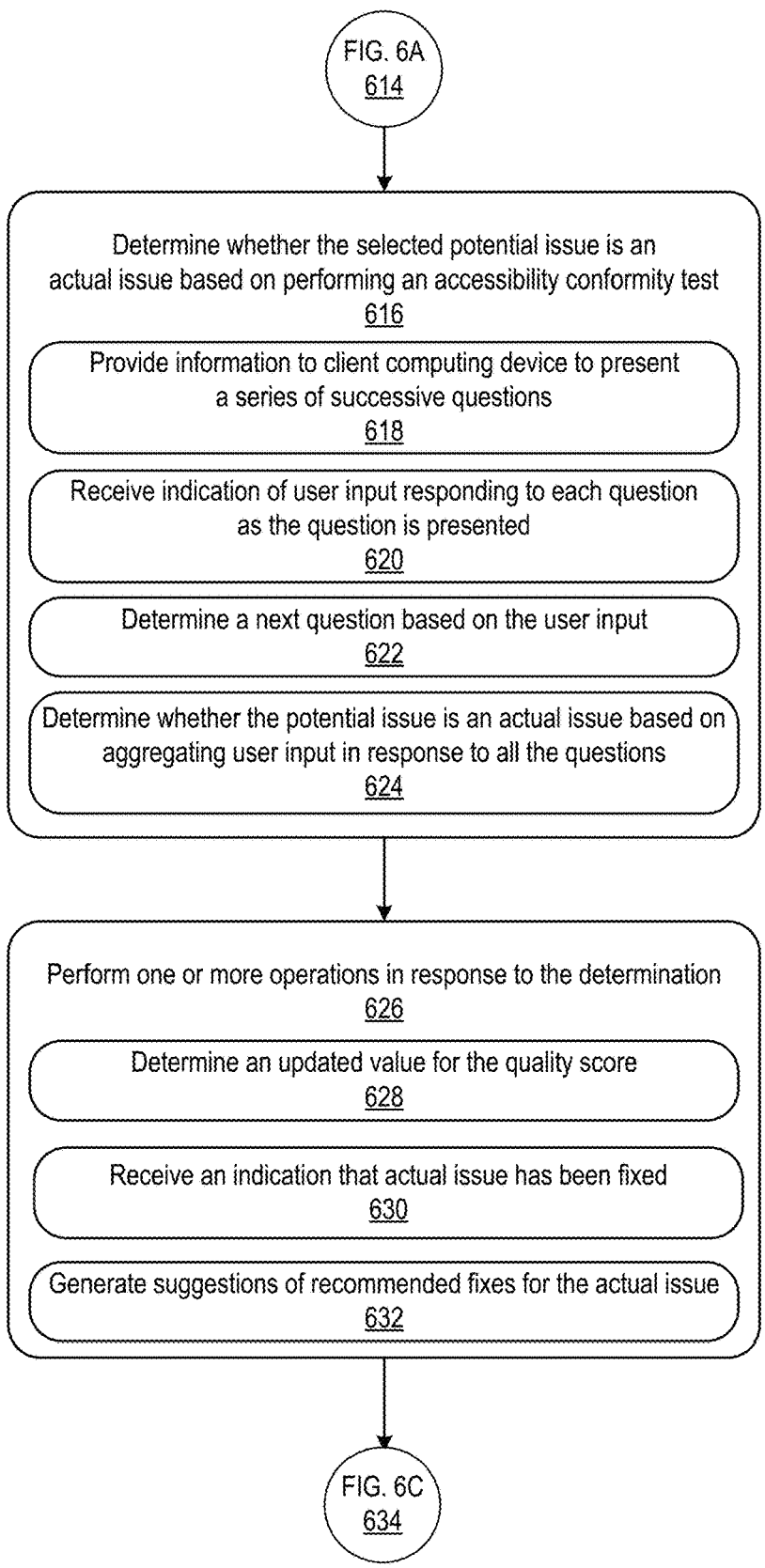
Figure 6C:
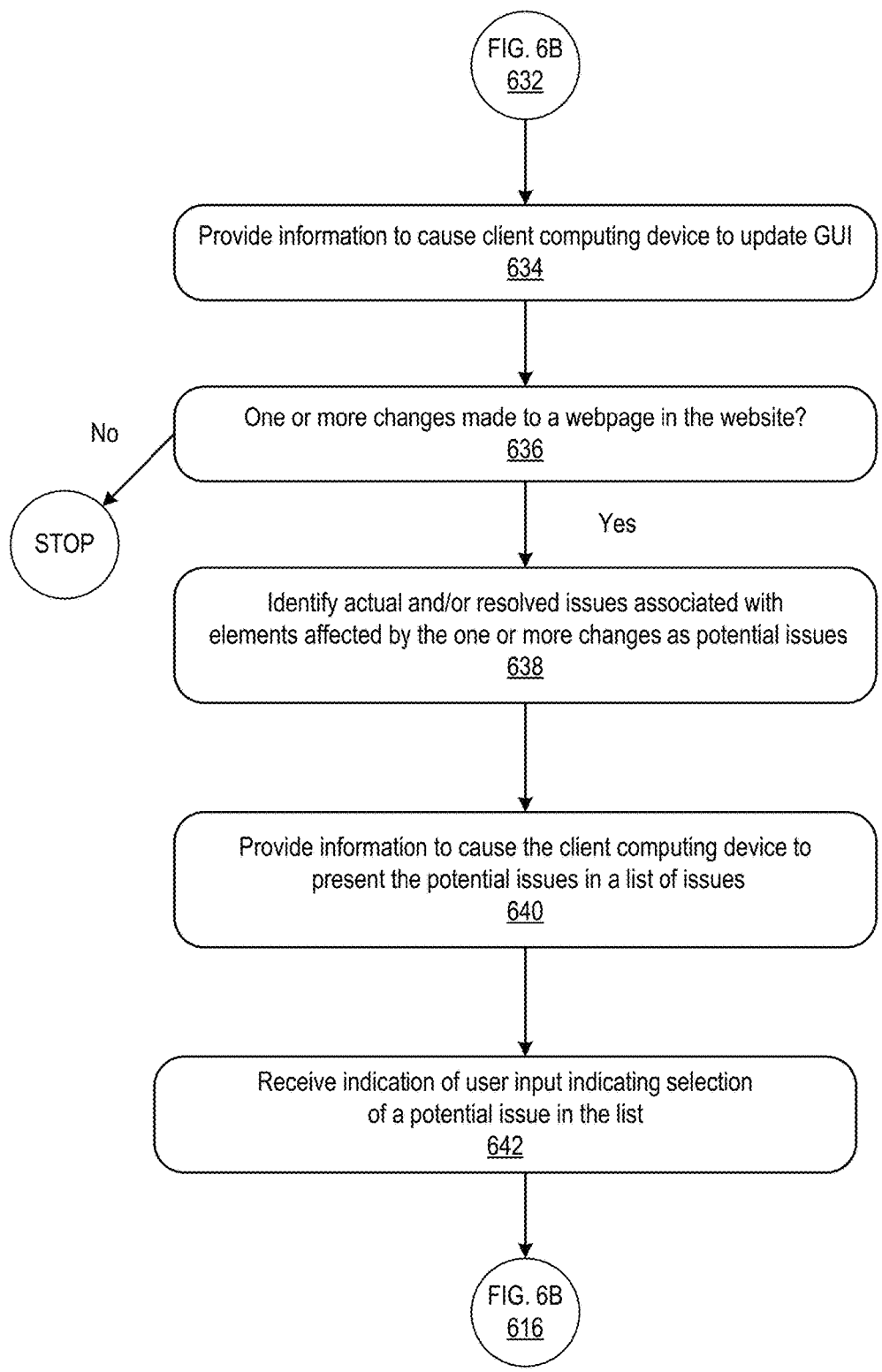

FIGS. 6A-C is a flowchart of a process 600 for identifying and addressing accessibility issues in a website. The process 600 can be performed to determine a target for improving quality of the customer's website, presenting issues associated with the target, and reviewing potential issues associated with the target to diagnose those potential issues as actual issues or resolved issues. Therefore, the process 600 describes aspects of the GUIs depicted and described in FIGS. 1-5.

Figure 9:
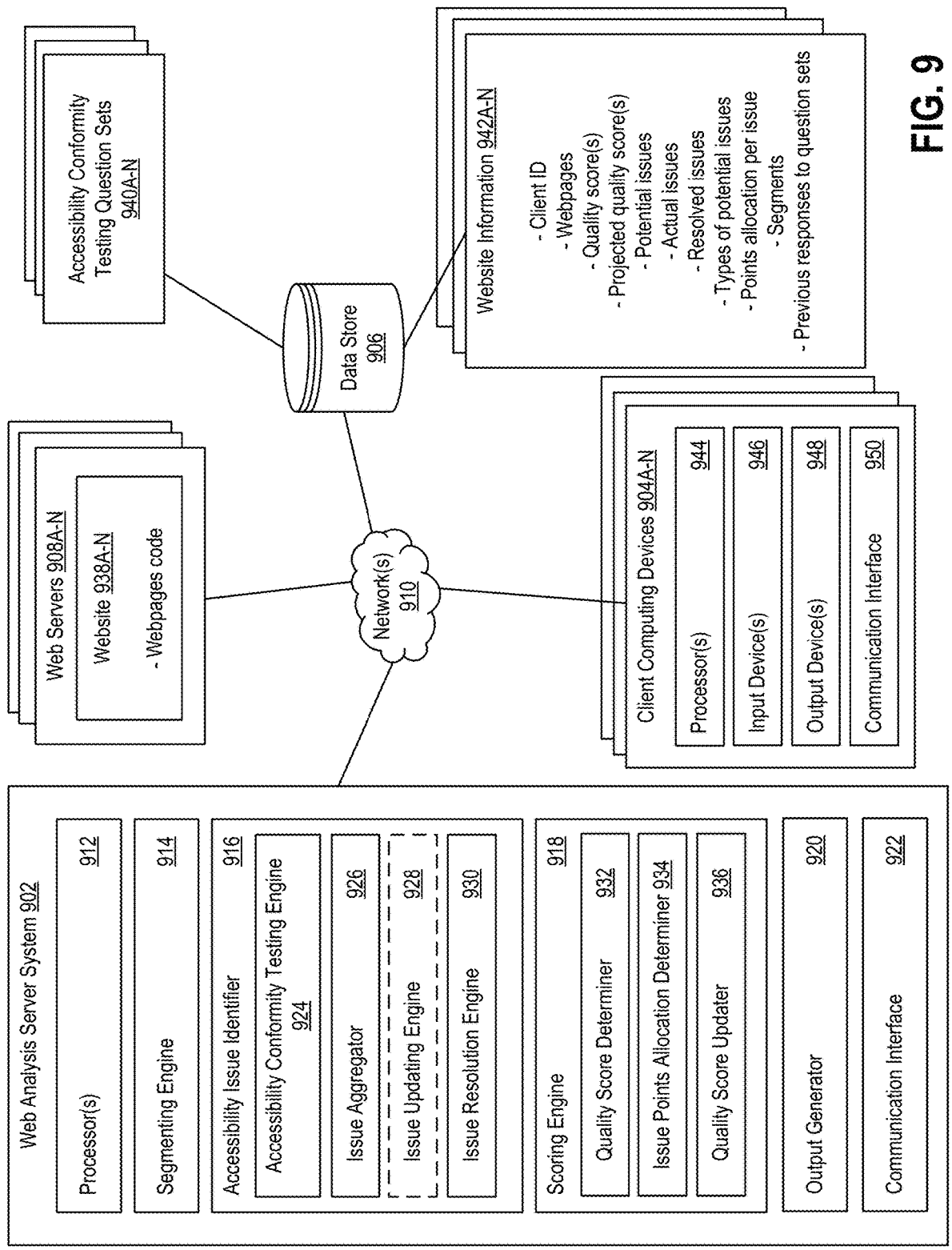
FIG. 9 is a system diagram depicting one or more components that can perform the techniques described herein.

The process 600 can be performed by a web analysis server system described throughout this disclosure (e.g., refer to the web analysis server system 902 in FIG. 9). The process 600 can also be performed by one or more other computing systems, devices, computers, networks, cloud-based systems, and/or cloud-based services. For illustrative purposes, the process 600 is described from the perspective of a computer system.

Referring to the process 600 in FIGS. 6A-C, the computer system can determine a current value for a quality score of a website (block 602). The computer system can analyze webpages of the website to determine the current value for the quality score of the website. As described herein, the computer system can provide one or more web analysis services that can be configured to analyze and quantify various aspects of the website, such as quality assurance, accessibility, SEO, and policy. One or more of these services can also be provided by third party systems and in communication/integrated with the computer system. Analyses of the various services can be combined by the computer system to determine the current value for the quality score of the website.

The current value can be less than a perfect value for the quality score. As described throughout this disclosure, the quality score can be assigned points from 0 to 100 points, where 100 points indicates a perfect value for the quality score. One or more other scales can be used to assign values to the quality score.

The computer system can identify issues with the website in block 604. The issues may result in the website not having the perfect value for the quality score. The issues may already be identified by the computer system and/or the web analysis services. Thus, in block 604, the computer system can poll the services for any identified issues. In block 604, the computer system can also retrieve identified issues associated with the website from a data store (e.g., refer to the data store 906 in FIG. 9). The identified issues can be actual and/or potential issues. The identified issues may also be associated with accessibility of the website.

In block 606, the computer system can provide information to cause a client computing device to present (i) a circle graphical element indicating the current value for the quality score and (ii) indications of categories of issues with the website. A first portion of a circumference of the circle graphical element can be presented in a first manner (e.g., indicia) and a second portion of the circumference of the circle graphical element can be presented in a second manner (e.g., indicia). A size of the first portion can indicate the current value for the quality score of the website. The second portion of the circumference of the circle graphical element can represent a remainder of the circumference of the circle graphical element that is unoccupied by the first portion of the circumference of the circle graphical element. Moreover, each category of issues of (ii) can include different sets of issues from the identified issues. Refer to FIG. 1A for further discussion.

Next, the computer system can receive an indication of user input indicating selection of a category of issues (block 608). Refer to FIG. 1B for further discussion. The computer system can accordingly determine a target value for the quality score (e.g., target quality score) that would result from resolving all issues in the user-selected category (block 610). In some implementations, the target value can be less than the perfect value for the quality score. Refer to FIGS. 1B-D for further discussion.

The computer system can then provide information to cause the client computing device to modify presentation of the circle graphical element to include a target element, such as a bulls eye, corresponding to the target value for the quality score (block 612). Therefore, the presentation of the circle graphical element can be modified to add the target element at a location on the circumference of the circle that represents the target value for the quality score. The location of the target element can be some distance from a side of the first portion of the circumference of the circle graphical element that represents the current value of the quality score. Refer to FIGS. 1B-D for further discussion.

The computer system can also receive an indication of user input indicating selection of an issue that is designated as a potential issue in block 614. For example, the computer system can provide, before and/or after the user input selected the user-selected category, information to cause the client computing device to display a user interface that presents indications of issues from the identified issues for the website that result in the website not having the perfect value for the quality score. The issues can include one or more potential issues. Potential and actual issues can have a negative effect on the quality score of the website. The issues can be presented in a table, for example, as described throughout this disclosure.

Each indication of an issue that is presented by the client computing device can include an icon that indicates whether the respective issue is an actual issue or whether the respective issue is a potential issue. Before user input is received at the client computing device indicating responses to a set of ACT questions (e.g., refer to blocks 616-620), the icon for the indication of the particular issue can indicate that the particular issue is designated as a potential issue. Responsive to user input supplying responses to the questions indicating that the particular issue is an actual issue, the computer system can change a designation of the particular issue from being a potential issue to being an actual issue and provide information to cause the client computing device to update the user interface to change the icon for the indication of the particular issue from indicating that the particular issue is designated as a potential issue to indicating that the particular issue is designated as an actual issue. Similarly, responsive to user input at the client computing device supplying the response to the inquiry indicating that the particular issue is an actual issue, the computer system can leave the quality score as having the current value, which leaves in effect the negative effect on the quality score that was provided by the particular issue.

Additionally, the computer system can provide, responsive to receiving the indication that user input selected the user-selected category, information to cause the client computing device to modify the user interface from presenting the indications of all the identified issues for the website to presenting only indications of issues from the user-selected category of issues. Refer to FIGS. 1D-F and FIG. 2 for further discussion.

In some implementations, the computer system can also receive an indication that user input at the client computing device selected, in addition to the user-selected category, a second user-selected category of the categories of issues with the website. The computer system can accordingly determine an updated target value for the quality score that can result should the computer system determine that all issues within the user-selected category and all issues within the second user-selected category are resolved. The computer system can then provide, responsive to receiving the indication that user input selected the second user-selected category in addition to the user-selected category, information to cause the client computing device to modify the presentation of the circle graphical element to move the target element to an updated location on the circumference of the circle that represents the updated target value for the quality score.

The computer system can also provide, responsive to receiving the indication that user input selected the second user-selected category in addition to the user-selected category, information to cause the client computing device to modify the user interface from presenting only indications of issues from the user-selected category of issues to presenting only indications of issues from the user-selected category and issues from the second user-selected category.

Therefore, before user input selected the user-selected category, the user interface may concurrently present: (i) the circle graphical element without the target element, and (ii) the indications of issues from the plurality of issues. After user input selected the user-selected category and before user input selected the second user-selected category, the user interface may concurrently present: (i) the circle graphical element with the target element at the location on the circumference that represents the target value, and (ii) only the indications of issues from the user-selected category. After user input selected the second user-selected category in addition to the user-selected category, the user interface can concurrently present (i) the circle graphical element with the target element at the updated location on the circumference that represents the updated target value, and (ii) only indications of issues from the user-selected category and issues from the second user-selected category. As described throughout this disclosure, the presentation by the user interface of only the indications of issues from the user-selected category can include displaying, for each such presented issue, a name of the respective issue and an indication of a quantity of occurrences of the respective issue. The quantity of occurrences of the respective issue can represent a quantity of pages that include the issue, or a total number of times the issue occurs (e.g., including multiple times on some pages). The presentation by the user interface of only the indications of issues from the second user-selected category in addition to the user-selected category can also include displaying, for each such presented issue, a name of the respective issue and an indication of a quantity of occurrences of the respective issue.

Still referring to the process 600 in FIGS. 6A-C, in block 616, the computer system can determine whether the selected potential issue from block 614 is an actual issue based on performing an accessibility conformity test (ACT). In other words, the computer system can provide information to cause the client computing device to present an inquiry relevant to whether the particular issue is an actual issue, responsive to the user input having selected the indication of the particular issue. Refer to FIGS. 3-5 for further discussion.

For example, the computer system can provide information to the client computing device to present a series of successive questions (block 618). As described throughout this disclosure, the computer system can present one question at a time. The questions that are presented can correspond to a type of the particular potential issue. Each type of potential issue may also have a different amount of questions to assess accessibility compliance. For example, some potential issue types may have one question while other potential issue types may have three or more questions. In some implementations, a same set of questions can be used for more than one type of potential issue.

As another example, a first potential issue "Does this video have captions?" and a second potential issue "Is there an alternative to the visual content in this video?" can use question sets that contain one or more of the same questions (such as asking whether the video is a live-streaming and/or whether the video has sound). User responses to the same question for the first potential issue may therefore be applied, by the computer system, to the second potential issue to more quickly and efficiently determine whether the second potential issue is an actual issue. The computer system can therefore present, in a question review flow for the second potential issue, the user responses that were provided for the same question for the first potential issue. Since those questions have been previously answered, the user can jump to responding to next questions in the set of questions to diagnose the second potential issue. Refer to FIGS. 5A-I and Table 1 for additional discussion about question sets for particular types of potential issues.

The computer system can receive an indication of user input responding to each question as the question is presented (block 620). The computer system can determine a next question based on the user input (block 622). As described herein, the computer system may retrieve prior answers provided by the user input to past similar or same potential issues. The computer system can use the present user input, the prior user input, or a combination of both to determine the next question to present in the series of questions. In some implementations, the computer system may present fewer questions for a second occurrence of the potential issue because the user previously provided answers to more questions for diagnosing a first occurrence of the same potential issue.

Next, the computer system can determine whether the potential issue is an actual issue based on aggregating the user input in response to all the presented questions (block 624). The computer system can receive one or more indications that user input at the client computing device included responses to the inquiry, the responses indicating that the particular issue may not be an actual issue. The computer system can use one or more rules to diagnose the potential issue as an actual issue.

The computer system may also perform one or more operations in response to the determination of block 616 (block 626). For example, the computer system can determine an updated value for the quality score (block 628). The computer system can determine the updated value for the quality score by removing the negative effect of the potential issue on the quality score that was provided by the particular issue. The computer system can determine the updated value for the quality score once the computer system determines that the user input addressed the issue (e.g., the customer responded to the actual issue by fixing it and saving that fix).

As described herein, if the issue is a potential issue, then the potential issue can be counted against the quality score of the website (e.g., the potential issue has a negative effect on the quality score). If the potential issue is diagnosed as an actual issue, then the actual issue is counted against the quality score of the website. If the potential issue is diagnosed as not an actual issue (and therefore is resolved or no-issue), then the potential issue is not counted against the quality score of the website. In other words, the potential issue can now have a positive effect on the quality score since the quality score may increase by an amount of points associated with removing the negative effect of the potential issue. Finally, if the potential issue is diagnosed as an actual issue but then fixed (e.g., by the user), then the issue is resolved and no longer counts against the quality score of the website. The issue can now have a positive effect on the quality score since the quality score may increase by an amount of points associated with removing the negative effect of the issue.

The computer system may also receive an indication that the actual issue has been fixed (block 630). The user can fix the actual issue using one or more services provided by the computer system and/or third party systems, such as a content management service (CMS) system. An example fix can include updating misspelling of a text element. Fixes can be made directly in webpage code. The fix can be made to a single occurrence of the issue. The fix can also be applied to multiple occurrences of the issue. The computer system can receive an indication from the client computing device and/or the service/system that was used by the user to address the actual issue. The indication can indicate that the actual issue has been resolved. Upon receiving this indication, the computer system can determine the updated value for the quality score, as described in block 628.

The computer system can also generate suggested recommended fixes for the actual issue (block 632). For example, the computer system can generate examples of webpage code that can be modified or otherwise implemented by the user in order to resolve/address the actual issue. The computer system can also provide one or more other suggested ways to address the actual issue, which can be presented to the user at the client computing device. The user can review the suggestions and apply any of the suggestions using the services/systems described above and/or implement their own changes to resolve the actual issue. The user can also select an option presented in the service/system used to fix the actual issue to implement the fix across all other occurrences of that actual issue.

The computer system can then provide information to cause the client computing device to update the GUI presented therein (block 634). For example, the computer system can provide information to cause the client computing device to update the user interface to change the indication of the current value for the quality score to an indication of the updated value for the quality score. The computer system can also provide, responsive to determining that the particular issue is not an actual issue, information to cause the client computing device to update the user interface to remove the indication of the particular issue that is no longer a potential issue from the presentation of the indications of the multiple issues for the website. For example, if the customer addresses the actual issue (e.g., fixes the issue and saves the fix), the indication of the particular issue (the actual issue) can be removed from the presentation of the indications for the other issues.

In block 636, the computer system can determine whether one or more changes were made to a webpage in the website since a last time the website was crawled/content was checked (by the web analysis server system, which can periodically crawl the website). Elements throughout a structure of the webpage or set of webpages can be linked to each other. For example, a transcript can be associated with a video element. As another example, a tag can be associated with a particular image element. If any of the linked elements are modified, altered, or otherwise changed over time (e.g., an alt tag is associated with a video having an actual issue that was previously resolved and text of the alt tag is changed after the actual issue is resolved), then the linked elements can be re-evaluated by the computer system. In other words, any actual issues or resolved issues associated with those linked elements can become potential issues once again, and the user can be prompted to review those potential issues. This is beneficial to maintain continuous accessibility compliance over extended periods of time, not just over one day or one period of time, thereby maintaining a level of quality for the website and improving user experiences with the website.

If no changes have been made to elements in the webpage or the set of webpages associated with the website, then the process 600 can stop. If, on the other hand, changes have been made, then the computer system can identify any actual and/or resolved issues associated with elements that are affected by the change(s) as potential issues in block 638. The computer system can then provide information to cause the client computing device to present these potential issues in a list of issues (block 640). These newly identified potential issues can be provided in the same user-selected category of block 608. The newly identified potential issues can also be provided in another, different list of issues.

The computer system can receive an indication of user input indicating selection of a potential issue in the list (block 642). Since the newly identified potential issues can be mixed in the list with previously identified potential issues that have not yet been reviewed by the user, the user can select any potential issue. Thus, the user may select one of the newly identified potential issues or one of the previously identified potential issues. Regardless of which potential issue is selected, the computer system can return to block 616 and repeat the blocks 618-634. The computer system can repeat blocks 618-634 until all potential issues in the list have been addressed and diagnosed (e.g., identified as actual issues, identified as resolved issues, identified as actual issues and fixed, identified as non-issues, etc.). The computer system may also repeat blocks 618-634 until no more changes to the webpages have been identified by the computer system.

Figure 7A:
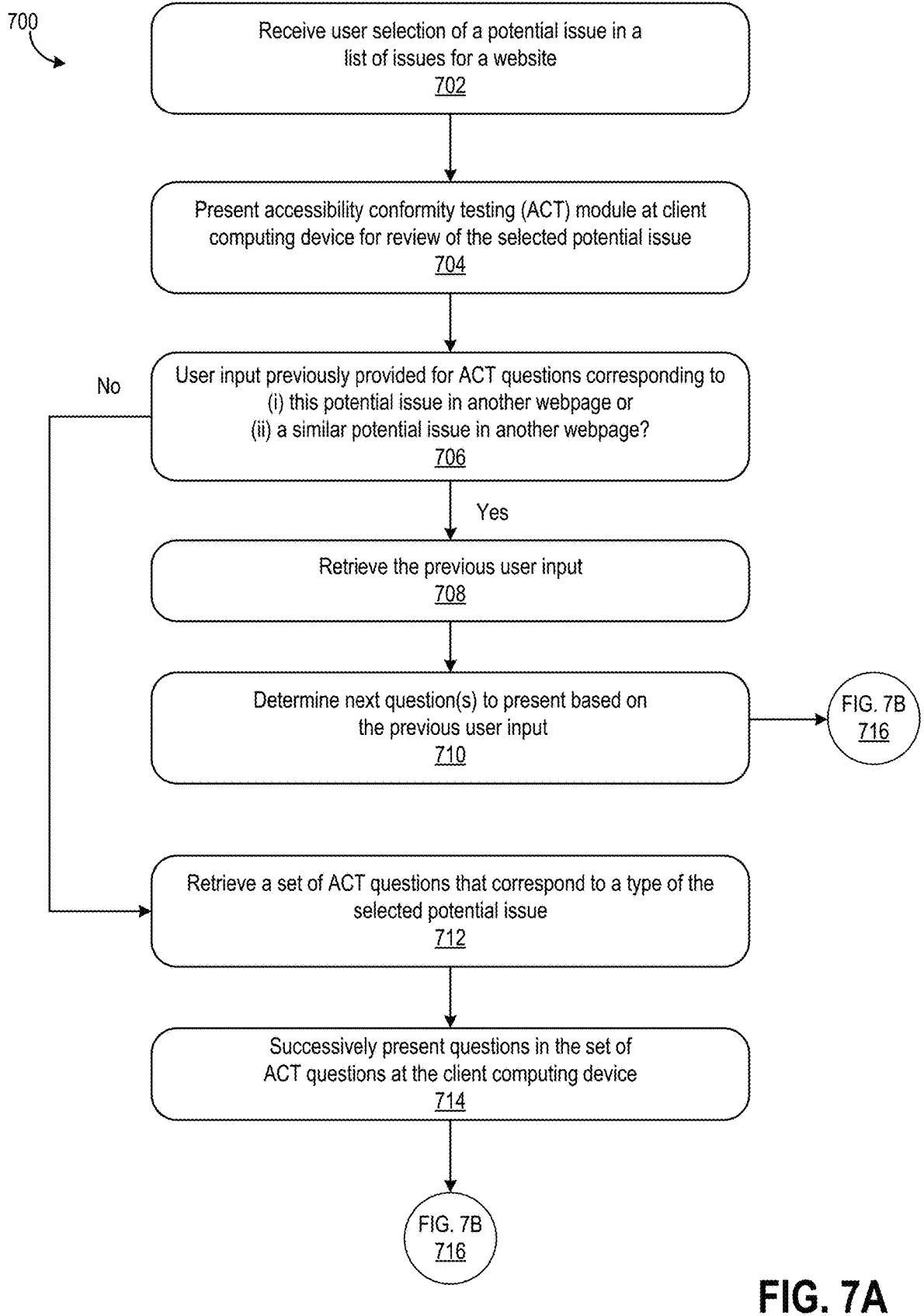

FIGS. 7A-C is a flowchart of a process 700 for identifying and addressing actual issues in a website. The process 700 can be performed to diagnose a potential issue as an actual issue using a series of questions (e.g., ACT questions) associated with a type of the potential issue. The process 700 can also be performed to identify an actual issue as a resolved issue once the actual issue is addressed/fixed.

The process 700 can be performed by a web analysis server system described throughout this disclosure (e.g., refer to the web analysis server system 902 in FIG. 9). The process 700 can also be performed by one or more other computing systems, devices, computers, networks, cloud-based systems, and/or cloud-based services. For illustrative purposes, the process 700 is described from the perspective of a computer system.

Referring to the process 700 in FIGS. 7A-C, the computer system can receive user selection of a potential issue in a list of issues for a website (block 702). Refer to FIGS. 1E and 2.

Next, the computer system can present an accessibility conformity testing (ACT) module at the user's client computing device for review of the selected potential issue (block 704). The computer system can determine whether user input has been previously provided for ACT questions corresponding to (i) this potential issue in another webpage or (ii) a similar potential issue in another webpage (block 706). The computer system can look at other occurrences of the same potential issue that have been addressed by the user. If user input has not been previously provided, then the computer system can proceed to block 712, discussed below. If applicable user input has been previously provided, then the computer system can retrieve the previous user input in block 708. The computer system can then determine a next question(s) to present based on the previous user input (block 710). The computer system can proceed to block 716, discussed below. Refer to FIGS. 3-5 for additional discussion.

Referring back to block 706, if user input has not previously been provided to the ACT questions that correspond to (i) or (ii), then the computer system can retrieve a set of ACT questions that correspond to a type of the selected potential issue in block 712. The computer system can then successively present the questions in the set of ACT questions at the client computing device (block 714).

In block 716, the computer system can receive successive user input indicating answers to the questions as they are presented at the client computing device. This can be in response to next questions that are presented based on the previous user input (block 710) or the set of ACT questions that are retrieved in block 712 and successively presented in block 714.

The computer system can determine whether the potential issue is an actual issue based on aggregation of the user's answers in block 718. If the potential issue is not an actual issue, the computer system proceeds to block 728, described below. If the potential issue is an actual issue, then the computer system designates the potential issue as an actual issue (block 720). The computer system can update the indication of the issue to an actual issue in the list of issues. For example, the computer system can change the graphical element of the orange triangle in the circle to the red exclamation point in the circle. Accordingly, the computer system can generate updated output indicating the actual issue in block 722. The computer system can then transmit the updated output to be presented at the client computing device in block 724.

In block 726, which can occur any amount of time after block 724, the computer system can determine whether the actual issue has been fixed. The computer system can receive an indication from one or more web analysis services and/or the CMS system that was used by the user to make changes to their website. The indication can indicate that a change was made in relation to the actual issue. The computer system can also poll the web analysis services and/or CMS system for updates on changes made by the user in relation to the actual issue. In some implementations, the computer system can identify when the actual issue was fixed based on identifying a corresponding change in the website when next the computer system crawls the website.

If the actual issue has not been fixed, the computer system proceeds to block 736, described below. If the actual issue has been fixed, the computer system designates the actual issue as a resolved issue in block 728.

Next, in block 730, the computer system can update the quality score of the website based on a quantity of points that correspond to resolving the actual issue. As described herein, the computer system can remove a negative effect of the actual issue from the quality score. The computer system can also generate updated output indicating the resolved issue (block 732). For example, the computer system can remove the actual issue from the list of potential and/or actual issues. The computer system can also update the graphical element of the red exclamation point in the circle to be the green checkmark in the circle. Moreover, the computer system can generate an updated visual representation of the quality score of the website. The computer system can transmit the updated output to be presented at the client computing device in 734.

The computer system can then determine whether it has received an indication of user input from the client computing device indicating selection of another potential issue in the list of issues (block 736). If the user selected another potential issue, the computer system can return to block 702 and repeat blocks 702-734 for each potential issue that the user selects from the list of issues. If the user does not select another potential issue, the process 700 may stop.

Figure 8:
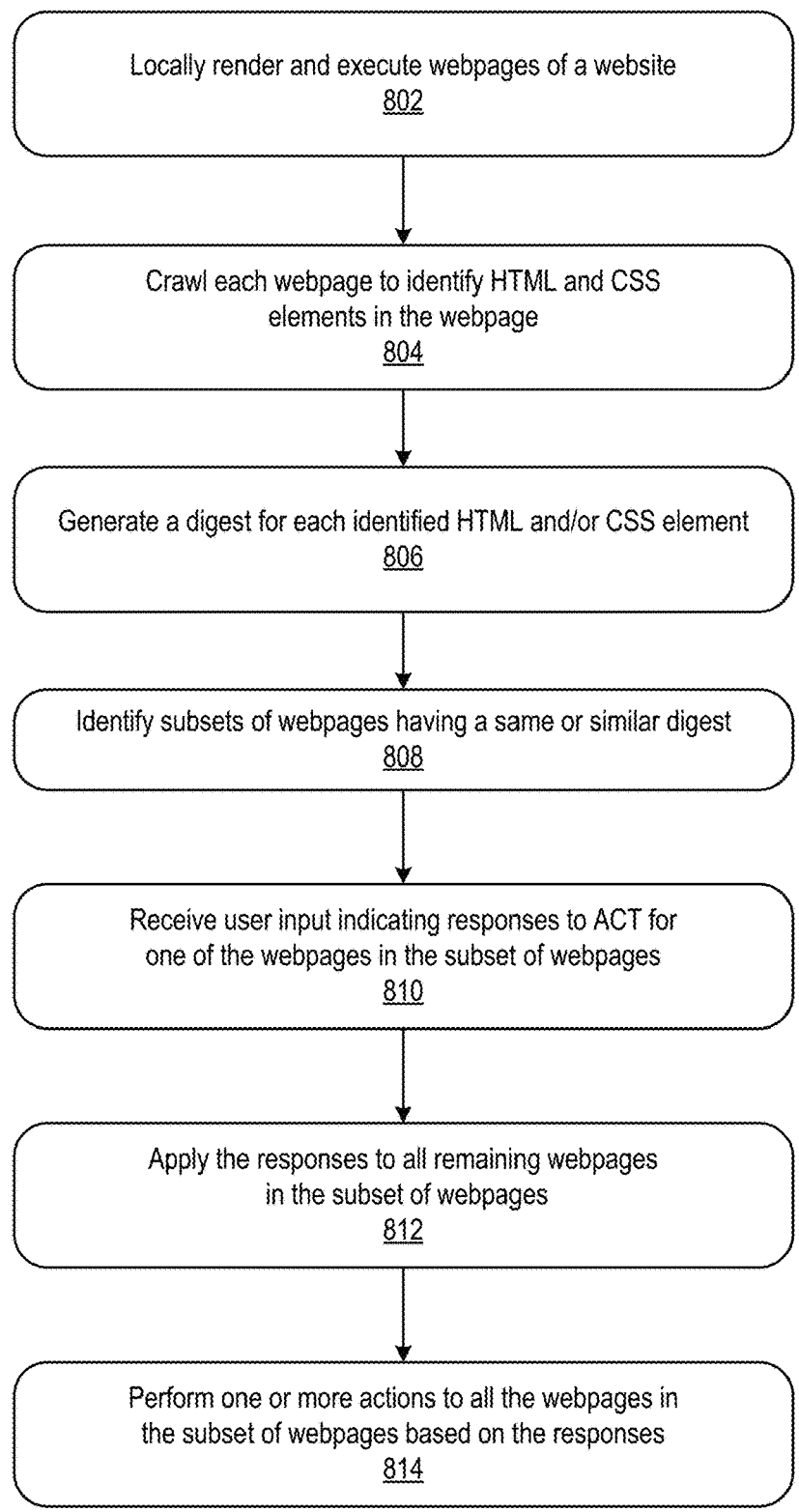
FIG. 8 is a flowchart of a process for resolving an actual issue across multiple webpages of a website.

FIG. 8 is a flowchart of a process 800 for resolving an actual issue across multiple webpages of a website. The process 800 can be used to identify webpages of the website that have the same actual issue. The process 800 an also be used to apply a fix of one occurrence of the actual issue to all occurrences of the actual issue, across the identified webpages of the website.

The process 800 can be performed by a web analysis server system described throughout this disclosure (e.g., refer to the web analysis server system 902 in FIG. 9). The process 800 can also be performed by a web analysis service and/or the CMS system, in some implementations. The process 800 can also be performed by one or more other computing systems, devices, computers, networks, cloud-based systems, and/or cloud-based services. For illustrative purposes, the process 800 is described from the perspective of a computer system.

In block 402, the computer system can locally render and execute webpages of a website. The computer system can locally execute and interpret the code to render the webpages. The webpages can be rendered as if they are being presented at a client computing device or other user device. In other words, the webpages can be rendered as they would appear to an end user who accesses the website through a web browser at their user device (e.g., mobile phone, smartphone, computer, laptop, tablet, etc.), although the rendering can also be performed by a "headless" web browser that does not actually present content on a display device.

The computer system can crawl each webpage to identify HTML and CSS elements in the webpage (block 804). Next, the computer system can generate a digest for each identified HTML and/or CSS element in block 806. The digest can be a combination of data that represents an identity of a particular element.

The computer system can identify subsets of webpages having a same or similar digest in block 808. The computer system can determine whether particular elements in the webpages have the same paths, URLs, IDs, tags, etc. In some implementations, the user may also designate what should be included in a digest such that the process 800 can be applied to different types of elements in the user's website. This can provide for user customization and flexibility to accurately and efficiently identify and address issues throughout their unique website.

The computer system can also receive user input indicating responses to ACT questions for one of the webpages in the subset of webpages (block 810). The responses can be received at any time before, during, or after blocks 802-808.

The computer system can apply the responses to all remaining webpages in the subset of webpages in block 812. Thus, the responses to the ACT questions can be applied to all webpages having the same digest. As a result, if an issue in one of the webpages is diagnosed as an actual issue, then the same issue across the other webpages having the same digest may also be diagnosed as an actual issue.

In block 814, the computer system can perform one or more actions to all the webpages in the subset of webpages. For example, the user can provide a fix to one occurrence of an actual issue. The computer system can then apply that fix across all the webpages in the subset of webpages that have an occurrence or occurrences of the same actual issue.

FIG. 9 is a system diagram depicting one or more components that can perform the techniques described herein. A web analysis server system 902, client computing devices 904A-N, data store 906, and web servers 908A-N can be in communication via network(s) 910.

In brief, the web analysis server system 902 can be any type of computing system, such as a computer or network of computers, and/or a cloud-based computing system and/or service. The client computing devices 904A-N can be any type of user device or computing device, including but not limited to a computer, laptop, tablet, cellphone, mobile phone, and/or smartphone. Each client computing device 904A-N can be operated and used by a customer, client, website operator, or other relevant user.

The data store 906 can be any type of storage device, including but not limited to cloud storage, a data lake, and/or a data base. The data store 906 can maintain information about websites (e.g., website information 942A-N), such as the websites that are assessed by the web analysis server system 902. The website information 942A-N stored at the data store 906 can include but is not limited to a client ID, webpages, quality score(s) of the website and/or webpages of the website, target quality score(s) of the website, potential issues, actual issues, resolved issues, types of potential issues, points allocation per issue, segments, and previous responses to ACT question sets. The data store 906 can also maintain accessibility conformity testing question sets 940A-N (e.g., refer to FIGS. 5A-I).

The web servers 908A-N can be any type of server system, such as a cloud-based server system. The web servers 908A-N can be configured to host websites. Accordingly, the web servers 908A-N can maintain code for webpages of websites 938A-N.

The web analysis server system 902 can be configured to analyze websites, determine quality scores for the websites, identify issues in the websites, and provide a user, such as a customer, with tools to assess and improve their website (s). Thus, the web analysis server system 902 can include a processor(s) 912, a segmenting engine 914, an accessibility issue identifier 916, a scoring engine 918, an output generator 920, and a communication interface 922.

The processor(s) 912 can be configured to execute instructions to perform one or more of the techniques described throughout this disclosure.

The segmenting engine 914 can be configured to identify segments in webpages of a website. For example, the engine 914 can retrieve webpages code for the website 938A-N from the web servers 908A-N. The engine 914 can render the website as it would appear at a user device by locally executing and interpreting the code. The engine 914 can also receive segment criteria from one of the client computing device 904A-N. In some implementations, the segment criteria can be generated at the client computing device 904A-N, stored in website information 942A-N in the data store 906, and then retrieved by the engine 914. The engine 914 can then assess the rendered webpages of the website to identify a subset of webpages that satisfy the segment criteria. Any segments that are identified by the engine 914 can be stored in the website information 942A-N in the data store 906.

The accessibility issue identifier 916 can be configured to perform the techniques described herein. The accessibility issue identifier 916 can include an accessibility conformity testing engine 924, an issue aggregator 926, an optional issue updating engine 928, and an issue resolution engine 930. The engine 924 can be configured to select and provide ACT sets of questions (e.g., the accessibility conformity testing question sets 940A-N) to the user at the client computing devices 904A-N. The engine 924 can determine which question sets and/or questions from the sets 940A-N to retrieve from the data store 906 based on a type of potential issue (from the website information 942A-N) associated with the potential issue selected for review by the user at the client computing devise 904A-N. Refer to FIGS. 3-5 for further discussion.

The issue aggregator 926 can be configured to identify webpages that have the same issues so that a fix to one occurrence of the issue can be applied to all occurrences of the issue. Refer to FIG. 8 for further discussion.

The optional issue updating engine 928 can be configured to receive an indication from the client computing device 104A-N of user input indicating a fix to an issue. The engine 928 can then apply the fix to all other occurrences of the issue that have been identified by the issue aggregator 926. In some implementations, the engine 928 can be provided by a web analysis service or another system, such as a CMS system. Refer to FIG. 8 for further discussion. Finally, the issue resolution engine 930 can be configured to designate potential issues as resolved issues or actual issues that have been fixed as resolved issues.

The scoring engine 918 can be configured to determine quality scores of websites, as described throughout this disclosure. The engine 918 can include a quality score determiner 932, an issue points allocation determiner 934, and a quality score updater 936. The quality score determiner 932 can be configured to determine an overall quality score of a website. The issue points allocation determiner 934 can be configured to determine and/or retrieve quantities of points that can be gained by addressing different types of issues. The quality score updater 936 can be configured to update the overall quality score of the website based on identifying potential issues, resolving/fixing actual issues, and/or identifying that a potential issue is not an issue.

The output generator 920 can be configured to generate output for presentation at the client computing devices 904A-N. The output generator 920 can generate and update any of the GUIs described throughout this disclosure, such as in FIGS. 1-5. The output generator 920 can then transmit the output to the client computing devices 904A-N to be presented to the user.

Finally, the communication interface 922 can provide communication between the web analysis server system 902 and the components described herein.

The client computing devices 904A-N can be used by the user to review information about their website that is determined by the web analysis server system 902. This information can be used to identify issues in the website, assess quality of the website, and improve the website (such as by reviewing potential issues and/or resolving/fixing actual issues). The client computing devices 904A-N can deploy software, applications, or other services that are provided by the web analysis server system 902 to be used by the customer in analyzing their website(s).

The client computing devices 904A-N can each include a processor(s) 944, input device(s) 946, output device(s) 948, and communication interface 950. The processor(s) 944 can execute instructions that cause the client computing devices 904A-N to perform one or more of the techniques described herein. The input device(s) 946 can include any type of device that can be used to provide input, by the users, to the client computing devices 904A-N. The input device(s) 946 can include but are not limited to keyboards, microphones, mice, and/or touchscreen displays.

The user can provide input via the input device(s) 964 that can be used by the web analysis server system 902 to perform one or more actions/operations described herein. The output devices(s) 948 can include any type of device that may provide output or otherwise display information to the user at the client computing devices 904A-N. The output device(s) 948 can include but is not limited to touchscreens, other types of display screens, speakers, headphones, and/or other types of devices for presenting information. The output device(s) 948 can display any of the information described herein, such as in FIGS. 1-5.

Finally, the communication interface 950 can be configured to provide communication between the components described herein.

FIG. 10 shows an example of a computing device 1000 and an example of a mobile computing device that can be used to implement the techniques described here. The computing device 1000 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1000 includes a processor 1002, a memory 1004, a storage device 1006, a high-speed interface 1008 connecting to the memory 1004 and multiple high-speed expansion ports 1010, and a low-speed interface 1012 connecting to a low-speed expansion port 1014 and the storage device 1006. Each of the processor 1002, the memory 1004, the storage device 1006, the high-speed interface 1008, the high-speed expansion ports 1010, and the low-speed interface 1012, are interconnected using various busses, and can be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as a display 1016 coupled to the high-speed interface 1008. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1004 stores information within the computing device 1000. In some implementations, the memory 1004 is a volatile memory unit or units. In some implementations, the memory 1004 is a non-volatile memory unit or units. The memory 1004 can also be another form of computer-readable medium, such as a magnetic or optical disk.

The storage device 1006 is capable of providing mass storage for the computing device 1000. In some implementations, the storage device 1006 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1004, the storage device 1006, or memory on the processor 1002.

The high-speed interface 1008 manages bandwidth-intensive operations for the computing device 1000, while the low-speed interface 1012 manages lower bandwidth-intensive operations. Such allocation of functions is exemplary only. In some implementations, the high-speed interface 1008 is coupled to the memory 1004, the display 1016 (e.g., through a graphics processor or accelerator), and to the high-speed expansion ports 1010, which can accept various expansion cards (not shown). In the implementation, the low-speed interface 1012 is coupled to the storage device 1006 and the low-speed expansion port 1014. The low-speed expansion port 1014, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1000 can be implemented in a number of different forms, as shown in the figure. For example, it can be implemented as a standard server 1020, or multiple times in a group of such servers. In addition, it can be implemented in a personal computer such as a laptop computer 1022. It can also be implemented as part of a rack server system 1024. Alternatively, components from the computing device 1000 can be combined with other components in a mobile device (not shown), such as a mobile computing device 1050. Each of such devices can contain one or more of the computing device 1000 and the mobile computing device 1050, and an entire system can be made up of multiple computing devices communicating with each other.

The mobile computing device 1050 includes a processor 1052, a memory 1064, an input/output device such as a display 1054, a communication interface 1066, and a transceiver 1068, among other components. The mobile computing device 1050 can also be provided with a storage device, such as a micro-drive or other device, to provide additional storage. Each of the processor 1052, the memory 1064, the display 1054, the communication interface 1066, and the transceiver 1068, are interconnected using various buses, and several of the components can be mounted on a common motherboard or in other manners as appropriate.

The processor 1052 can execute instructions within the mobile computing device 1050, including instructions stored in the memory 1064. The processor 1052 can be implemented as a chipset of chips that include separate and multiple analog and digital processors. The processor 1052 can provide, for example, for coordination of the other components of the mobile computing device 1050, such as control of user interfaces, applications run by the mobile computing device 1050, and wireless communication by the mobile computing device 1050.

The processor 1052 can communicate with a user through a control interface 1058 and a display interface 1056 coupled to the display 1054. The display 1054 can be, for example, a TFT (Thin-Film-Transistor Liquid Crystal Display) display or an OLED (Organic Light Emitting Diode) display, or other appropriate display technology. The display interface 1056 can comprise appropriate circuitry for driving the display 1054 to present graphical and other information to a user. The control interface 1058 can receive commands from a user and convert them for submission to the processor 1052. In addition, an external interface 1062 can provide communication with the processor 1052, so as to enable near area communication of the mobile computing device 1050 with other devices. The external interface 1062 can provide, for example, for wired communication in some implementations, or for wireless communication in other implementations, and multiple interfaces can also be used.

The memory 1064 stores information within the mobile computing device 1050. The memory 1064 can be implemented as one or more of a computer-readable medium or media, a volatile memory unit or units, or a non-volatile memory unit or units. An expansion memory 1074 can also be provided and connected to the mobile computing device 1050 through an expansion interface 1072, which can include, for example, a SIMM (Single In Line Memory Module) card interface. The expansion memory 1074 can provide extra storage space for the mobile computing device 1050, or can also store applications or other information for the mobile computing device 1050. Specifically, the expansion memory 1074 can include instructions to carry out or supplement the processes described above, and can include secure information also. Thus, for example, the expansion memory 1074 can be provide as a security module for the mobile computing device 1050, and can be programmed with instructions that permit secure use of the mobile computing device 1050. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1064, the expansion memory 1074, or memory on the processor 1052. In some implementations, the computer program product can be received in a propagated signal, for example, over the transceiver 1068 or the external interface 1062.

The mobile computing device 1050 can communicate wirelessly through the communication interface 1066, which can include digital signal processing circuitry where necessary. The communication interface 1066 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1068 using a radio-frequency. In addition, short-range communication can occur, such as using a Bluetooth, WiFi, or other such transceiver (not shown). In addition, a GPS (Global Positioning System) receiver module 1070 can provide additional navigation- and location-related wireless data to the mobile computing device 1050, which can be used as appropriate by applications running on the mobile computing device 1050.

The mobile computing device 1050 can also communicate audibly using an audio codec 1060, which can receive spoken information from a user and convert it to usable digital information. The audio codec 1060 can likewise generate audible sound for a user, such as through a speaker, e.g., in a handset of the mobile computing device 1050. Such sound can include sound from voice telephone calls, can include recorded sound (e.g., voice messages, music files, etc.) and can also include sound generated by applications operating on the mobile computing device 1050.

The mobile computing device 1050 can be implemented in a number of different forms, as shown in the figure. For example, it can be implemented as a cellular telephone 1080. It can also be implemented as part of a smart-phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A computer-implemented method, comprising:
analyzing, by a computing system, webpages of a website to determine a current value for a quality score of the website, the current value for the quality score being less than a perfect value for the quality score;
identifying, by the computing system, a plurality of issues with the website that result in the website not having the perfect value for the quality score;
providing, by the computing system, information to cause a particular client device to present:
  (i) a graphical element that indicates the current value for the quality score, wherein a first portion of the graphical element is presented in a first manner and a second portion of the graphical element is presented in a second manner, a size of the first portion indicating the current value for the quality score of the website, and
  (ii) indications of multiple categories of issues with the website, the multiple categories of issues including different respective sets of issues from the plurality of issues with the website;
receiving, by the computing system, an indication that user input at the particular client device selected a user-selected category of the multiple categories of issues with the website;
determining, by the computing system, a target value for the quality score that would result should the computing system determine that all issues within the user-selected category of issues are resolved, the target value for the quality score being less than the perfect value for the quality score;
providing, by the computing system responsive to receiving the indication that user input selected the user-selected category, information to cause the particular client device to modify a presentation of the graphical element to add a target element at a location that represents the target value for the quality score;

receiving, by the computing system, an indication that user input at the particular client device selected, in addition to the user-selected category, a second user-selected category of the multiple categories of issues with the website;

determining, by the computing system, an updated target value for the quality score that would result should the computing system determine that all issues within the user-selected category and all issues within the second user-selected category are resolved; and providing, by the computing system responsive to receiving the indication that user input selected the second user-selected category in addition to the user-selected category, information to cause the particular client device to modify the presentation of the graphical element based on the use-selected category and the second user-selected category.

2. The method of claim 1, wherein the location of the target element is some distance separated from a side of the first portion of the graphical element that represents the current value of the quality score.

3. The method of claim 1, wherein:
the graphical element has a circle shape;
the first portion of the graphical element comprises a first part of a circumference of the circle shape of the graphical element;
the second portion of the graphical element comprises a second part of the circumference of the circle shape of the graphical element; and
the second part of the circumference of the circle shape of the graphical element represents a remainder of the circumference of the circle shape of the graphical element that is unoccupied by the first part of the circumference of the circle shape of the graphical element.

4. The method of claim 1, wherein providing, by the computing system responsive to receiving the indication that user input selected the second user-selected category in addition to the user-selected category, information to cause the particular client device to modify the presentation of the graphical element based on the use-selected category and the second user-selected category comprises causing the particular client device to modify the presentation of the graphical element to move the target element from:
(i) the location that represents the target value for the quality score, to
(ii) an updated location that represents the updated target value for the quality score.

5. The method of claim 1, further comprising:
providing, by the computing system responsive to receiving the indication that user input selected the second user-selected category in addition to the user-selected category, information to cause the particular client device to modify the user interface from presenting indications of issues only from the user-selected category of issues to presenting indications of issues only from the user-selected category and the second user-selected category.

6. The method of claim 5, wherein:
before user input selected the user-selected category, the user interface concurrently presented:
(i) the graphical element without the target element, and
(ii) indications of issues from the plurality of issues;
after user input selected the user-selected category and before user input selected the second user-selected category, the user interface concurrently presented:
(i) the graphical element with the target element at the location that represents the target value, and
(ii) the indications of issues only from the user-selected category; and after user input selected the second user-selected category in addition to the user-selected category, the user interface concurrently presented:
(i) the graphical element with the target element at the updated location that represents the updated target value, and
(ii) indications of issues only from the user-selected category and the second user-selected category.

7. The method of claim 6, wherein:
the presentation by the user interface of the indications of issues only from the user-selected category includes displaying, for each such presented issue, a name of the respective issue and an indication of a quantity of occurrences of the respective issue; and
the presentation by the user interface of the indications of issues only from the user-selected category and the second user-selected category includes displaying, for each such presented issue, a name of the respective issue and an indication of a quantity of occurrences of the respective issue.

8. The method of claim 1, wherein the indications of multiple categories of issues presented at the particular client device comprise at least one of level A accessibility issues, level AA accessibility issues, and level AAA accessibility issues.

9. The method of claim 1, further comprising providing, by the computing system, information to cause the particular client device to present:
(i) a first sub-score indicating progress towards resolving all the issues within the user-selected category, and
(ii) a second sub-score indicating progress towards resolving all the issues within the second user-selected category.

10. The method of claim 1, further comprising providing, by the computing system, information to cause the particular client device to present a graphical element indicating a history of the quality score of the website relative to quality scores of other websites in an industry.

11. A computerized system, comprising:
one or more processors; and
one or more computer-readable devices including instructions that, when executed by the one or more processors, cause the computerized system to perform operations, including:
analyzing webpages of a website to determine a current value for a quality score of the website, the current value for the quality score being less than a perfect value for the quality score;
identifying a plurality of issues with the website that result in the website not having the perfect value for the quality score;
providing information to cause a particular client device to present:
(i) a graphical element that indicates the current value for the quality score, wherein a first portion of the graphical element is presented in a first manner and a second portion of the graphical element is presented in a second manner, a size of the first portion indicating the current value for the quality score of the website, and
(ii) indications of multiple categories of issues with the website, the multiple categories of issues including different respective sets of issues from the plurality of issues with the website;

receiving an indication that user input at the particular client device selected a user-selected category of the multiple categories of issues with the website;

determining a target value for the quality score that would result should the computing system determine that all issues within the user-selected category of issues are resolved, the target value for the quality score being less than the perfect value for the quality score;

providing, responsive to receiving the indication that user input selected the user-selected category, information to cause the particular client device to modify a presentation of the graphical element to add a target element at a location that represents the target value for the quality score;

receiving an indication that user input at the particular client device selected, in addition to the user-selected category, a second user-selected category of the multiple categories of issues with the website;

determining an updated target value for the quality score that would result should the computing system determine that all issues within the user-selected category and all issues within the second user-selected category are resolved; and providing, responsive to receiving the indication that user input selected the second user-selected category in addition to the user-selected category, information to cause the particular client device to modify the presentation of the graphical element based on the use-selected category and the second user-selected category.

12. The computerized system of claim 11, wherein providing, responsive to receiving the indication that user input selected the second user-selected category in addition to the user-selected category, information to cause the particular client device to modify the presentation of the graphical element based on the use-selected category and the second user-selected category comprises causing the particular client device to modify the presentation of the graphical element to move the target element from:

(i) the location that represents the target value for the quality score, to (ii) an updated location that represents the updated target value for the quality score.

13. The computerized system of claim 11, wherein the indications of multiple categories of issues presented at the particular client device comprise a web content accessibility guidelines (WCAG) conformance level category and a best practices category.

14. The computerized system of claim 13, wherein the WCAG conformance level category comprises at least one of level A issues, level AA issues, and level AAA issues.

15. The computerized system of claim 11, the operations further comprising providing information to cause the particular client device to present:

(i) a first sub-score indicating progress towards resolving all the issues within the user-selected category, and (ii) a second sub-score indicating progress towards resolving all the issues within the second user-selected category.

16. The computerized system of claim 15, wherein the first sub-score and the second sub-score are numeric values that are less than a perfect sub-score value.

17. The computerized system of claim 11, the operations further comprising providing information to cause the particular client device to present a graphical element indicating a history of the quality score of the website relative to quality scores of other websites in an industry.

18. A system for identifying potential accessibility issues across a website, the system comprising:

a website analysis server system to assess website quality;

a particular client computing device to provide a graphical user interface (GUI) presenting information on website quality as determined by the website analysis server system, the particular client computing device being configured to:

output the GUI on a display of the particular client computing device;

present graphical elements in the GUI that each correspond to criteria that can be selected and used to identify potential issues in a website;

receive user input indicating selection of at least one graphical element; and transmit the user input to the website analysis server system, the website analysis server system being configured to:

receive the user input from the particular client computing device;

identify a quality score of the website;

predict an updated quality score of the website based on the user input, wherein the updated quality score is increased from the quality score of the website by a predetermined amount of points that corresponds to a quantity of points that the quality score of the website can gain if the user addresses the potential issues associated with the user-selected at least one graphical element;

generate a graphical display of the updated quality score to be presented to the user at the particular client computing device, wherein the graphical display has a circle shape, wherein a first portion of a circumference of the circle shape is highlighted in a first manner, wherein a size of the first portion indicates the quality score of the website, wherein a second portion of the circumference of the circle shape is highlighted in a second manner, wherein the circle shape includes a target element in a location on the circumference of the circle shape that represents the updated quality score if the user addresses the potential issues associated with the user-selected at least one graphical element; and transmit the graphical display to the particular client computing device to be presented in a GUI display.

19. The system of claim 18, wherein the web analysis server system is further configured to:

receive second user input, from the particular client computing device, indicating selection of another graphical element;

predict a second updated quality score of the website based on the user input, wherein the second updated quality score is increased from the quality score of the website by a predetermined amount of points that corresponds to a quantity of points that the quality score of the website can gain if the user addresses the potential issues associated with the another user-selected graphical element;

update the graphical display of the second updated quality score, wherein the target element is positioned at a second location on the circumference of the circle shape that represents the second updated quality score if the user addresses the potential issues associated with the user-selected another graphical element, wherein the second location of the target element is some distance from a start of the first portion of the circumference of the circle shape that is equal to the second updated quality score; and transmit the updated graphical display to the particular client computing device to be presented in the GUI display.

20. The system of claim 18, wherein the web analysis server system is further configured to:

receive, from the particular client computing device, user input indicating selection of a potential issue in a list of potential issues presented in the GUI display of the particular client computing device;

receive, from the particular client computing device, user input indicating that at least one potential issue in the list of potential issues is not an actual issue;

update the quality score of the website by a predetermined quantity of points that correspond to at least one potential issue being resolved;

generate output that updates the at least one potential issue to a resolved issue; and transmit the output and the updated quality score to be presented in the GUI display at the particular client computing device with the list of potential issues.

* * * * *